(12) United States Patent
Sohn et al.

(10) Patent No.: US 11,190,595 B2
(45) Date of Patent: Nov. 30, 2021

(54) ELECTRONIC DEVICE AND OPERATING METHOD THEREFOR

(71) Applicant: SAMSUNG ELECTRONICS CO., LTD., Suwon-si (KR)

(72) Inventors: Minjung Sohn, Suwon-si (KR); Jonghyun Ryu, Suwon-si (KR); Gunho Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 16/769,056

(22) PCT Filed: Dec. 24, 2018

(86) PCT No.: PCT/KR2018/016598
§ 371 (c)(1),
(2) Date: Jun. 2, 2020

(87) PCT Pub. No.: WO2019/125092
PCT Pub. Date: Jun. 27, 2019

(65) Prior Publication Data
US 2021/0234927 A1    Jul. 29, 2021

(30) Foreign Application Priority Data
Dec. 22, 2017    (KR) ........................ 10-2017-0177983

(51) Int. Cl.
*H04L 29/08*    (2006.01)
*H04W 8/22*    (2009.01)
(Continued)

(52) U.S. Cl.
CPC ............ *H04L 67/125* (2013.01); *G16Y 40/30* (2020.01); *H04M 1/72415* (2021.01); *H04W 8/22* (2013.01)

(58) Field of Classification Search
CPC ....... H04L 67/125; H04W 8/22; G16Y 40/30; H04M 1/72415; H04M 1/725; H04M 2201/34; H04M 2201/36; H04M 2250/06
See application file for complete search history.

(56) References Cited

U.S. PATENT DOCUMENTS 8,180,379 B2 * 5/2012 Forstall .................. G01C 21/12
455/456.6
2008/0271123 A1 * 10/2008 Ollis ...................... G08C 17/02
726/4

(Continued)

FOREIGN PATENT DOCUMENTS

KR    10-2016-0070511    6/2016
KR    10-2016-0073299    6/2016

(Continued)

OTHER PUBLICATIONS

International Search Report for PCT/KR2018/016598 dated Apr. 2, 2019, 5 pages.

(Continued)

*Primary Examiner* — Farid Seyedvosoghi
(74) *Attorney, Agent, or Firm* — Nixon & Vanderhye, P.C.

(57) ABSTRACT

An example electronic device may include a communication circuit, a processor, and a memory, wherein the memory stores instructions that, when executed by the processor, cause the processor to, acquire first information on one or more first electronic devices, which are located at a first place and can be connected to a first external apparatus, from the first external apparatus, store the acquired first information in association with an account accessed through the first external apparatus, acquire second information on one or more second electronic devices located at a second place, in response to at least one function-providing request corresponding to the one or more first electronic devices and (Continued)

made by a second external apparatus located at the second place and corresponding to the account, select at least one electronic device corresponding to the one or more first electronic devices from among the one or more second electronic devices, using the first information stored in the memory and the acquired second information, and deliver information on the at least one selected electronic device to the second external apparatus.

15 Claims, 29 Drawing Sheets

(51) Int. Cl.
 *G16Y 40/30* (2020.01)
 *H04M 1/72415* (2021.01)

(56) References Cited

U.S. PATENT DOCUMENTS

| | | | | |
|---|---|---|---|---|
| 2011/0106279 A1* | 5/2011 | Cho | ................... | H04L 12/2818 |
| | | | | 700/90 |
| 2012/0179547 A1* | 7/2012 | Besore | ................. | F24H 9/2007 |
| | | | | 705/14.58 |
| 2015/0072677 A1* | 3/2015 | Yang | ......................... | G06F 8/63 |
| | | | | 455/432.3 |
| 2016/0173679 A1 | 6/2016 | Ham et al. | | |
| 2016/0173806 A1 | 6/2016 | Cannistraro | | |
| 2016/0344593 A1* | 11/2016 | Ha | ...................... | H04L 12/6418 |
| 2016/0344815 A1 | 11/2016 | Hyun et al. | | |
| 2016/0378084 A1 | 12/2016 | Park et al. | | |
| 2018/0122226 A1 | 5/2018 | Ahn et al. | | |

FOREIGN PATENT DOCUMENTS

| | | |
|---|---|---|
| KR | 10-2016-0137224 | 11/2016 |
| KR | 10-2016-0137254 | 11/2016 |
| KR | 10-2017-0002244 | 1/2017 |
| KR | 10-2017-0004493 | 1/2017 |
| KR | 10-2017-0040492 | 4/2017 |

OTHER PUBLICATIONS

Written Opinion of the ISA for PCT/KR2018/016598 dated Apr. 2, 2019, 5 pages.

* cited by examiner

ELECTRONIC DEVICE AND OPERATING METHOD THEREFOR

CROSS-REFERENCE TO RELATED APPLICATION(S)

This application is a National Phase Entry of PCT International Application No. PCT/KR2018/016598, which was filed on Dec. 24, 2018 and claims priority to Korean Patent Application No. 10-2017-0177983, which was filed on Dec. 22, 2017, the contents of which are incorporated herein by reference.

BACKGROUND

1. Field

Embodiments of the disclosure relate to an electronic device controlling external devices based on the attributes of the external devices located around the electronic device and a method for operating the same.

2. Description of the Related Art

As smartphones or such portable electronic devices deliver high performance, more and more services and additional functions are offered via electronic devices. Communication carriers or electronic device manufacturers make an effort to pack electronic devices with various components to meet users' needs and make electronic devices more useful and develop relevant techniques.

Recent drastic growth of communication environments is leading to vigorous research efforts in Internet-of-things (IoT) devices. An IoT device may include one or more sensors and a communication device to obtain various pieces of data in real-time and share the obtained data with other electronic devices. Further, an IoT device and a portable electronic device may identify each other via sensors and communication devices and establish and maintain their mutual connection.

SUMMARY

In a space where an electronic device is located, one or more electronic devices may exist. The electronic device may connect to, and communicate data with, one or more electronic devices over a network. An electronic device may generate at least one mode set to control electronic devices located in the place that the user of the electronic device frequently visits, such as home or workplace, and the at least one mode generated may be used to control the electronic devices located in the place.

Meanwhile, the user of the electronic device may visit other various spaces than home or workplace and, if able to control electronic devices located in the other spaces according to a pre-generated mode, the user of the electronic device may be given convenience and various user experiences.

According to an embodiment of the present invention, an electronic device may provide a method for controlling electronic devices located in new places using at least one mode used to control electronic devices located in a specific place. To that end, according to an embodiment of the present invention, the electronic device may compare the electronic devices located in specific place and the electronic devices located in the new place and determine whether the electronic devices are compatible based on the results of comparison.

According to various embodiments of the present invention, an electronic device may comprise a communication circuit, a processor electrically connected with the communication circuit, and a memory electrically connected with the processor, the memory storing instructions to, when the processor is executed, obtain first information about one or more first electronic devices connectible with a first external device and located in a first place, from the first external device via the communication circuit, store the obtained first information in the memory in association with an account connected via the first external device, obtain second information about one or more second electronic devices located in a second place, in response to a request for providing at least one function corresponding to the one or more first electronic devices from a second external device corresponding to the account and located in a second place, select at least one electronic device corresponding to the one or more first electronic devices among the one or more second electronic devices using the first information stored in the memory and the obtained second information, and transfer information about the at least one selected electronic device to the second external device.

According to various embodiments of the present invention, an electronic device may comprise a communication circuit, a processor electrically connected with the communication circuit, and a memory electrically connected with the processor, the memory storing instructions to, when the processor is executed, obtain first information about one or more first electronic devices connectible with a first external device and located in a first place, from the first external device via the communication circuit, identify one or more second electronic devices located in a second place in response to determining that the first external device is located in the second place, select at least one electronic device corresponding to the one or more first electronic devices among the one or more second electronic devices, and transferring information about the at least one selected electronic device to the first external device.

According to various embodiments of the present invention, an electronic device may comprise a communication circuit, a processor electrically connected with the communication circuit, and a memory electrically connected with the processor, the memory storing instructions to, when the processor is executed, generate a first mode set to control at least some electronic devices among the one or more first electronic devices based on first information about one or more first electronic devices connectible with the electronic device and located in a first place, obtain second information about one or more second electronic devices located in a second place in response to determining that the electronic device is located in the second place, select at least one electronic device determined to correspond to the at least some electronic devices controlled according to the first mode among the one or more second electronic devices using the generated first mode and the second information, and control the at least one selected electronic device based on information about the at least one selected electronic device.

According to an embodiment of the present invention, an electronic device may provide a method for controlling one or more electronic devices located in a second place using at least one mode generated in a first place, thereby providing the user visiting a new space with customized services, or such various user experiences.

Further, according to an embodiment of the present invention, the electronic device may identify the electronic device located in the new space and compare the identified electronic device with a pre-registered electronic device and may thus control non-registered electronic devices according to a pre-registered mode. Thus, the electronic device may control electronic devices located in the new space according to at least one pre-registered mode, without a registration procedure, even when the electronic device is located in the new space.

Further, according to an embodiment of the present invention, the electronic device determines whether two electronic devices are compatible based on the respective attributes of the two electronic devices. Thus, even when the two electronic devices are not the same electronic device, the electronic device may control each of the two electronic devices according to the same mode.

DETAILED DESCRIPTION

Hereinafter, embodiments of the present disclosure are described with reference to the accompanying drawings.

Figure 1:
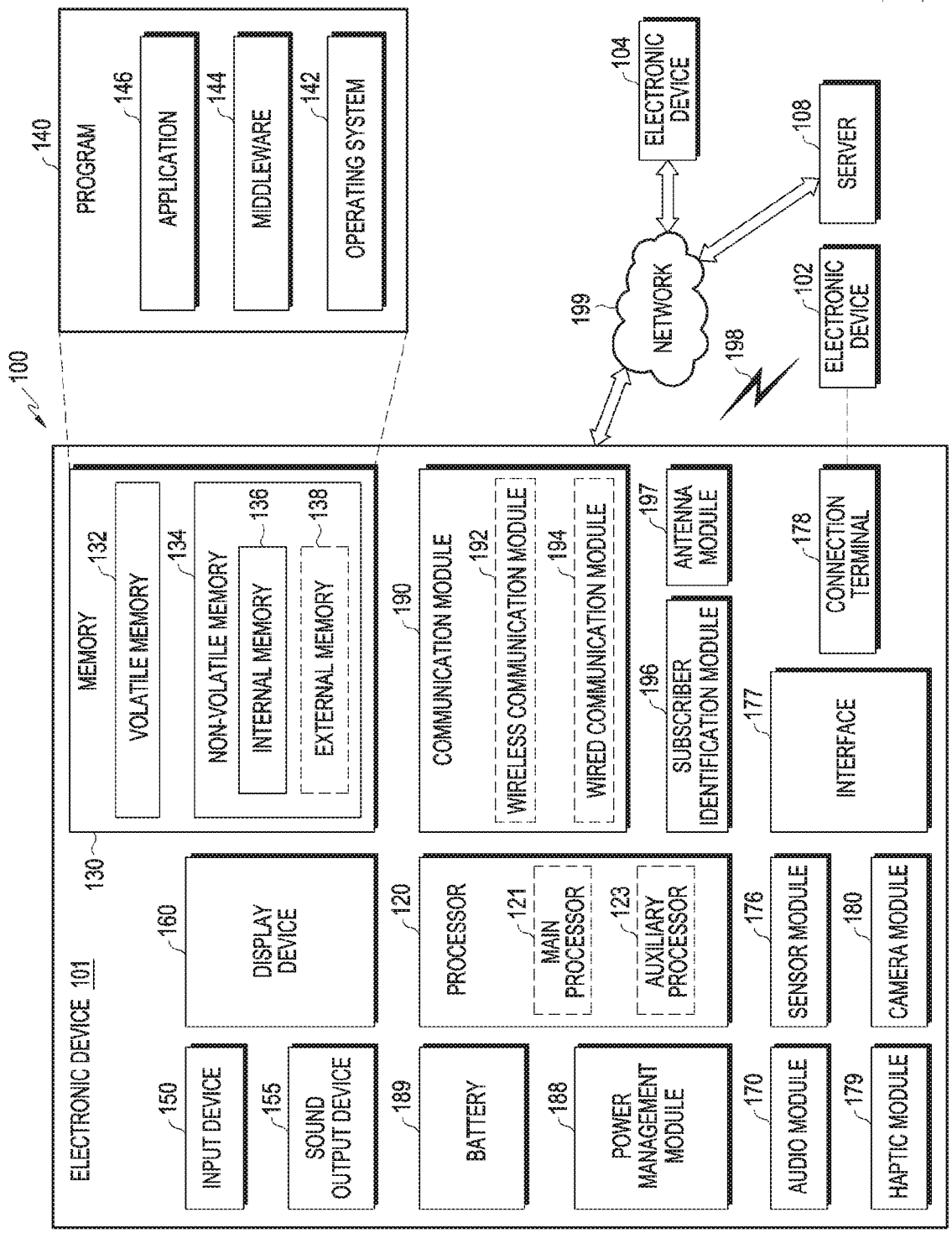
FIG. 1 is a block diagram illustrating an electronic device in a network environment according to various embodiments of the present invention.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process an instruction or data received from another component (e.g., the sensor module 176 or the communication module 190) on a volatile memory 132, and the processor 1120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or sensor module 176) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 1150 may include, e.g., a microphone, a mouse, or a keyboard.

The sound output device 155 may be a device for outputting sound signals to the outside of the electronic device 101. The sound output device 1155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 2660 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., a HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., instructions or data) therebetween.

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

According to various embodiments of the present invention, an electronic device may comprise a communication circuit, a processor electrically connected with the communication circuit, and a memory electrically connected with the processor, the memory storing instructions configured to, when executed by the processor, cause the processor to obtain first information about one or more first electronic devices connectible with a first external device and located in a first place, from the first external device via the communication circuit, store the obtained first information in the memory in association with an account connected via the first external device, obtain second information about one or more second electronic devices located in a second place, in response to a request for providing at least one function corresponding to the one or more first electronic devices from a second external device corresponding to the account and located in a second place, select at least one electronic device corresponding to the one or more first electronic devices among the one or more second electronic devices based on the first information stored in the memory and the obtained second information, and control the communication circuit to transmit information about the selected at least one electronic device to the second external device.

According to various embodiments of the present invention, in the electronic device, the memory may store instructions configured to, when executed by the processor, cause the processor to obtain information related to a first mode configured to control at least some first electronic devices among the one or more first electronic devices from the first external device, store the obtained information related to the first mode in the memory in association with the account connected via the first external device, and control the communication circuit to transmit the information about the at least one electronic device and the information related to the first mode to the second external device in response to determining that the selected at least one electronic device corresponds to the at least some first electronic devices controlled according to the first mode.

According to various embodiments of the present invention, in the electronic device, the memory may store instructions configured to, when executed by the processor, cause the processor to obtain information related to a second mode configured to control at least some second electronic devices among the one or more second electronic devices from an external server in response to the request for providing the at least one function from the second external device, and upon determining that the at least some second electronic devices controlled according to the second mode correspond to the at least some first electronic devices controlled according to the first mode, control the communication circuit to transmit the information related to the second mode to the second external device.

According to various embodiments of the present invention, in the electronic device, the memory may store instructions configured to, when executed by the processor, cause the processor to compare each of the one or more first electronic devices and each of the one or more second electronic devices based on an attribute for each of the one or more first electronic devices included in the first information and an attribute for each of the one or more second electronic devices included in the second information, and select the at least one electronic device corresponding to the one or more first electronic devices among the one or more second electronic devices based on a result of the comparison.

According to various embodiments of the present invention, in the electronic device, the memory may store instructions configured to, when executed by the processor, cause the processor to determine a degree of matching between the attribute corresponding to each of the one or more first electronic devices and the attribute corresponding to the at least one electronic device, based on the degree of matching being a preset value or more, determine that the at least one electronic device corresponds to the one or more first electronic devices, and select the at least one electronic device based on a result of the determination.

According to various embodiments of the present invention, in the electronic device, the memory may store instructions configured to, when executed by the processor, cause the processor to, when a plurality of attributes corresponding to the one or more first electronic devices at least partially correspond to a combination of respective attributes of two or more electronic devices of a plurality of second electronic devices, determine a degree of matching between the plurality of attributes and the respective attributes, based on the degree of matching being a preset value or more, determine that the combination of the two or more electronic devices corresponds to the one or more first electronic devices, and select the two or more electronic devices as the at least one electronic device based on a result of the determination.

According to various embodiments of the present invention, in the electronic device, the memory may store instructions configured to, when executed by the processor, cause the processor to, when a plurality of electronic devices correspond to the one or more first electronic devices, among a plurality of second electronic devices, select the at least one electronic device among the plurality of electronic devices, based on at least one of a distance between the plurality of electronic devices and the second external device or a strength of a signal output from the plurality of electronic devices.

According to various embodiments of the present invention, an electronic device may comprise a communication circuit, a processor electrically connected with the communication circuit, and a memory electrically connected with the processor, the memory storing instructions configured to, when executed by the processor, cause the processor to obtain first information about one or more first electronic devices connectible with a first external device and located in a first place, from the first external device via the communication circuit, identify one or more second electronic devices located in a second place in response to determining that the first external device is located in the second place, select at least one electronic device corresponding to the one or more first electronic devices among the one or more second electronic devices, and control the communication circuit to transmit information about the selected at least one electronic device to the first external device.

According to various embodiments of the present invention, in the electronic device, the memory may store instructions configured to, when executed by the processor, cause the processor to obtain information related to a first mode configured to control at least some first electronic devices among the one or more first electronic devices from the first external device and control the communication circuit to transmit the information about the at least one electronic device and the information related to the first mode to the first external device located in the second place in response to determining that the selected at least one electronic device corresponds to the at least some first electronic devices controlled according to the first mode.

According to various embodiments of the present invention, in the electronic device, the memory may store instructions configured to, when executed by the processor, cause the processor to obtain information related to a second mode configured to control at least some second electronic devices among the one or more second electronic devices from a second external server in response to determining that the first external device is located in the second place, and upon determining that the at least some second electronic devices controlled according to the second mode correspond to the at least some first electronic devices controlled according to the first mode, control the communication circuit to transmit the information related to the second mode to the first external device located in the second place.

According to various embodiments of the present invention, in the electronic device, the memory may store instructions configured to, when executed by the processor, cause the processor to obtain second information about the one or more second electronic devices from a second external device in response to determining that the first external device is located in the second place, and identify the one or more second electronic devices using the obtained second information.

According to various embodiments of the present invention, in the electronic device, the memory may store instructions configured to, when executed by the processor, cause the processor to compare each of the one or more first electronic devices and each of the one or more second electronic devices using an attribute for each of the one or more first electronic devices included in the first information and an attribute for each of the one or more second electronic devices included in the second information, and select the at least one electronic device corresponding to the one or more first electronic devices among the one or more second electronic devices based on a result of the comparison.

According to various embodiments of the present invention, in the electronic device, the memory may store instructions configured to, when executed by the processor, cause the processor to determine a degree of matching between the attribute corresponding to each of the one or more first electronic devices and the attribute corresponding to the at least one electronic device, based on the degree of matching being a preset value or more, determine that the at least one electronic device corresponds to the one or more first electronic devices, and select the at least one electronic device based on a result of the determination.

According to various embodiments of the present invention, in the electronic device, the memory may store instructions configured to, when executed by the processor, cause the processor to, when a plurality of attributes corresponding to the one or more first electronic devices at least partially correspond to a combination of respective attributes of two or more electronic devices of a plurality of second electronic devices, determine a degree of matching between the plurality of attributes and the respective attributes, based on the degree of matching being a preset value or more, determine that the combination of the two or more electronic devices correspond to the one or more first electronic devices, and select the two or more electronic devices as the at least one electronic device based on a result of the determination.

According to various embodiments of the present invention, in the electronic device, the memory may store instructions configured to, when executed by the processor, cause the processor to, when a plurality of electronic devices correspond to the one or more first electronic devices, among a plurality of second electronic devices, select the at least one electronic device, among the plurality of electronic devices based on at least one of a distance between the plurality of electronic devices and the first external device or a strength of a signal output from the plurality of electronic devices.

According to various embodiments of the present invention, an electronic device may comprise a communication circuit, a processor electrically connected with the communication circuit, and a memory electrically connected with the processor, the memory storing instructions configured to, when executed by the processor, cause the processor to generate a first mode configured to control at least some electronic devices among the one or more first electronic devices based on first information about one or more first electronic devices connectible with the electronic device and located in a first place, obtain second information about one or more second electronic devices located in a second place in response to determining that the electronic device is located in the second place, select at least one electronic device determined to correspond to the at least some electronic devices controlled according to the first mode among the one or more second electronic devices using the generated first mode and the second information, and control the selected at least one electronic device based on information about the selected at least one electronic device.

According to various embodiments of the present invention, in the electronic device, the memory may store instructions configured to, when executed by the processor, cause the processor to obtain information related to a second mode configured to control at least some electronic devices among the one or more second electronic devices in response to determining that the electronic device is located in the second place, and upon determining that the at least some electronic devices controlled according to the second mode correspond to the at least some electronic devices controlled according to the first mode, and control the at least some electronic devices controlled according to the second mode based on information related to the second mode.

According to various embodiments of the present invention, in the electronic device, the memory may store instructions configured to, when executed by the processor, cause the processor to compare each of the one or more first electronic devices and each of the one or more second electronic devices using an attribute for each of the one or more first electronic devices included in the first information and an attribute for each of the one or more second electronic devices included in the second information, and select the at least one electronic device corresponding to the one or more first electronic devices among the one or more second electronic devices based on a result of the comparison.

According to various embodiments of the present invention, in the electronic device, the memory may store instructions configured to, when executed by the processor, cause the processor to determine a degree of matching between the attribute corresponding to each of the one or more first electronic devices and the attribute corresponding to the at least one electronic device, based on the degree of matching being a preset value or more, determine that the at least one electronic device corresponds to the one or more first electronic devices, and select the at least one electronic device based on a result of the determination.

According to various embodiments of the present invention, in the electronic device, the memory may store instructions configured to, when executed by the processor, cause the processor to when a plurality of attributes corresponding to the one or more first electronic devices at least partially corresponds to a combination of respective attributes of two or more electronic devices of the plurality of second electronic devices, determine a degree of matching between the plurality of attributes and the respective attributes, based on the degree of matching being a preset value or more, determine that the combination of the two or more electronic devices corresponds to the one or more first electronic devices, and select the two or more electronic devices as the at least one electronic device based on a result of the determination.

Figure 2:
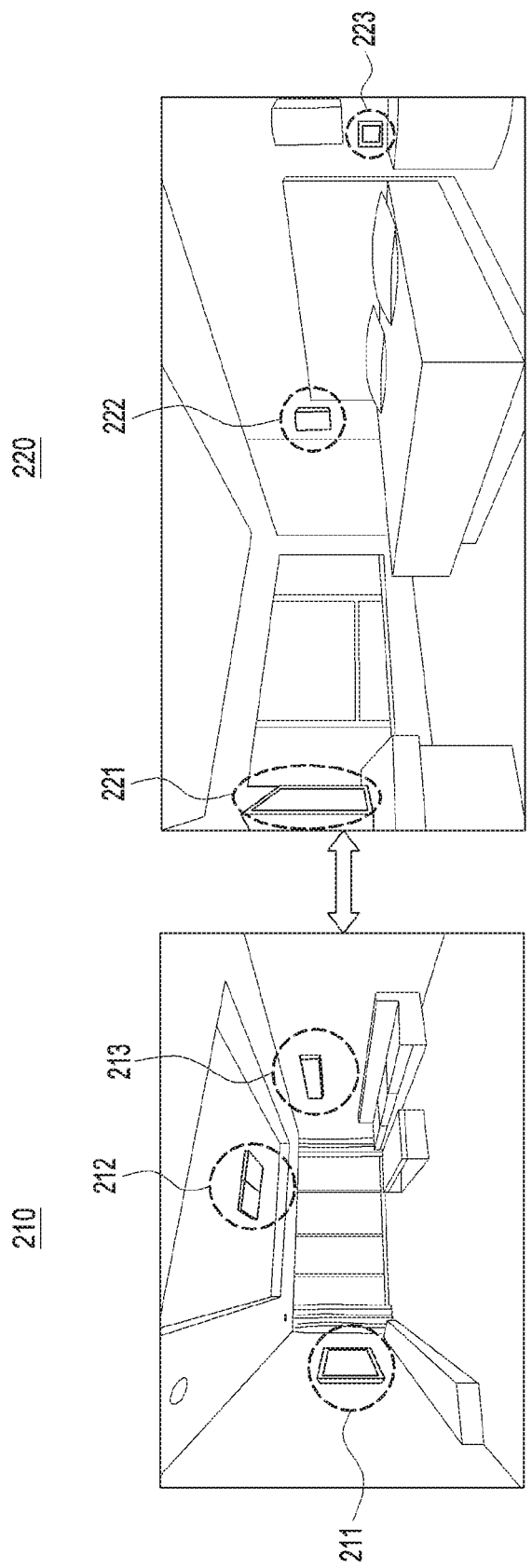
FIG. 2 is a view illustrating a method of controlling the attributes of electronic devices located in different places according to various embodiments of the present invention.

FIG. 2 is a view illustrating a method of controlling the attributes of electronic devices located in different places according to various embodiments of the present invention.

According to an embodiment, an electronic device (e.g., the electronic device 101 of FIG. 1) may be located in a first place 210 or a second place 220. The electronic device may be wiredly or wirelessly connected with various electronic devices (e.g., the electronic devices 102 and 104 of FIG. 1) located in the first place 210 or second place 220 and may communicate data. For example, the electronic device may be connected with at least one of a TV 211, a lamp 212, and an air conditioner 213 as one or more first electronic devices located in the first place 210 or at least one of a TV 221, a lamp 222, and a thermostat 223 as one or more second electronic devices located in the second place 220 and may communicate data with each electronic device.

According to an embodiment, the electronic device (e.g., the electronic device 101 of FIG. 1) may generate at least one mode set to control at least some electronic devices among one or more electronic devices located in a particular place. For example, the electronic device may generate a first mode to simultaneously control the respective attributes of the TV 211, lamp 212, and air conditioner 213 in the first place 210 according to designated attribute values. Control commands according to the generated first mode may include commands for powering on the TV 211, turning the TV 211 to channel 5, turning the TV 211 to volume 10, and setting the external input of the TV 211 to HDMI. The control commands according to the generated first mode may also include commands for powering on the lamp 212 and adjusting the dimmer function of the lamp 212 to set the brightness of the lamp to 40%. The control commands according to the generated first mode may include commands for powering on the air conditioner 213, setting the temperature of the air conditioner 213 to 28 Celsius degrees, setting the fan speed of the air conditioner 213 to low, and setting the air conditioner 213 to cooling mode. Meanwhile, the electronic device may store the first mode as "movie mode" based on an input received from the user.

According to an embodiment, the location of the electronic device (e.g., the electronic device 101 of FIG. 1) which has generated the first mode in the first place 210 may switch to the second place 220. In this case, the electronic device may identify at least one electronic device connectible with the electronic device among one or more second electronic devices located in the second place 220. Further, the electronic device may identify at least one electronic device compatible with one or more first electronic devices, which may perform the same or similar functions to the one or more first electronic devices located in the first place 210, among the one or more second electronic devices located in the second place 220.

According to another embodiment, the electronic device (e.g., the electronic device 101 of FIG. 1) may determine whether the at least one identified electronic device includes an electronic device compatible with electronic devices controlled according to a first mode. For example, the electronic device may determine whether the TV 221, lamp 222, and thermostat 223 in the second place 220 are compatible with the TV 211, lamp 212, and air conditioner 213 in the first place 210, controlled according to the first mode. Upon determining that the second electronic devices 221, 222, and 223 in the second place 220 are compatible with the first electronic devices 211, 212, and 213 in the first place 210 controlled according to the first mode, the electronic device may control the second electronic devices 221, 222, and 223 according to the first mode generated in the first place 210. For example, the electronic device may power on the TV 221 in the second place 220, turn the TV 221 to channel 5, turn the TV 221 to volume 10, and set the external input of the TV 221 to HDMI. Likewise, the electronic device may control the lamp 222 and thermostat 223 in the second place 220 as set in the first mode.

Meanwhile, although such an embodiment is described herein that the first mode generated in the first place 210 is applied to one or more electronic devices 221, 222, and 223, it will be easily appreciated by one of ordinary skill in the art that such an embodiment is also possible as to apply a second mode generated in the second place 220 to the one or more electronic devices 211, 212, and 213 in the first place 210. Further, the electronic device may be interpreted as meaning the server 108 of FIG. 1 in which case, the server 108 may obtain information about at least one of electronic devices (e.g., 211, 212, 213, 221, 222, and 223) in a particular place (e.g., 210 or 220) from a movable electronic device (e.g., the electronic device 101, 102 or 104 of FIG. 1) or a server controlling the electronic devices in the particular place, generate a mode based on at least one of the electronic devices (e.g., 211, 212, 213, 221, 222, and 223) and control at least one of the electronic devices (e.g., 211, 212, 213, 221, 222, and 223). Specific embodiments related thereto are described below in detail.

Figure 3:
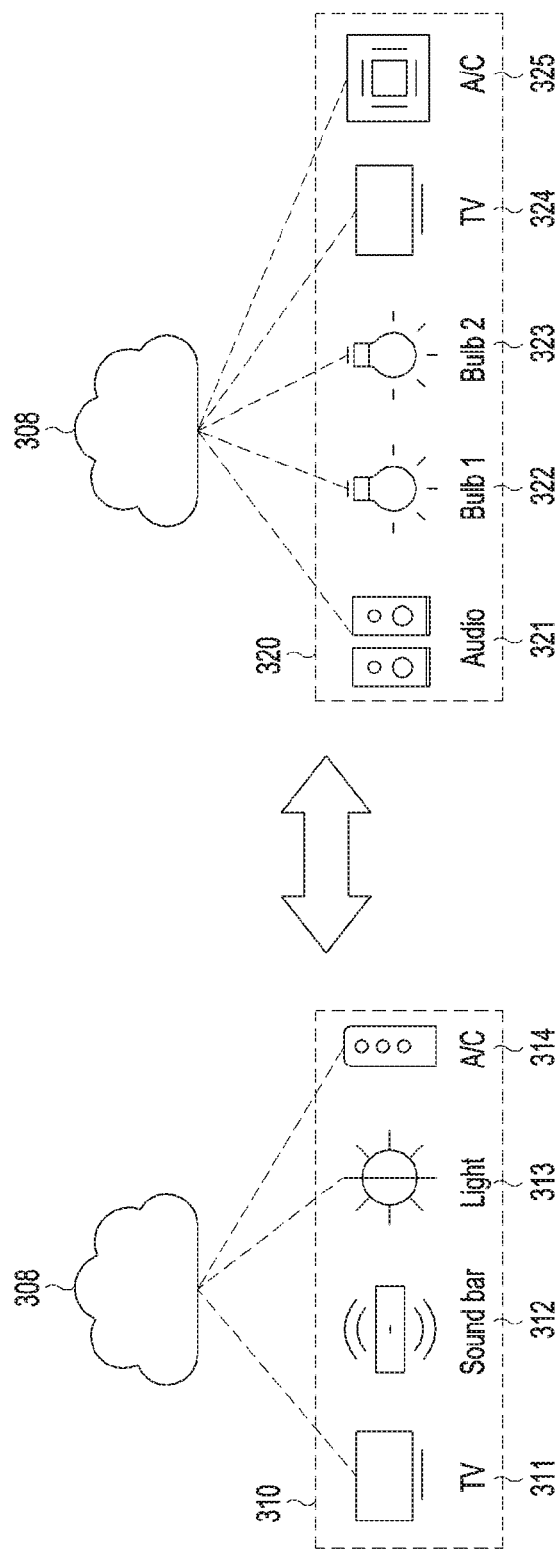
FIG. 3 is a view illustrating a method of comparing pieces of information about electronic devices located in different places by an electronic device according to various embodiments of the present invention.

FIG. 3 is a view illustrating a method of comparing pieces of information about electronic devices located in different places by an electronic device according to various embodiments of the present invention.

The entity of performing the method may be a processor of an electronic device including a communication circuit (e.g., the communication module 190 of FIG. 1), a memory (e.g., the memory 130 of FIG. 1), and the processor (e.g., the processor 120 of FIG. 1). Here, the electronic device may include a server (e.g., the server 108 of FIG. 1) or a movable terminal (e.g., the electronic device 101 of FIG. 1).

According to an embodiment, the server 308 (e.g., the server 108 of FIG. 1) may communicate with electronic devices located in the first place 310 or second place 320 over a network (e.g., the network 198 or 199 of FIG. 1). The server 308 may obtain information about at least one of one or more first electronic devices (e.g., 311, 312, 313, and 314) located in the first place 310 or at least one of one or more second electronic devices (e.g., 321, 322, 323, 324, and 325) located in the second place 320.

According to an embodiment, the server 308 may obtain first information about at least one of a TV 311, a sound bar 312, a lamp 313, and an air conditioner 314 located in the first place 310 or second information about at least one of an audio component 321, a lamp 322 or 323, a TV 324, and an air conditioner 325 located in the second place 320. The server 308 may receive the first information or second information directly from each electronic device or from an electronic device, system, or server controlling the electronic devices. The first information may include an identifier, attribute (or function), or attribute value for each of the TV 311, sound bar 312, lamp 313, and air conditioner 314. Further, the second information may include an identifier, attribute (or function), or attribute value for each of the audio component 321, lamp 322 or 323, TV 324, and air conditioner 325.

Here, the identifier is not limited to a particular one as long as it is information used to identify an electronic device and access the electronic device. For example, the identifier may include an IP address, a MAC address, or account information (ID) of the user of the electronic device.

Attribute may mean a function performed on the electronic device or an adjustable setting. For example, the attributes of the TV 311 or 324 may include power, channel, volume, and external input. The attributes of an audio device (e.g., the sound bar 312 or the audio component 321) may include power and volume. The attributes of a lighting device (e.g., the lamp 313 or bulb 322 or 323) may include power, brightness, and color. The attributes of a cooling/heating device (e.g., the air conditioner 314 or 325 and a thermostat (223 of FIG. 2)) may include power, temperature, fan speed, and mode (e.g., cooling mode or fan mode).

Attribute value may mean the degree or state of each attribute of the electronic device. For example, the attribute values of power may include On/Off. The attribute value of channel, volume, temperature, brightness, or fan speed may include data converted into a number. The attribute value of external input may include HDMI, DVI, PC, or USB. Further, the attribute value of fan speed may include high, medium, or low, and the attribute value of color may include code data resultant from matching various colors to numbers or letters.

Meanwhile, according to an embodiment, the server 308 may store, in the memory of the server 308, the first information obtained from the outside in association with information about the first place. Further, the server 308 may store, in the memory of the server 308, the obtained first information in association with information about the electronic device, system, or server that has provided the first information to the server 308. Further, the server 308 may store, in the memory of the server 308, the obtained first information in association with information about user account by which the server 308 has been logged in. Further, the server 308 may store, in the memory of the server 308, the obtained first information in association with information about the electronic device, system, or server that has provided the first information to the server 308.

For example, the server 308 may identify user A's account information in response to receiving a login request from user A's terminal (e.g., the electronic device 101 of FIG. 1) located in the first place 310 and authorize the terminal's access to the server 308. Upon receiving first information about first electronic devices (e.g., 311, 312, 313, and 314) located in the first place 310 via the terminal, the server 308 may store, in the memory, the first information in association with the account information of user A accessing the server 308.

Further, the server 308 may identify user A's account information in response to receiving a login request from user A's terminal (e.g., the electronic device 101 of FIG. 1) located in the second place 320 and authorize the terminal's access to the server 308. The server 308 may identify the first information pre-stored in the memory based on the account information of user A accessing the server 308. Upon receiving second information about second electronic devices (e.g., 321, 322, 323, 324, and 325) located in the second place 320 via the terminal, the server 308 may store, in the memory, the second information in association with the account information of user A accessing the server 308.

According to an embodiment, the server 308 may compare the received second information with the first information pre-stored in the memory in response to receiving the second information from the outside. The server 308 may compare the respective attributes (or attribute values) of the first electronic devices (e.g., 311, 312, 313, and 314) included in the first information with the respective attributes (or attribute values) of the second electronic devices (e.g., 321, 322, 323, 324, and 325) included in the second information. For example, the server 308 may determine that the TV 311 in the first place 310 is compatible with the TV 324 in the second place 320 based on a result of comparison between the attribute of the TV 311 included in the first information and the respective attributes of the second electronic devices (e.g., 321, 322, 323, 324, and 325) included in the second information.

Meanwhile, the sound bar 312 is shown different from the other electronic devices in FIG. 3, which may be interpreted as indicating an electronic device powered-off or unable to communicate over network. Further, it will be easily appreciated by one of ordinary skill in the art that the above embodiments are provided for a better understanding, and the identifiers, attributes, and attribute values are not limited thereto. For example, each attribute or attribute value may mean the resource type and enumeration value of the open connectivity foundation (OCF) standards defined in the Internet-of-things (IoT) standardization organizations or data generated by processing data defined in the OCF standards.

Figure 4:
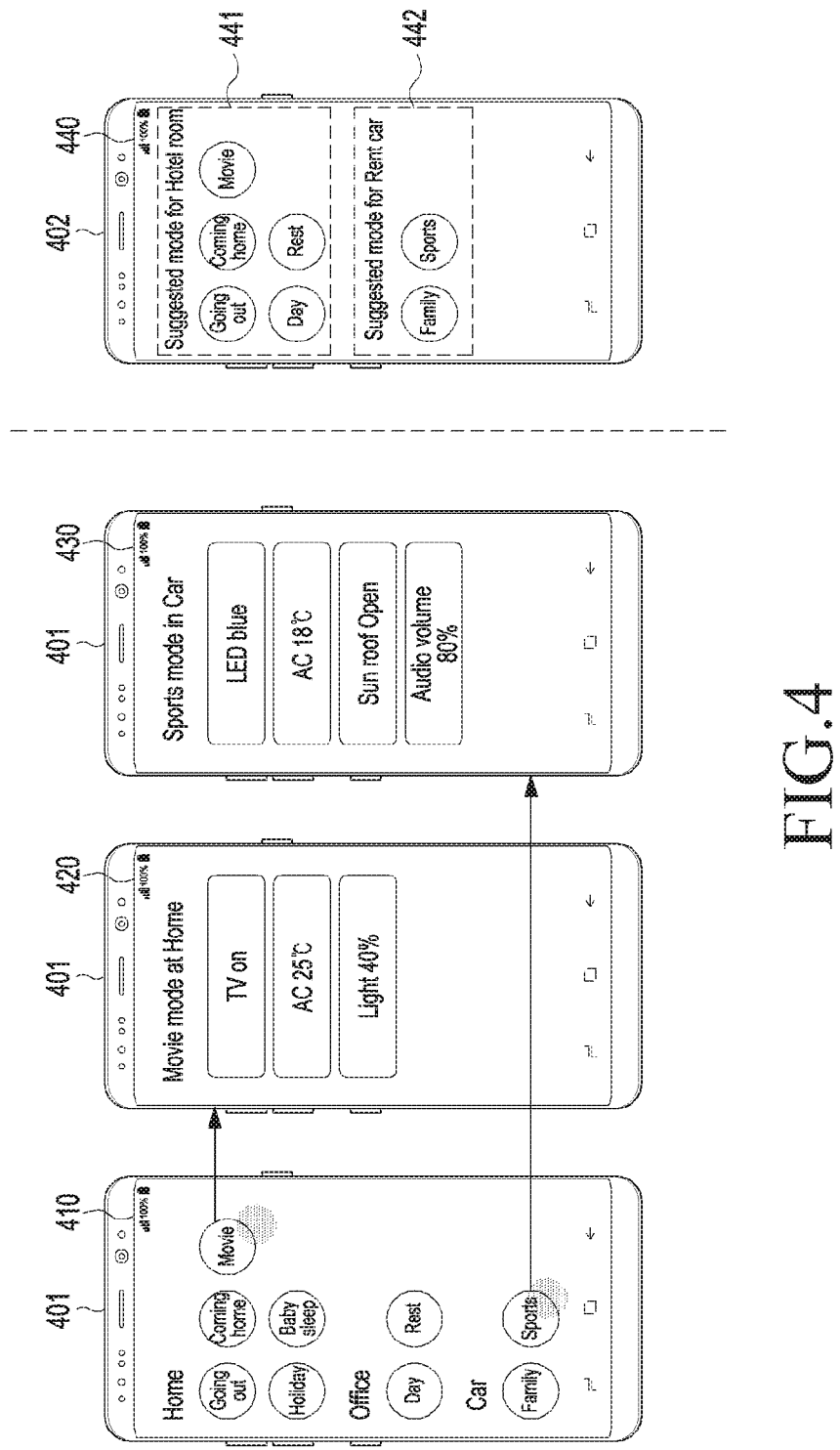
FIG. 4 is a view illustrating a method of generating and using a mode set to control at least some of electronic devices located in a specific place according to various embodiments of the present invention.

FIG. 4 is a view illustrating a method of generating and using a mode set to control at least some of electronic devices located in a specific place according to various embodiments of the present invention.

The entity of performing the method may be a processor of an electronic device 401 including a communication circuit (e.g., the communication module 190 of FIG. 1), a memory (e.g., the memory 130 of FIG. 1), and the processor (e.g., the processor 120 of FIG. 1). Meanwhile, at least part of the method may be performed by a processor of a server (e.g., the server 108 of FIG. 1) connected with the electronic device 401 over a network.

According to an embodiment, the electronic device 401 may be connected with one or more electronic devices located in a particular place over a network (e.g., the network 198 or 199 of FIG. 1) and may control the connected electronic devices. Further, the electronic device 401 may generate at least one mode set to control at least some of one or more electronic devices located in a particular place. In relation thereto, FIG. 4 illustrates a user interface 410 for providing the user with at least one mode generated by the electronic device 401.

As shown in the user interface 410, the electronic device 401 may generate at least one mode set to control at least some of one or more electronic devices located in a particular place based on an input received from the user. For example, the electronic device 401 may generate, as at least one mode set to control at least some of one or more electronic devices located in a home, as preset by the user, "going out mode," "coming home mode," "movie mode," "holiday mode," and "baby sleep mode." For example, the electronic device 401 may generate "day mode" and "rest mode" as at least one mode set to control at least some of one or more electronic devices located in an office as preset by the user. Further, the electronic device 401 may generate "family mode" and "sports mode" as at least one mode set to control at least some of one or more electronic devices located in a car as preset by the user.

According to an embodiment, upon receiving a request for executing at least one mode, the electronic device 401 may simultaneously control one or more electronic devices set to be controlled according to at least one mode. For example, upon receiving a request for executing "move mode," the electronic device 401 may display a user interface 420 on a display (e.g., the display device 160 of FIG. 1). Further, the electronic device 401 may adjust the attributes (or functions) of the TV, air conditioner, and lamp set to be controlled according to "movie mode." Referring to the user interface 420, the "movie mode" may be a mode set to power on the TV in the home, set the temperature of the air conditioner in the home to 25 Celsius degrees, and set the brightness of the lamp in the home to 40%. Further, upon receiving a request for executing "sports mode," the electronic device 401 may display a user interface 430 on a display (e.g., the display device 160 of FIG. 1). Further, the electronic device 401 may adjust the attributes of the LED, air conditioner, sunroof, and audio component set to be controlled according to "sports mode." Referring to the user interface 430, "sports mode" may be a mode set to set the LED of the car to blue, set the temperature of the air conditioner in the car to 18° C., open the sunroof of the car, and set the volume of the audio component in the car to 80%.

According to an embodiment, the electronic device 401 may access a server (e.g., the server 108 of FIG. 1) using user A's account information. The electronic device 401 may transfer first information about at least one mode stored in the electronic device 401 to the server. Further, the electronic device 401 may transfer second information about one or more electronic devices located around the electronic device 401, e.g., a first place (e.g., in a home or office or a car) or connected with the electronic device 401, to the server. Upon receiving the first information or second information from the electronic device 401 accessing using user A's account information, the server may store the received first information or second information, in association with user A's account information, in the memory of the server.

Meanwhile, the electronic device 402 of FIG. 4 may mean an electronic device located in a new second place (e.g., in a hotel room or rental car), not in the first place (e.g., in a home or office or car) corresponding to at least one mode stored in the electronic device 401. For example, the electronic device 402 may mean an electronic device located in a hotel room or rental car. According to another embodiment, the electronic device 402 may denote the state in which the electronic device 401 used to be in the first place has moved to the second place, and the electronic device 402 may be the same electronic device as the electronic device 402.

According to an embodiment, the electronic device 402 may access a server (e.g., the server 108 of FIG. 1) using user A's account information. The electronic device 402 may transfer third information about at least one mode stored in the electronic device 402 to the server. Further, the electronic device 402 may transfer fourth information about one or more electronic devices located around the electronic device 402, e.g., the second place or connected with the electronic device 402, to the server. Upon receiving the third information or fourth information from the electronic device 402 accessing using user A's account information, the server may store the received third information or fourth information, in association with user A's account information, in the memory of the server.

When the electronic device 402 accesses using user A's account information, the server may identify the first information about at least one mode pre-stored in the memory of the server in association with user A's account information or the second information about one or more electronic devices. Further, the server may compare the identified first information or second information with third information or fourth information received from the electronic device 402.

The server may select a mode available in the second place (e.g., in a hotel room or rental car) among at least one mode generated in the first place (e.g., in a home, office, or car) by the electronic device 401, based on a result of the comparison. Further, based on the result of comparison, the server may select an electronic device compatible with at least one electronic device located in the second place (e.g., in a hotel room or rental car) among one or more electronic devices located in the first place (e.g., in a home, office, or car).

The server may transfer information related to the selected electronic device or selected mode to the electronic device 402. The electronic device 402 may display, on the display of the electronic device 402, a user interface 440 including the information related to the selected electronic device or mode selected by the server.

According to an embodiment, if the electronic device 402 located in a hotel room accesses the server using user A's account information, the server may select "going out mode," "coming home mode," "movie mode," "day mode," and "rest mode" determined to be available in the hotel room based on the first information or second information stored in the memory of the server and the third information or fourth information received from the electronic device 402. Subsequently, the server may transfer information related to "going out mode," "coming home mode," "movie mode," "day mode," and "rest mode" selected to the electronic device 402.

For example, the electronic device 402 located in the hotel room may control at least one electronic device located in the hotel room using information received from the server. For example, according to "movie mode" received, the electronic device 402 may power on the TV located in the hotel room, set the temperature of the air conditioner located in the hotel room to 25° C., and set the brightness of the lamp located in the hotel room to 40%.

Or, the electronic device 402 may display, on the display of the electronic device 402, a user interface 441 including "going out mode," "coming home mode," "movie mode," "day mode," and "rest mode" received.

According to another embodiment, if the electronic device 402 located in a rental car accesses the server using user A's account information, the server may select "family mode" and "sports mode" determined to be available in the rental car based on the first information or second information stored in the memory of the server and the third information or fourth information received from the electronic device 402. Further, the server may transfer information related to "family mode" and "sports mode" selected to the electronic device 402.

For example, the electronic device 402 located in the rental car may control at least one electronic device located in the rental car using information received from the server. For example, according to the "sports mode" received, the electronic device 402 may set the LED of the rental car to blue, set the temperature of the air conditioner in the rental car to 18° C., open the sunroof located in the rental car, and set the volume of the audio component located in the rental car to 80%.

Further, the electronic device 402 may display, on the display of the electronic device 402, a user interface 442 including "family mode" and "sports mode" received.

According to an embodiment, upon generating at least one mode, the electronic device 402 may apply different weights (or priorities) to a plurality of electronic devices included in at least one mode. For example, the most important electronic device in "movie mode" may be a display (e.g., the display device 160 of FIG. 1) capable of displaying movie content, and the next important electronic device may be a lighting device. Thus, upon generating "movie mode," the electronic device 402 may assign the highest weight to the display (or TV) or lighting device among the plurality of electronic devices that may be included in the "movie mode."

According to another embodiment, upon searching for or selecting at least one mode, the electronic device 402 may determine the highest-priority electronic device among the plurality of electronic devices included in at least one mode based on information about the at least one mode. In other words, the electronic device 402 may identify the highest-priority electronic device among the plurality of electronic devices included in the at least one mode, based on the names of the at least one mode. For example, when the "movie mode" is obtained from the outside, the electronic device 402 may expect that the display and lighting device have higher priority based on the keyword "movie." Among the plurality of electronic devices included in the at least one mode, example electronic devices expected to have higher priority are shown in the following table.

TABLE 1

| Keywords in the mode | Higher-priority devices | Higher-priority attributes |
| --- | --- | --- |
| movie, watching, theater, . . . | display lighting | power power/dimmer function |
| TV, watching TV, . . . | TV | channel |
| pleasant, cool, air conditioner, turn on air conditioner, . . . | air conditioner air purifier | power/temperature power |
| workout, exciting workout, pleasant workout, . . . | air conditioner speaker | power/temperature volume |
| study, reading a book, don't disturb, quiet, . . . | lighting speaker smartphone | power/dimmer function volume mode (airplane mode, etc.) |
| . . . | . . . | . . . |

As shown in Table 1 above, for the keyword "workout" or in at least one mode where "workout"-related information is identified, the air conditioner and speaker may be set to have higher priorities. As such, different weights assigned to the plurality of electronic devices may be pre-determined by the user and may be updated based on data accumulated via machine learning.

Meanwhile, the electronic device assigned a higher weight among the plurality of electronic devices included in a particular mode may be used as a variable when the server or electronic device compares electronic devices located in different places or selects at least one mode. For example, when no display or lighting device is discovered in the second place upon controlling one or more electronic devices located in the second place according to the "movie mode" generated in the first place, the server or electronic device may determine that the "movie mode" is unavailable in the second place. In contrast, although the other electronic devices than the display and lighting device are not discovered in the second place among the plurality of electronic devices included in the "movie mode" upon controlling one or more electronic devices located in the second place according to the "movie mode" generated in the first place, if at least the display and lighting device are discovered in the second place, the server or electronic device may determine that the "movie mode" is available in the second PLMN.

According to the present invention, the user interface or various modes are not limited to the above-described embodiments but various modifications may be made thereto.

Figure 5:
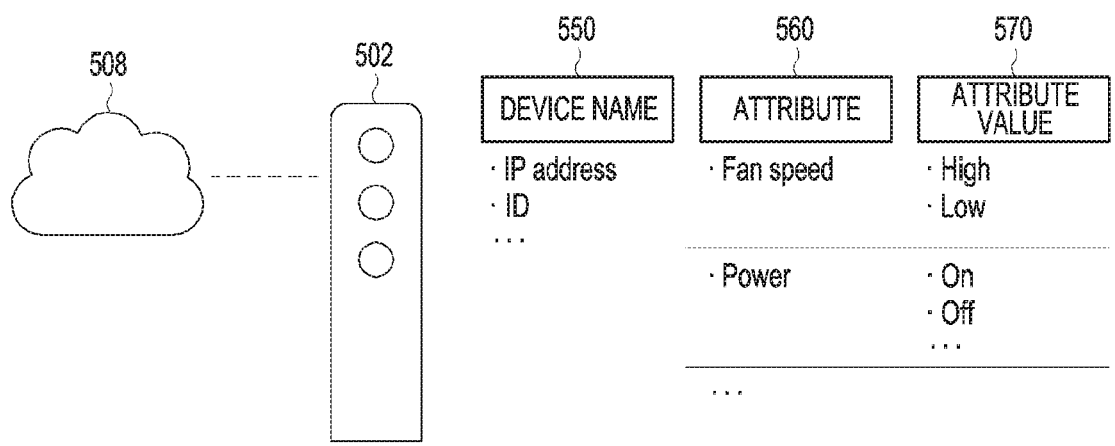
FIG. 5 is a view illustrating content that may be included in information about at least one electronic device among electronic devices located in a particular place according to various embodiments of the present invention.

FIG. 5 is a view illustrating content that may be included in information about at least one electronic device among electronic devices located in a particular place according to various embodiments of the present invention.

According to an embodiment, an electronic device 508 (e.g., the electronic device 101 or server 108 of FIG. 1) may obtain information about one or more electronic devices located in a particular place and store the obtained information in a memory (e.g., the memory 130 of FIG. 1) of the electronic device 508.

For example, the electronic device 508 may obtain information about an air conditioner 502 located in a first place. The electronic device 508 may obtain the information via the air conditioner 502 connected through a network (e.g., the network 198 or 199 of FIG. 1) and may also obtain the information via another electronic device (e.g., the electronic device 102 or 104 of FIG. 1) that has the information about the air conditioner 502.

Information about one or more electronic devices located in the particular place may include the respective device names (or identifiers) 550, attributes (or functions) 560, or attribute values 570 of the one or more electronic devices.

The device name 550 of the air conditioner 502 is information for distinguishing the air conditioner 520 from other electronic devices and is not limited to specific information as long as it is used to specify the air conditioner 502 as a control target. For example, the device name 550 may include, e.g., the IP address used to access the air conditioner 502, or user account information (e.g., ID) or product information about the air conditioner 502 for controlling the air conditioner 502.

The attribute 560 of the air conditioner 502 may mean the attribute or function of the air conditioner 502 adjustable by the user. For example, the attribute 560 may include, e.g., fan speed, power, or mode.

The attribute value 570 of the air conditioner 502 may mean the degree or quantified data for one or more attributes 560. For example, the attribute value for fan speed may include high or low. Further, the attribute value for power may include On/Off.

According to an embodiment, each attribute 560 or attribute value 570 may mean the resource type and enumeration value of the open connectivity foundation (OCF) standards defined in the Internet-of-things (IoT) standardization organizations or data generated by processing data defined in the OCF standards.

Figure 6:
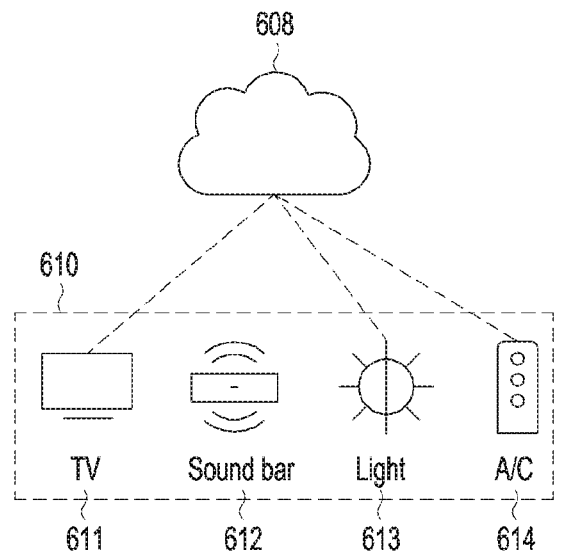
FIG. 6 is a view illustrating a method of generating at least one mode set to control at least some of electronic devices located in a particular place by an electronic device according to various embodiments of the present invention.
Figure 6:
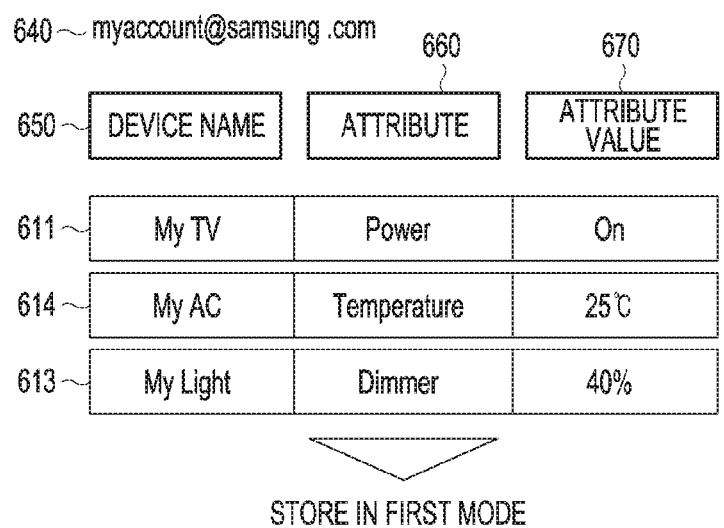

FIG. 6 is a view illustrating a method of generating at least one mode set to control at least some of electronic devices located in a particular place by an electronic device according to various embodiments of the present invention.

The entity of performing the method may be a processor of an electronic device 608 including a communication circuit (e.g., the communication module 190 of FIG. 1), a memory (e.g., the memory 130 of FIG. 1), and the processor (e.g., the processor 120 of FIG. 1).

According to an embodiment, an electronic device 608 (e.g., the electronic device 101 or server 108 of FIG. 1) may obtain information about one or more electronic devices (e.g., 611, 612, 613, and 614) located in a particular place 610 and store the obtained information in a memory (e.g., the memory 130 of FIG. 1) of the electronic device 608.

For example, the TV 611, sound bar 612, lamp 613, and air conditioner 614 connectible with the electronic device 608 may be present in the particular place 610. Referring to FIG. 6, the TV 611, lamp 613, and air conditioner 614 may be connected with the electronic device 608 via a network (e.g., the network 198 or 199 of FIG. 1), and the sound bar 612 may not be connected with the electronic device 608 via the network due to, e.g., power-off.

The electronic device 608 may be connected to a server via the user account 640 and may be operated based on the user account 640. In this case, various operations of the electronic device 608 may be performed in association with the user account 640. Further, various data generated by the electronic device 608 may be stored in the memory in association with the user account 640.

According to an embodiment, the electronic device 608 may generate a mode set to control at least some of one or more electronic devices (e.g., 611, 612, 613, and 614) located in the particular place 610. For example, the electronic device 608 may select the TV 611, lamp 613, and air conditioner 614 as electronic devices controlled according to the first mode, according to an input received from the user.

The electronic device 608 may set the device name 650 of the TV 611 to "MyTV." Further, the electronic device 608 may select power as the attribute 660 controlled according to the first mode among the attributes of the TV 611. Further, the electronic device 608 may set the attribute value 670 for power selected as the attribute 660 controlled according to the first mode as On.

The electronic device 608 may set the device name 650 of the lamp 613 to "MyLight". Further, the electronic device 608 may select the dimmer function as the attribute 660 controlled according to the first mode among the attributes of the lamp 613. Further, the electronic device 608 may set the attribute value 670 for the dimmer function selected as the attribute 660 controlled according to the first mode as 40%.

The electronic device 608 may set the device name 650 of the air conditioner 614 to "MyAC". Further, the electronic device 608 may select temperature as the attribute 660 controlled according to the first mode among the attributes of the air conditioner 614. Further, the electronic device 608 may set the attribute value 670 for temperature selected as the attribute 660 controlled according to the first mode as 25° C.

According to an embodiment, the electronic device 608 may store the generated first mode in the memory of the electronic device 608 in association with the user account 640. Further, in response to a request for executing the first mode, the electronic device 608 may simultaneously control the TV 611, lamp 613, and air conditioner 614 set to be controlled according to the first mode according to the selected attribute 660 and attribute value 670.

Figure 7:
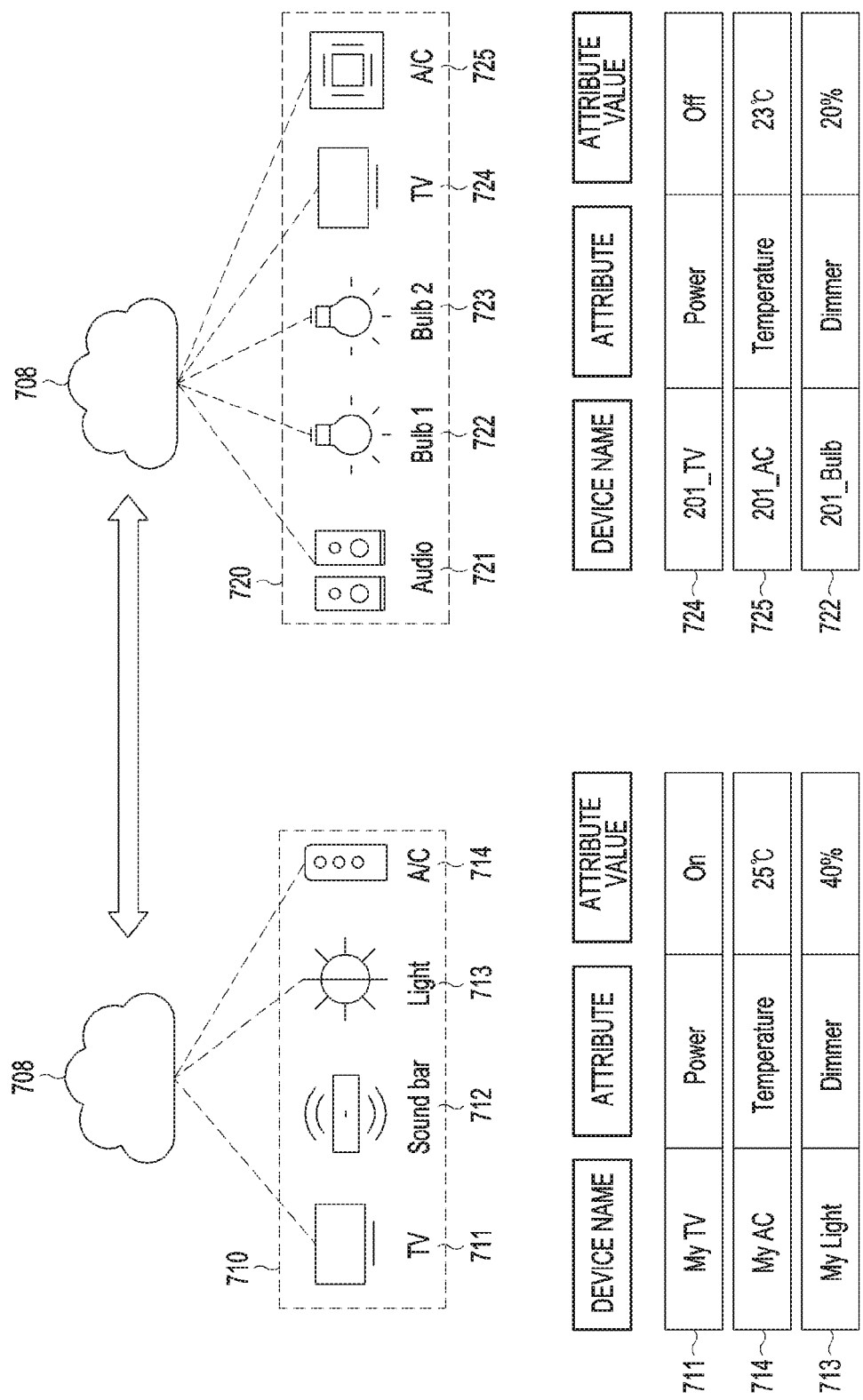
FIG. 7 is a view illustrating a method of identifying a correlation between modes generated based on different places by an electronic device according to various embodiments of the present invention.

FIG. 7 is a view illustrating a method of identifying a correlation between modes generated based on different places by an electronic device according to various embodiments of the present invention.

The entity of performing the method may be a processor of an electronic device 708 (e.g., the electronic device 101 or server 108 of FIG. 1) including a communication circuit (e.g., the communication module 190 of FIG. 1), a memory (e.g., the memory 130 of FIG. 1), and the processor (e.g., the processor 120 of FIG. 1).

According to an embodiment, the electronic device 708 may be connected with one or more first electronic devices 711, 712, 713, and 714 located in a first place 710 over a network (e.g., the network 198 or 199 of FIG. 1). According to an embodiment, the electronic device 708 may be connected with one or more second electronic devices 721, 722, 723, 724, and 725 located in a second place 720 over the network.

The electronic device 708 may store, in the memory of the electronic device 708, information related to a first mode set to control at least some of the one or more first electronic devices 711, 712, 713, and 714 located in the first place 710. Further, the electronic device 708 may store, in the memory of the electronic device 708, information related to a second mode set to control at least some of the one or more second electronic devices 721, 722, 723, 724, and 725 located in the second place 720.

For example, the first mode may be a mode set to control the TV 711, lamp 713, and air conditioner 714 located in the first place 710. Upon receiving a request for executing the first mode, with the one or more first electronic devices 711, 712, 713, and 714 located in the first place 710 connected thereto, the electronic device 708 may power on the TV 711, set the brightness of the lamp 713 to 40%, and set the temperature of the air conditioner 714 to 25° C.

The second mode may be a mode set to control the TV 724, lamp 722, and air conditioner 725 located in the second place 720. Upon receiving a request for executing the second mode, with the one or more second electronic devices 721, 722, 723, 724, and 725 located in the second place 720 connected thereto, the electronic device 708 may power off the TV 724, set the brightness of the lamp 722 to 20%, and set the temperature of the air conditioner 725 to 23° C.

According to an embodiment, the electronic device 708 may determine whether the modes generated in the different places are compatible with each other. To that end, the electronic device 708 may first determine whether the electronic devices included in the modes are compatible with each other. For example, the electronic device 708 may determine whether the TV 711 in the first place 710 is compatible with the TV 724 in the second place 720. The electronic device 708 may compare the first attribute of the TV 711 with the second attribute of the TV 724 and the, if the matching rate between the first attribute and the second attribute is a preset value or more, determine that the TV 711 in the first place 710 is compatible with the TV 724 in the second place 720. Then, upon determining that the TV 711, lamp 713, and air conditioner 714 which are electronic devices controlled according to the first mode are compatible with the TV 724, lamp 722, and air conditioner 725 which are electronic devices controlled according to the second mode, the electronic device 708 may determine that the first mode and the second mode are compatible with each other.

According to an embodiment, the electronic device 708 may generate the first mode in the first place 710. Further, the electronic device 708 may store the generated first mode in the memory of the electronic device 708 or the memory of another electronic device (e.g., the electronic device 102 or 104 or server 108 of FIG. 1). Meanwhile, upon determining that the electronic device 708 is located in the second place 720, the electronic device 708 may identify whether one or more second electronic devices 721, 722, 723, 724, and 725 located in the second place 720 include an electronic device controllable according to the first mode. Further, upon determining that the electronic device 708 is located in the second place 720, the electronic device 708 may identify whether the modes generated in the second place 720 include a mode compatible with the first mode. Upon determining that the TV 724, lamp 722, and air conditioner 725 in the second place 720 may be controlled according to the first mode, the electronic device 708 may recommend the first mode to the user of the electronic device 708. Further, upon determining that the second mode generated in the second place 720 is compatible with the first mode, the electronic device 708 may recommend the first mode or second mode to the user of the electronic device 708.

Figure 8:
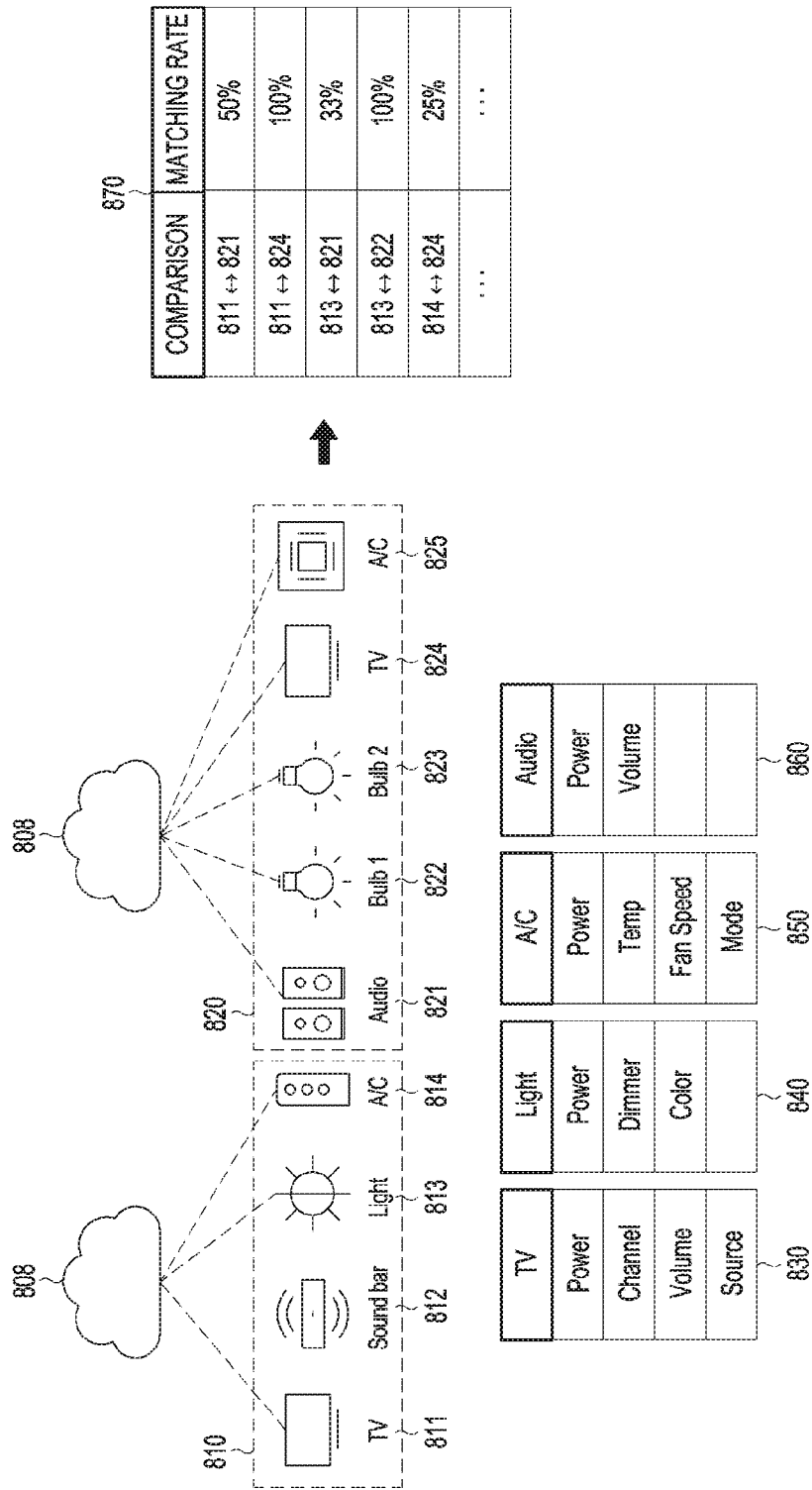
FIG. 8 is a view illustrating a method of identifying the degree of matching different electronic devices according to various embodiments of the present invention.

FIG. 8 is a view illustrating a method of identifying the degree of matching different electronic devices according to various embodiments of the present invention.

The entity of performing the method may be a processor of an electronic device 808 (e.g., the electronic device 101 or server 108 of FIG. 1) including a communication circuit (e.g., the communication module 190 of FIG. 1), a memory (e.g., the memory 130 of FIG. 1), and the processor (e.g., the processor 120 of FIG. 1).

According to an embodiment, the electronic device 808 may be connected with one or more first electronic devices 811, 812, 813, and 814 located in a first place 810 over a network (e.g., the network 198 or 199 of FIG. 1). According to an embodiment, the electronic device 808 may be connected with one or more second electronic devices 821, 822, 823, 824, and 825 located in a second place 820 over the network.

Further, the electronic device 808 may identify the respective attributes and attribute values of one or more first electronic devices 811, 812, 813, and 814 or one or more second electronic devices 821, 822, 823, 824, and 825. For example, the electronic device 808 may identify power, channel, volume, and external input as the attributes 830 for the TV 811 in the first place 810 and the TV 824 in the second place 820. Further, the electronic device 808 may identify power and volume as the attributes 860 for the sound bar 812 in the first place 810 and the audio component 821 in the second place 820. Further, the electronic device 808 may identify power, dimmer, and color as the attributes 840 for the lamp 813 in the first place 810 and the lamps 822 and 823 in the second place 820. Further, the electronic device 808 may identify power, temperature, fan speed, and mode (e.g., cooling mode, fan mode, etc.) as the attributes 850 for the air conditioner 814 in the first place 810 and the air conditioner 825 in the second place 820.

According to an embodiment, the electronic device 808 may compare the respective attributes and attribute values of one or more first electronic devices 811, 812, 813, and 814 with the respective attributes and attribute values of one or more second electronic devices 821, 822, 823, 824, and 825. For example, as a result of comparison between the attributes of the TV 811 in the first place 810 and the attributes of the audio component 821 in the second place 820, the electronic device 808 may determine that the matching rate between the two electronic devices is 50%. In other words, based on power and volume, among the attributes of the TV 811 in the first place 810, being identified from the attributes of the audio component 821 in the second place 820, the electronic device 808 may determine that 50% of the attributes of the TV 811 match the attributes of the audio component 821. By such a method, the electronic device 808 may determine that the matching rate between the TV 811 and the TV 824 is 100%, the matching rate between the lamp 813 and the audio component 821 is 33%, the matching rate between the lamp 813 and the bulb 822 is 100%, and the matching rate between the air conditioner 814 and the TV 824 is 25%. The table 870 of FIG. 8 shows the results of calculation of matching rates for the electronic devices.

Figure 9:
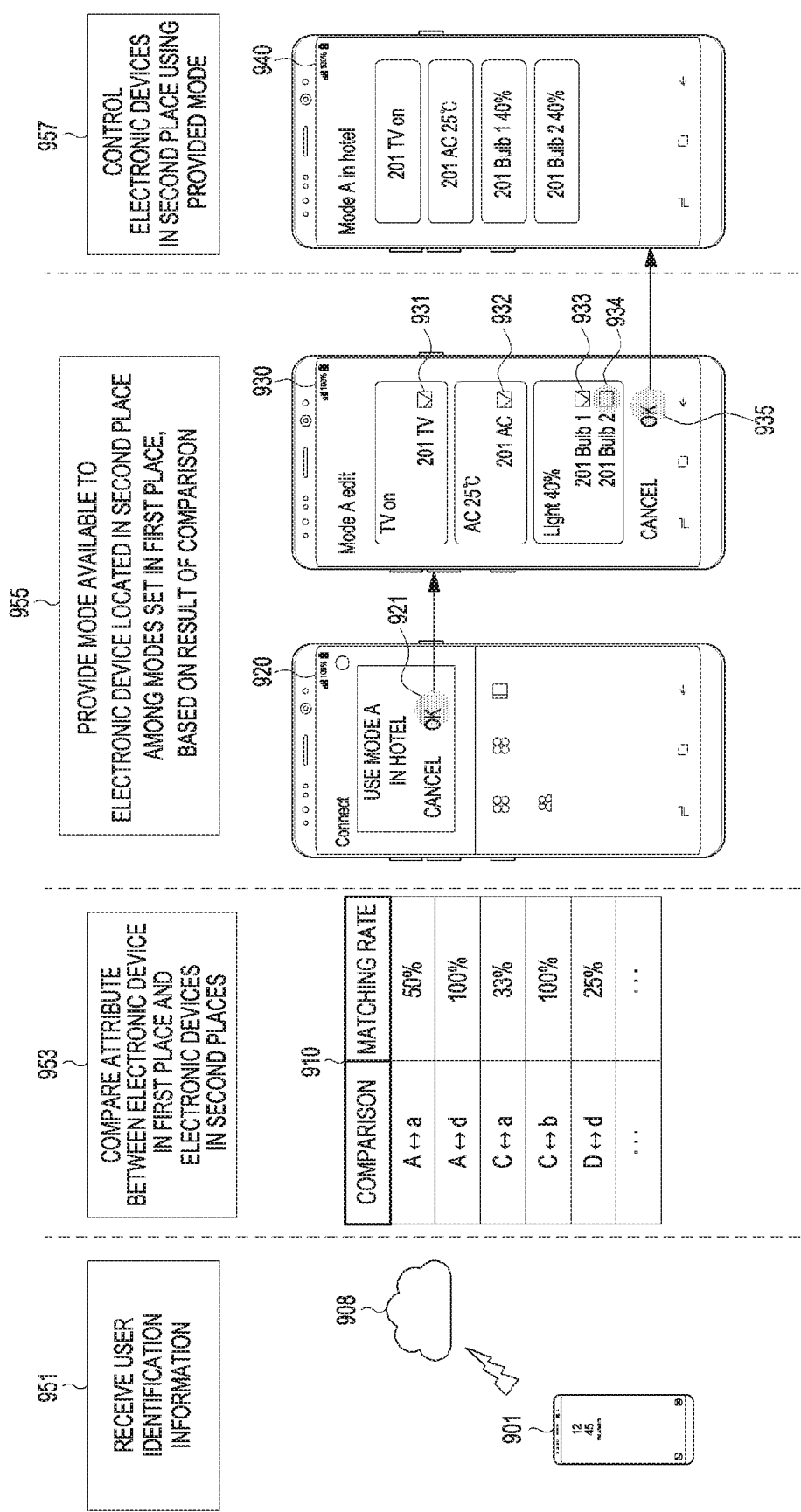
FIG. 9 is a view illustrating a procedure of providing a mode set to control at least some of electronic devices located in a particular place by an electronic device according to various embodiments of the present invention.

FIG. 9 is a view illustrating a procedure of providing a mode set to control at least some of electronic devices located in a particular place by an electronic device according to various embodiments of the present invention.

According to an embodiment, in operation 951, a server 908 (e.g., the server 108 of FIG. 1) may receive user identification information from an electronic device 901 (e.g., the electronic device 101 of FIG. 1). The user identification information, as information necessary upon accessing the server 908, may mean the user's account. The server 908 may obtain information about one or more first electronic devices connectible with the electronic device 901 and located in a first place from the electronic device 901 located in the first place. The server 908 may store the obtained information about the one or more first electronic device, in association with the user identification information, in the memory of the server 908.

In operation 953, the server 908 may compare the attributes of one or more first electronic devices in the first place and the attributes of one or more second electronic devices in the second place. According to an embodiment, the attributes for the one or more first electronic devices in the first place may be information pre-stored in the memory of the server 908 in association with the received user identification information. Upon receiving the user identification information from the electronic device 901 located in the second place or other electronic device (e.g., the electronic device 102 or 104 of FIG. 1), the server 908 may identify information about the one or more first electronic devices pre-stored in the memory. Further, the server 908 may obtain information about one or more second electronic devices connectible with the electronic device 901 or other electronic device and located in the second place from the electronic device 901 or the other electronic device located in the second place. Subsequently, the server 908 may compare the attributes of the one or more first electronic devices stored in the memory and the obtained attributes of the one or more second electronic devices and obtain the results of comparison as shown in Table 910.

In operation 955, the server 908 may provide a mode available to the electronic device located in the second place among modes preset in the first place, based on the results of comparison. Information about the provided mode may be transferred to the electronic device 901 or other electronic device (e.g., the electronic device 102 or 104 of FIG. 1). Upon determining that the electronic device 901 or other electronic device is located in a hotel room, the electronic device 901 or other electronic device may display a user interface 920 for recommending "Mode A" to the user on the display (e.g., the display 130 of FIG. 1), based on the mode information provided from the server 908. Upon receiving an input 921 related to executing recommended "Mode A" from the user, the electronic device 901 or other electronic device may display a user interface 930 where "Mode A" is editable on the display. The user interface 930 may include information related to at least one electronic device determined to be controllable by "Mode A" among the electronic devices located in the hotel room and contents 931, 932, 933, and 934 for determining whether to select at least one electronic device. For example, upon receiving the user's input on the content 931, the electronic device 901 or other electronic device may include the setting of turning on the TV in the hotel room in "Mode A." Further, upon receiving the user's input 935 corresponding to the edit completion of "Mode A," the electronic device 901 or other electronic device may perform operation 957.

In operation 957, the electronic device 901 or other electronic device may control electronic devices in the second place using the provided mode. For example, the electronic device 901 or other electronic device may turn on the TV in the hotel room, set the temperature of the air conditioner in the hotel room to 25° C., set the brightness of a first bulb in the hotel room to 40%, and set the brightness of a second bulb in the hotel room to 40%. Further, the electronic device 901 or other electronic device may display "Mode" edit-completed on the display, as the user interface 940.

Figure 10:
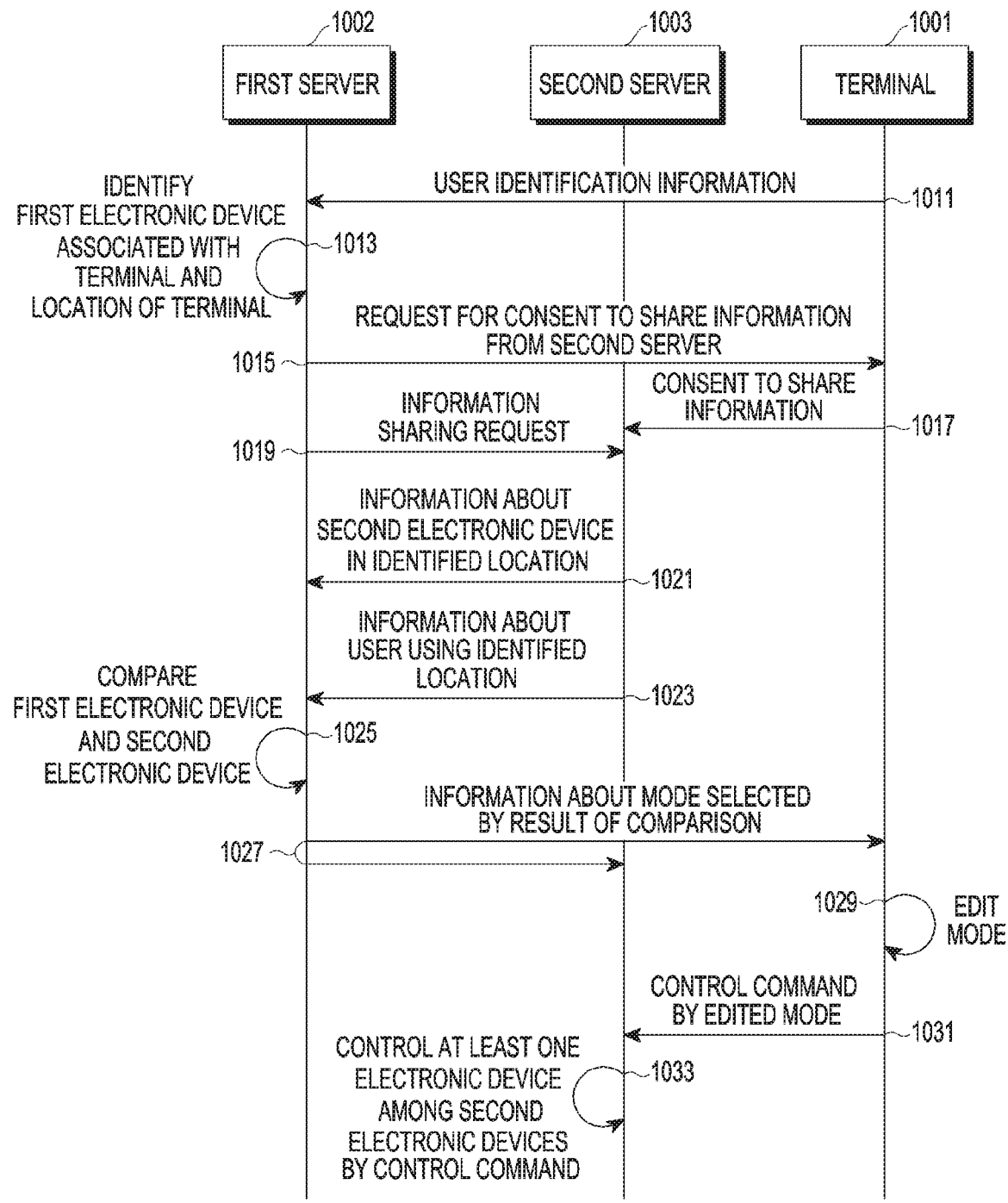
FIGS. 10 and 11 are flowcharts illustrating information communicated between electronic devices to obtain an authority for controlling at least some of electronic devices located in a particular place according to various embodiments of the present invention.
Figure 11:
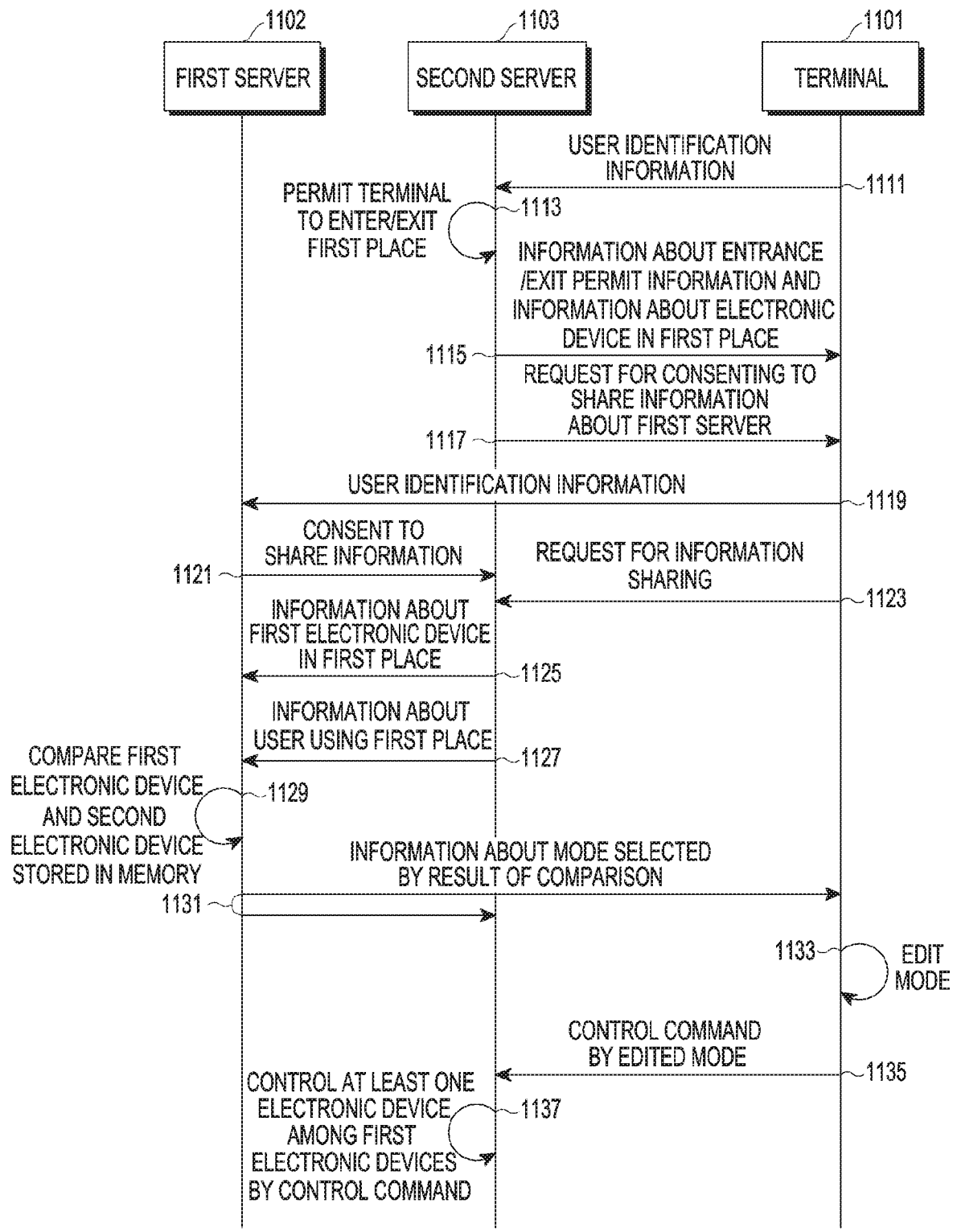

FIGS. 10 and 11 are flowcharts illustrating information communicated between electronic devices to obtain an authority for controlling at least some of electronic devices located in a particular place according to various embodiments of the present invention.

According to an embodiment, a first server 1002 or 1102 may obtain first information about one or more first electronic devices located in a first place and information about at least one mode set to control at least some of the one or more first electronic devices from a terminal 1001 or 1101. Further, the first server 1002 or 1102 may store, in the memory of the first server 1002 or 1102, the obtained first information and information about at least one mode in association with user identification information. Thereafter, if the terminal 1001 or 1101 is relocated to a second location, the first server 1002 or 1102, second server 1003 or 1103, and terminal 1001 or 1101 may perform operations 1011 to 1033 of FIG. 10 or operations 1111 to 1137 of FIG. 11.

Here, the first server 1002 or 1102 (e.g., the server 108 of FIG. 1) may store, compare, and manage information about various electronic devices received from the second server 1003 or 1103 or the terminal 1001 or 1101. Further, the second server 1003 or 1103 (e.g., the server 108 of FIG. 1) may control and manage one or more electronic devices located in the second place. The terminal 1001 or 1101 (e.g., the electronic device 101 of FIG. 1) may be an electronic device used for the user to access the server 1002 or 1102 or the server 1003 or 1103 and, after connected with one or more electronic devices around the terminal 1001 or 1101 over a network (e.g., the network 198 or 199 of FIG. 1), may control the one or more connected electronic devices.

According to the embodiment of FIG. 10, in operation 1011, the first server 1002 may receive user identification information from the terminal 1001 located in the second place. For example, in response to receiving a request for accessing the first server 1002 from the user of the terminal 1001, the terminal 1001 may transfer user account information input by the user to the first server 1002.

In operation 1013, the first server 1002 may identify the location of the first electronic device associated with the terminal 1001 and the location of the terminal 1001. For example, the first server 1002 may identify first information pre-stored in the memory of the first server 1002 in response to receiving the user identification information. Further, the first server 1002 may identify the current location of the terminal 1001 in response to receiving the user identification information.

Upon determining that the current location of the terminal 1001 is the second place, the first server 1002 may transfer a request for consenting to share information from the second server to the terminal 1001 in operation 1015. For example, if the current location of the terminal 1001 is identified to be the second place, the first server 1002 may send a request for sharing information to the second server, to obtain information about one or more second electronic devices located in the second place, from the second server 1003 that controls and manages the one or more second electronic devices located in the second place. To that end, the first server 1002 may request the terminal 1001 to consent to information sharing by the second server.

In operation 1017, in response to receiving a request for information sharing from the first server 1002, the terminal 1001 may transfer information related to the information sharing consent to the second server 1003. The second server 1003 may transfer information related to the second place to the first server 1002 based on receiving the consent for information sharing from the terminal 1001.

In operation 1019, the first server 1002 may send a request for information sharing to the second server 1003. For example, if the current location of the terminal 1001 is identified to be the second place, the first server 1002 may send a request for information about one or more second electronic devices located in the second place, from the second server 1003 controlling and managing the one or more second electronic devices located in the second place.

In operation 1021, the second server 1003 may transfer information about one or more second electronic devices in the identified location to the first server 1002 in response to receiving the information sharing request. For example, in response to identifying that the current location of the terminal 1001 is the second place, the second server 1003 may transfer second information about one or more second electronic devices located in the second place to the first server 1002. Further, in operation 1023, the second server 1003 may transfer information about the user using the identified location to the first server 1002. For example, if the second place is a hotel room, the second server 1003 may transfer information about the guest who has checked in at the second place to the first server 1002.

In operation 1025, the first server 1002 may compare one or more first electronic devices with one or more second electronic devices. For example, in response to receiving at least one of the second information about one or more second electronic devices and information about the user, the first server 1002 may identify the first information about one or more first electronic devices pre-stored in the memory of the first server 1002. Then, the first server 1002 may compare one or more first electronic devices with one or more second electronic devices based on the identified first information and the obtained second information. The first server 1002 may select at least one electronic device that may correspond to one or more first electronic devices among one or more second electronic devices.

Meanwhile, the first server 1002 may determine whether the at least one selected electronic device may be controlled according to at least one mode based on information about at least one mode pre-stored in the memory of the first server 1002. If there is at least one electronic device controllable according to at least one mode, the first server 1002 may select at least one mode.

In operation 1027, the first server 1002 may transfer information about at least one selected mode to at least one of the terminal 1001 and the second server 1003.

In operation 1029, the terminal 1001 may edit at least one mode. For example, based on the received information about at least one mode, the terminal 1001 may provide the user with a user interface corresponding to the at least one mode and edit at least one mode based on an input received from the user.

In operation 1031, the terminal 1001 may transfer a control command according to at least one edited mode to the second server 1003. For example, upon receiving a request for executing "Mode A" set to control at least some of one or more second electronic devices located in the second place, the terminal 1001 may transfer control commands related to "Mode A" to the second server 1003.

In operation 1033, the second server 1003 may control at least some of one or more second electronic devices according to the received control command. For example, the second server 1003 or other electronic device may turn on the TV in the hotel room, set the temperature of the air conditioner in the hotel room to 25° C., set the brightness of a first bulb in the hotel room to 40%, and set the brightness of a second bulb in the hotel room to 40%, based on the control command according to "Mode A."

According to the embodiment of FIG. 11, in operation 1111, the second server 1103 may receive user identification information from the terminal 1101 located in the second place. For example, in response to receiving a request for accessing the server 1102 from the user of the terminal 1101, the terminal 1101 may transfer user account information input by the user to the server 1102.

In operation 1113, the second server 1103 may allow the terminal 1101 to enter/exit the second place. Upon determining that the user corresponding to the received user identification information is one targeted to enter/exit the second place, the second server 1103 may allow the user to enter/exit the second place. For example, if the second place is a hotel room, the second server 1103 may check in the terminal 1101 or user based on the received user identification information.

In operation 1115, the second server 1103 may transfer entrance/exit permit information and second information about one or more second electronic devices located in the second place to the terminal 1101. In operation 1117, the second server 1103 may transfer a request for consenting to share information for the first server to the terminal 1101. For example, if the current location of the terminal 1101 is identified to be the second place, the second server 1103 may request information sharing for the first server to transfer information about one or more second electronic devices located in the second place to the first server 1102. To that end, the second server 1103 may request the terminal 1101 to consent to information sharing by the first server.

In operation 1119, in response to receiving a request for information sharing from the second server 1103, the terminal 1101 may transfer user identification information to the first server 1102. The terminal 1101 may access the first server 1102 by transferring the user identification information to the first server 1102 and transfer information related to consent of information sharing to the first server 1102.

In operation 1121, the first server 1102 may transfer the information related to the consent of information sharing to the second server 1103 in response to receiving the user identification information from the terminal 1101.

In operation 1123, the terminal 1101 may transfer the information sharing request to the second server 1103. For example, in response to the information related to the consent of information sharing being transmitted the second server 1103, the terminal 1101 may send a request for information sharing for the first server 1102 to the second server 1103.

In operation 1125, the second server 1103 may transfer information about one or more second electronic devices located in the second place to the first server 1102 in response to receiving the information sharing request. For example, in response to identifying that the current location of the terminal 1101 is the second place, the second server 1103 may transfer second information about one or more second electronic devices located in the second place to the first server 1102. Further, in operation 1127, the second server 1103 may transfer information about the user using the second place to the first server 1102. For example, if the second place is a hotel room, the second server 1103 may transfer information about the guest who has checked in at the second place to the first server 1102.

In operation 1129, the first server 1102 may compare one or more first electronic devices with one or more second electronic devices. For example, in response to receiving at least one of the second information about one or more second electronic devices and information about the user, the first server 1102 may identify the first information about one or more first electronic devices pre-stored in the memory of the first server 1102. Then, the first server 1102 may compare one or more first electronic devices with one or more second electronic devices based on the identified first information and the obtained second information. The first server 1102 may select at least one electronic device that may correspond to one or more first electronic devices among one or more second electronic devices.

Meanwhile, the first server 1102 may determine whether the at least one selected electronic device may be controlled according to at least one mode based on information about at least one mode pre-stored in the memory of the first server 1102. If there is at least one electronic device controllable according to at least one mode, the first server 1102 may select at least one mode.

In operation 1131, the first server 1102 may transfer information about at least one selected mode to at least one of the terminal 1101 and the second server 1103.

In operation 1133, the terminal 1101 may edit at least one mode. For example, based on the received information about at least one mode, the terminal 1101 may provide the user with a user interface corresponding to the at least one mode and edit at least one mode based on an input received from the user.

In operation 1135, the terminal 1101 may transfer a control command according to at least one edited mode to the second server 1103. For example, upon receiving a request for executing "Mode A" set to control at least some of one or more second electronic devices located in the second place, the terminal 1101 may transfer control commands related to "Mode A" to the second server 1103.

In operation 1137, the second server 1103 may control at least some of one or more second electronic devices according to the received control command. For example, the second server 1103 or other electronic device may turn on the TV in the hotel room, set the temperature of the air conditioner in the hotel room to 25° C., set the brightness of a first bulb in the hotel room to 40%, and set the brightness of a second bulb in the hotel room to 40%, based on the control command according to "Mode A."

Meanwhile, at least some of the operations of FIGS. 10 and 11 may be omitted or repeated. Further, each operation of FIGS. 10 and 11 should be interpreted as an embodiment, and any one operation should not be interpreted as dependent upon another operation.

Figure 12:
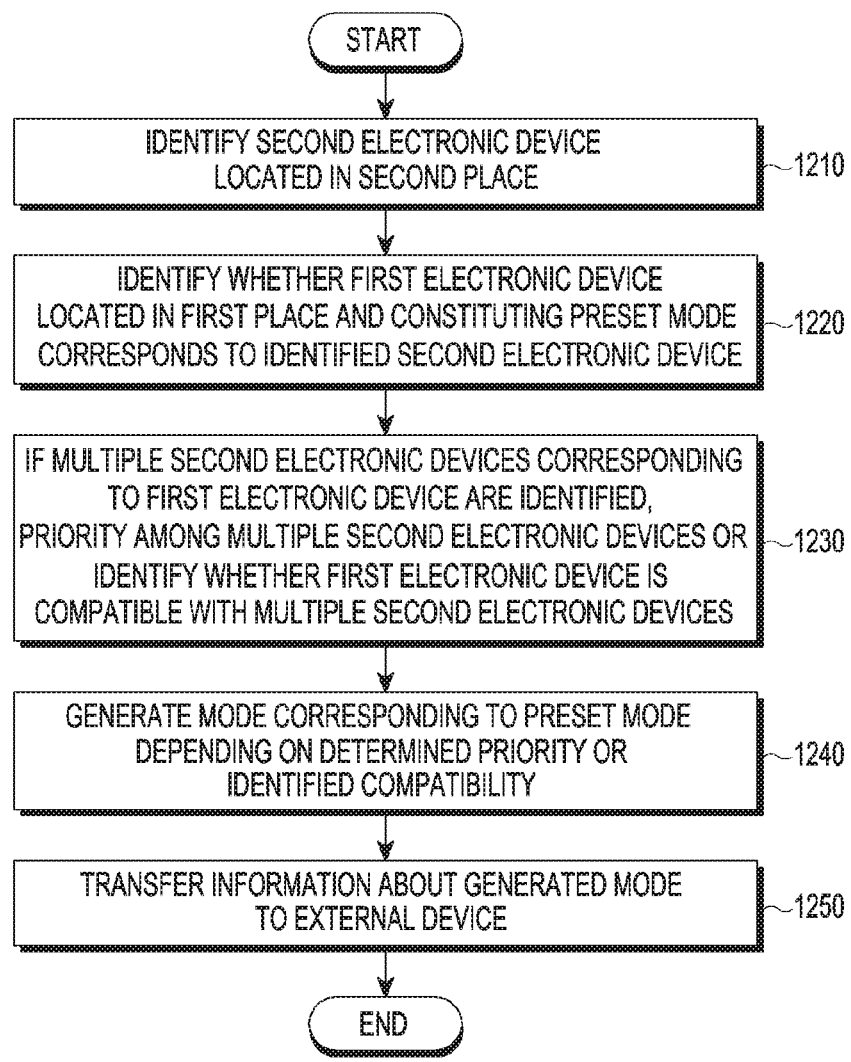
FIG. 12 is a flowchart illustrating a method of comparing electronic devices located in different places according to various embodiments of the present invention.

FIG. 12 is a flowchart illustrating a method of comparing electronic devices located in different places according to various embodiments of the present invention.

The entity of performing the method may be a processor of an electronic device (e.g., the electronic device 101 or server 108 of FIG. 1) including a communication circuit (e.g., the communication module 190 of FIG. 1), a memory (e.g., the memory 130 of FIG. 1), and the processor (e.g., the processor 120 of FIG. 1).

According to an embodiment, in operation 1210, the electronic device may identify the second electronic device located in the second place. For example, the electronic device may be connected with the second electronic device located in the second place over a network (e.g., the network 198 or 199 of FIG. 1) and may identify the second electronic device based on the connection.

In operation 1220, the electronic device may identify whether the first electronic device constituting a preset mode and located in the first place corresponds to the identified second electronic device. For example, the electronic device may identify whether the first electronic device corresponds to the second electronic device by the operation of comparing the attribute of the first electronic device and the attribute of the second electronic device.

In operation 1230, if a plurality of second electronic devices corresponding to the first electronic device are identified, the electronic device may determine priority among the plurality of second electronic devices. Or, if a plurality of second electronic devices corresponding to the first electronic device are identified, the electronic device may identify whether the first electronic device is compatible with a combination of the plurality of second electronic devices.

According to an embodiment, after determining the priority among the plurality of second electronic devices, the electronic device may select a higher-priority electronic device as an electronic device corresponding to the first electronic device. In this case, the electronic device may determine the priority for the plurality of second electronic devices based on at least one of the distances between the first electronic device and the second electronic devices or the strength of signals output from the second electronic devices. For example, the shorter the distance between the first electronic device and a second electronic device is, the higher priority the second electronic device has. Or, the stronger the strength of signal output from a second electronic device is, the higher priority the second electronic device may have.

According to an embodiment, upon determining that the attribute according to the combination of the plurality of second electronic devices corresponds to the attribute of the first electronic device, the electronic device may determine that the first electronic device is compatible with the combination of the plurality of second electronic devices. For example, if under the assumption that the first electronic device is a TV with the attributes of power, channel, and volume, among the plurality of second electronic devices, a third electronic device is a TV with the attributes of power and channel, and a fourth electronic device is an audio component with the attributes of power and volume, the attribute according to the combination of the third electronic device and the fourth electronic device may correspond to the attribute of the first electronic device. In this case, the combination of the third electronic device and the fourth electronic device may be determined to be compatible with the first electronic device.

In operation 1240, the electronic device may generate a mode corresponding to a preset mode based on the determined priority or identified compatibility.

For example, the electronic device may select at least one electronic device corresponding to the first electronic device among one or more second electronic devices based on the determined priority or identified compatibility. Upon determining that the at least one selected electronic device is controllable according to a preset mode, the electronic device may edit the preset mode and generate a new mode based on the preset mode and provide it to the user of the electronic device. Upon determining that the at least one selected electronic device is determined to correspond to all of the plurality of first electronic devices set to be controlled according to the preset mode, the electronic device may provide the preset mode to the user of the electronic device.

In operation 1250, the electronic device may transfer information about the generated mode to an external device. In this case, the external device may control at least some of one or more second electronic devices located in the second place according to the received mode.

Figure 13:
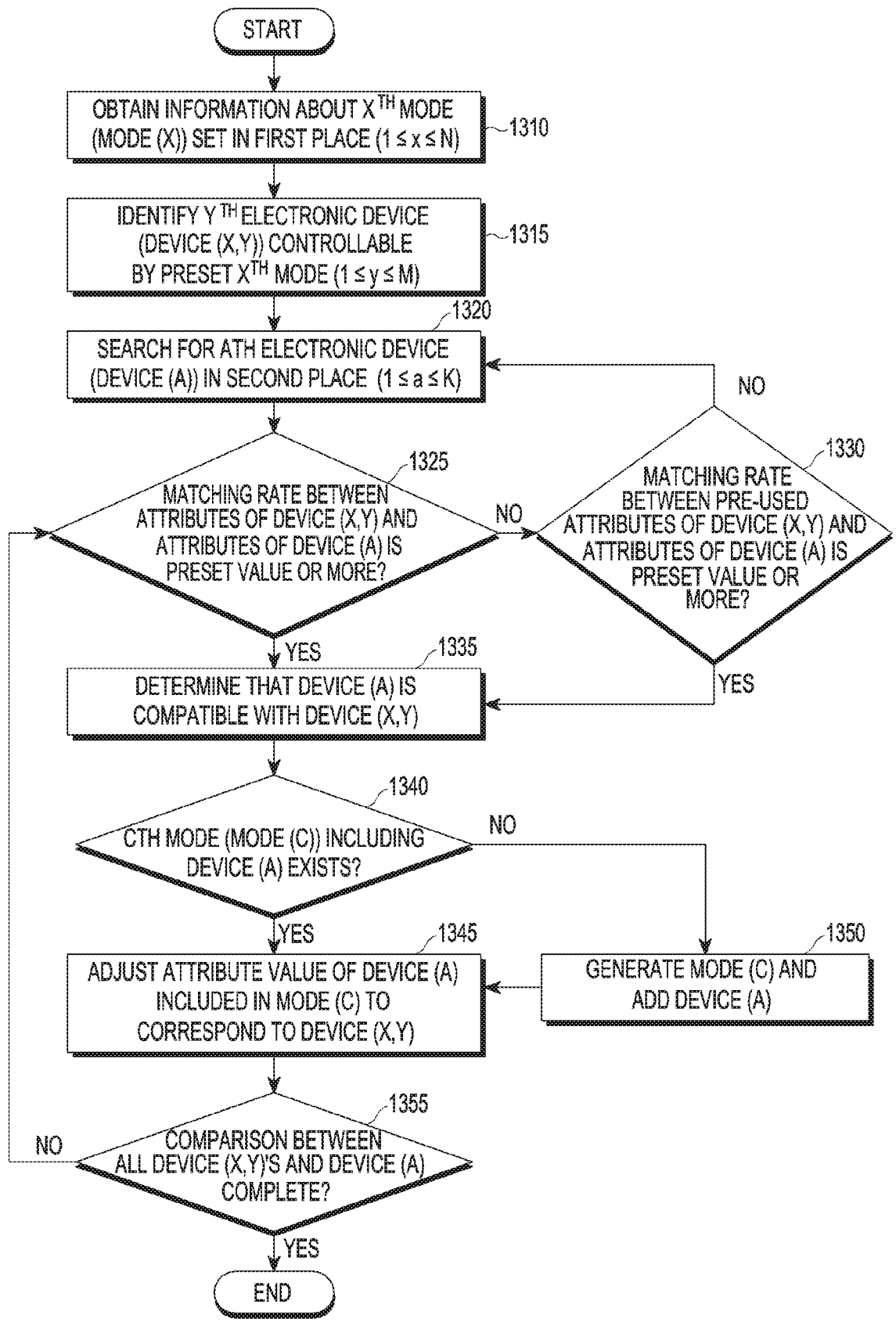
FIG. 13 is a flowchart illustrating a method of determining whether an electronic device constituting a preset mode is compatible with an electronic device identified in a particular place according to various embodiments of the present invention.

FIG. 13 is a flowchart illustrating a method of determining whether an electronic device constituting a preset mode is compatible with an electronic device identified in a particular place according to various embodiments of the present invention.

The entity of performing the method may be a processor of a server (e.g., the server 108 of FIG. 1) including a communication circuit (e.g., the communication module 190 of FIG. 1), a memory (e.g., the memory 130 of FIG. 1), and the processor (e.g., the processor 120 of FIG. 1).

In operation 1310, the server may obtain information about an xth mode (Mode (x)) set in a first place (1≥x≥N, where N is a natural number). According to an embodiment, the electronic device (e.g., the electronic device 101 of FIG. 1) may generate the xth mode set to control at least some of one or more first electronic devices (e.g., the electronic device 102 or 104 of FIG. 1) located in the first place. The xth mode may be generated when the electronic device is located in the first place. Information about the generated xth mode may be stored in the memory of the electronic device. The server may obtain the information about the xth mode from the electronic device that has generated the xth mode. The information about the xth mode may include information about the first place and information (e.g., device name, attribute, or attribute value) about at least one electronic device controllable according to the xth mode. The server may store the obtained xth mode information in the memory of the server.

In operation 1315, the server may identify a yth electronic device (Device (x,y)) controllable according to the preset xth mode (1≥y≥M, where M is a natural number). The server may identify information about the yth electronic device controllable according to the xth mode from the obtained xth mode information. For example, the server may identify information about a TV (e.g., Device (1,1)) in the first place and information about an air conditioner (e.g., Device (1,2)) controllable according to the first mode from the information about the first mode.

In operation 1320, the server may search for an ath electronic device (Device (a)) located in the second place (1≥a≥K, where K is a natural number). According to an embodiment, the electronic device (e.g., the electronic device 101 of FIG. 1) may obtain information about one or more second electronic device (e.g., the electronic device 102 or 104 of FIG. 1) located in the second place. The server may be connected with the electronic device via a network and obtain information about one or more second electronic device obtained via the electronic device. The server may obtain information about the ath electronic device located in the second place from the obtained information about one or more second electronic devices and search for the ath electronic device thereby. For example, the server may identify information about a TV (e.g., Device (1)) in the second place and information about an air conditioner (e.g., Device (2)) from the information about one or more second electronic devices and may search for the TV and air conditioner in the second place thereby.

In operation 1325, the server may determine whether the matching rate between one or more attributes of the yth electronic device (Device (x,y)) and one or more attributes of the ath electronic device (Device (a)) is a preset value or more. The server may identify one or more attributes of the yth electronic device from information about the yth electronic device and identify one or more attributes of the ath electronic device from information about the ath electronic device. Further, the server may compare the yth electronic device and the ath electronic device based on the identified attributes. For example, the server may identify power, channel, volume, and external input as attributes of the TV (e.g., Device (1,1)) in the first place, controllable according to the first mode, and power, temperature, and fan speed as attributes of the air conditioner (e.g., Device (1, 2)). Further, the server may identify power, channel, and volume as attributes of the TV (e.g., Device (1)) in the second place and power and temperature as attributes of the air conditioner (e.g., Device (2)). In this case, the server may determine that the matching rate between the attribute of the TV (e.g., Device (1,1)) in the first place and the attribute of the TV (e.g., Device (1)) in the second place is 75%. Further, the server may determine that the matching rate between the attribute of the air conditioner (e.g., Device (1,2)) in the first place and the attribute of the air conditioner (e.g., Device (2)) in the second place is 66%. If the preset value is 70%, the server may determine that the TV (e.g., Device (1)) in the second place is compatible with the TV (e.g., Device (1,1)) in the first place and perform operation 1335. In contrast, if the preset value is 70%, the server may determine that the air conditioner (e.g., Device (2)) in the second place is not compatible with the air conditioner (e.g., Device (1,2)) in the first place and perform operation 1330.

In operation 1330, the server may determine whether the matching rate between pre-used attributes of one or more attributes of the yth electronic device (Device (x,y)) and one or more attributes of the ath electronic device (Device (a)) is a preset value or more. For example, upon determining that among the one or more attributes of the yth electronic device, only some attributes have been pre-used, the server may compare the pre-used attributes of the yth electronic device and one or more attributes of the ath electronic device (Device (a)). For example, upon determining that among power, temperature, and fan speed identified as the attributes of the air conditioner (e.g., Device (1, 2)) in the first place, only power and temperature have been pre-used, the server may determine that the matching rate between the attribute of the air conditioner (e.g., Device (1,2)) in the first place and the attribute of the air conditioner (e.g., Device (2)) in the second place is 100%. If the preset value is 80%, the server may determine that the air conditioner (e.g., Device (2)) in the second place is compatible with the air conditioner (e.g., Device (1,2)) in the first place and perform operation 1335. In contrast, upon determining that the matching rate between pre-used attributes of one or more attributes of the yth electronic device (Device (x,y)) and one or more attributes of the ath electronic device (Device (a)) is less than the preset value, the server may perform operation 1320.

In operation 1335, upon determining that the matching rate between the respective attributes of the ath electronic device (Device (a)) and the yth electronic device (Device (x, y)) is the preset value or more, the server may determine that the ath electronic device (Device (a)) is compatible with the yth electronic device (Device (x, y)). That is, the server may determine that the ath electronic device corresponds to the yth electronic device. For example, the server may determine that the TV (e.g., Device (1)) in the second place corresponds to the TV (e.g., Device (1,1)) in the first place and that the air conditioner (e.g., Device (2)) in the second place corresponds to the air conditioner (e.g., Device (1, 2)) in the first place.

In operation 1340, the server may determine whether there is a cth mode (Mode (c)) including the ath electronic device (Device (a)). Here, the cth mode may mean a mode set to control the TV (e.g., Device (1)) in the second place and the air conditioner (e.g., Device (2)). Further, the cth mode may mean a mode corresponding to a first mode set to control the TV (e.g., Device (1,1)) in the first place and air conditioner (e.g., Device (1, 2)). If there is the cth mode (Mode (c)) including the ath electronic device (Device (a)), the server may perform operation 1345. In contrast, if there is not the cth mode (Mode (c)) including the ath electronic device (Device (a)), the server may perform operation 1350.

In operation 1345, upon determining that there is the cth mode (Mode (c)) including the ath electronic device (Device (a)), the server may adjust the attribute value of the ath electronic device (Device (a)) included in the cth mode (Mode (c)) to correspond to the attribute value of the yth electronic device (Device (x, y)). For example, the attribute value of the TV (e.g., Device (1,1)) in the first place according to the first mode may be set to power on, turn to channel 5, set the volume to 10, and set the external input to HDMI. Thus, the server may set the attribute value of the TV (e.g., Device (1)) in the second place according to the cth mode to power on, turn to channel 5, and set the volume to 10. Similarly, the attribute value of the air conditioner (e.g., Device (1, 2)) in the first place according to the first mode may be set to power on, set the temperature to 28° C., and set the fan speed to low. Thus, the server may set the attribute value of the air conditioner (e.g., Device (2)) in the second place according to the cth mode to power on and set the temperature to 28° C.

In operation 1350, if there is not the cth mode (Mode (c)) including the ath electronic device (Device (a)), the server may generate the cth mode (Mode (c)) and add the ath electronic device (Device (a)) as an electronic device controlled according to the cth mode.

In operation 1355, the server may determine whether comparison for both the yth electronic device and the ath electronic device has been complete. If more comparison between the yth electronic device and the ath electronic device is determined to be needed, the server may perform operation 1325. In contrast, upon determining that comparison between the yth electronic device and the ath electronic device is complete, the server may terminate the operation of determining whether the electronic device constituting the preset mode is compatible with the electronic device identified in the particular place.

Meanwhile, some of the operations of FIG. 13 may be omitted or repeated. Further, each operation of FIG. 13 should be interpreted as an embodiment, and any one operation should not be interpreted as dependent upon another operation.

Figure 14:
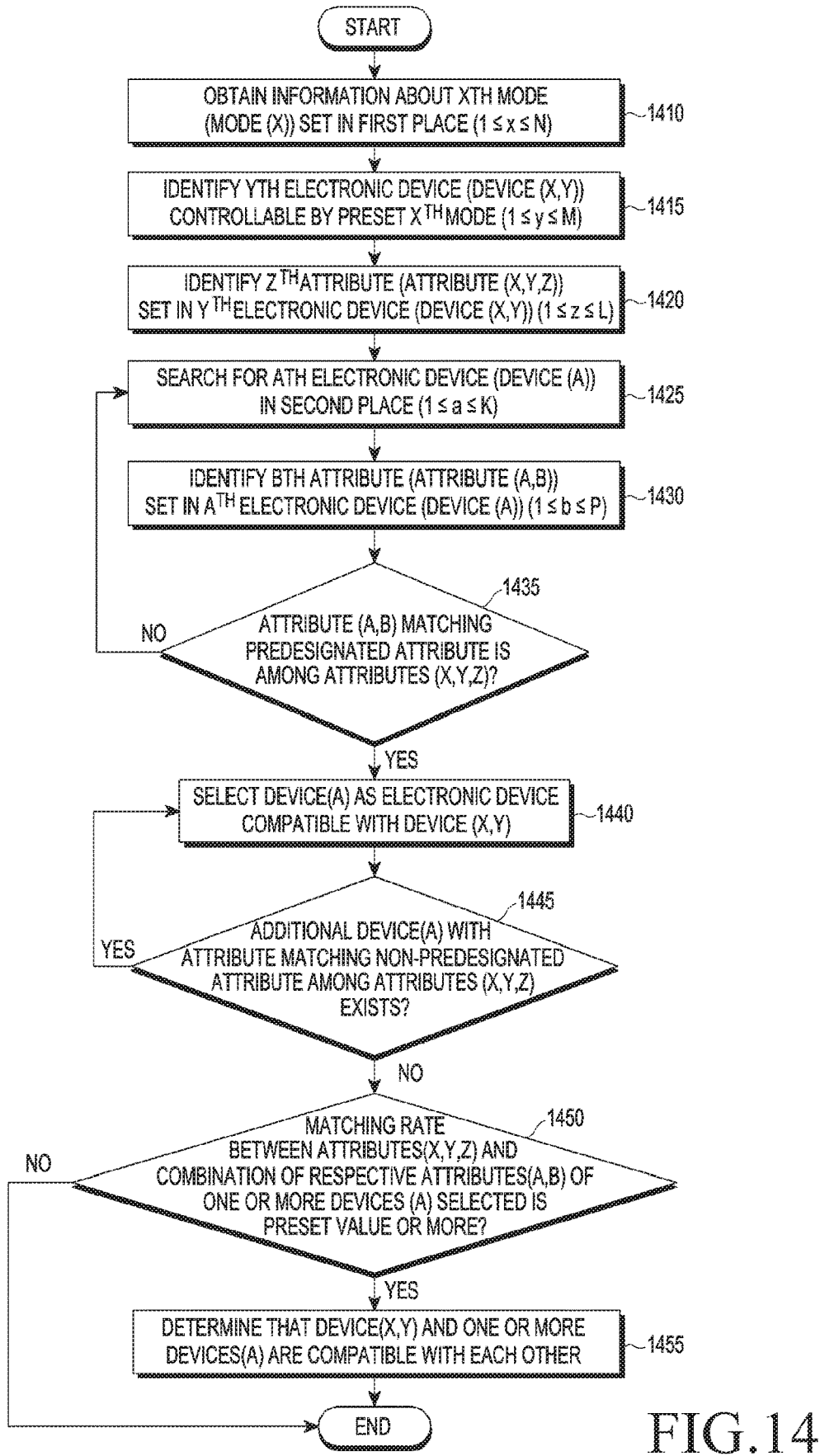
FIG. 14 is a flowchart illustrating a method of determining whether one electronic device may correspond to a plurality of electronic devices according to various embodiments of the present invention.

FIG. 14 is a flowchart illustrating a method of determining whether one electronic device may correspond to a plurality of electronic devices according to various embodiments of the present invention.

The entity of performing the method may be a processor of a server (e.g., the server 108 of FIG. 1) including a communication circuit (e.g., the communication module 190 of FIG. 1), a memory (e.g., the memory 130 of FIG. 1), and the processor (e.g., the processor 120 of FIG. 1).

In operation 1410, the server may obtain information about an xth mode (Mode (x)) set in a first place ($1 \geq x \geq N$, where N is a natural number). According to an embodiment, the electronic device (e.g., the electronic device 101 of FIG. 1) may generate the xth mode set to control at least some of one or more first electronic devices (e.g., the electronic device 102 or 104 of FIG. 1) located in the first place. The xth mode may be generated when the electronic device is located in the first place. Information about the generated xth mode may be stored in the memory of the electronic device. The server may obtain the information about the xth mode from the electronic device that has generated the xth mode. The information about the xth mode may include information about the first place and information (e.g., device name, attribute, or attribute value) about at least one electronic device controllable according to the xth mode. The server may store the obtained xth mode information in the memory of the server.

In operation 1415, the server may identify a yth electronic device (Device (x,y)) controllable according to the preset xth mode ($1 \geq y \geq M$, where M is a natural number). The server may identify information about the yth electronic device controllable according to the xth mode from the obtained xth mode information. For example, the server may identify information about a TV (e.g., Device (1,1)) in the first place, controllable according to the first mode from the information about the first mode.

In operation 1420, the server may identify a zth attribute (Attribute (x,y,z)) set in the yth electronic device (Device (x, y)) ($1 \geq z \geq L$, where L is a natural number). The server may identify one or more attributes of the yth electronic device based on the identified information about the yth electronic device. For example, the server may identify power (e.g., Attribute (1, 1, 1)), channel (e.g., Attribute (1, 1, 2)), volume (e.g., Attribute (1, 1, 3)), and external input (e.g., Attribute (1, 1, 4)) as the attributes of the TV (e.g., Device (1,1)) in the first place controllable according to the first mode.

In operation 1425, the server may search for an ath electronic device (Device (a)) located in the second place ($1 \geq a \geq K$, where K is a natural number). According to an embodiment, the electronic device (e.g., the electronic device 101 of FIG. 1) may obtain information about one or more second electronic device (e.g., the electronic device 102 or 104 of FIG. 1) located in the second place. The server may be connected with the electronic device via a network and obtain information about one or more second electronic device obtained via the electronic device. The server may obtain information about the ath electronic device located in the second place from the obtained information about one or more second electronic devices and search for the ath electronic device thereby. For example, the server may identify information about a TV (e.g., Device (1)) in the second place and information about an audio component (e.g., Device (3)) from the information about one or more second electronic devices and may search for the TV and audio component in the second place thereby.

In operation 1430, the server may identify a bth attribute (Attribute (a,b)) set in the ath electronic device (Device (a)) ($1 \geq b \geq P$, where P is a natural number). The server may identify one or more attributes of the ath electronic device based on the identified information about the ath electronic device. For example, the server may identify power (e.g., Attribute (1, 1)) and channel (e.g., Attribute (1, 2)) as the attributes of the TV (e.g., Device (1)) and volume (e.g., Attribute (3, 1)) as the attribute of the audio component (e.g., Device (3)).

In operation 1435, the server may determine whether there is a bth attribute (Attribute (a, b)) matching a predesignated attribute among the zth attributes (Attribute (x, y, z)). According to an embodiment, the server may pre-designate power and channel, among power (e.g., Attribute (1, 1, 1)), channel (e.g., Attribute (1, 1, 2)), volume (e.g., Attribute (1, 1, 3)) and external input (e.g., Attribute (1, 1, 4)), which are attributes of the TV (e.g., Device (1,1)) in the first place, as targets for attribute comparison. Then, the server may determine whether there is the bth attribute matching power and channel predesignated as targets for attribute comparison. For example, the server may determine that power (e.g., Attribute (1, 1)) which is the first attribute of the TV (e.g., Device (1)) in the second place matches power (e.g., Attribute (1, 1, 1)) which is the first attribute of the TV (e.g., Device (1,1)) in the first place. Further, the server may determine that channel (e.g., Attribute (1, 2)) which is the second attribute of the TV (e.g., Device (1)) in the second place matches channel (e.g., Attribute (1, 1, 2)) which is the second attribute of the TV (e.g., Device (1,1)) in the first place. As such, upon determining that there is the bth attribute (Attribute (a,b)) matching a predesignated attribute among the zth attributes (Attribute (x, y, z)), the server may perform operation 1440. In contrast, unless there is the bth attribute (Attribute (a, b)) matching the predesignated attribute among the zth attributes (Attribute (x, y, z)), the server may perform operation 1425 to search for an ath electronic device different from an ath electronic device already discovered.

In operation 1440, the server may select the ath electronic device (Device (a)) as an electronic device compatible with the yth electronic device (Device (x, y)). For example, the server may select the TV (e.g., Device (1)) in the second place which has an attribute matching at least some attributes of the TV (e.g., Device (1,1)) in the first place, as an electronic device compatible with the TV (e.g., Device (1,1)) in the first place.

In operation 1445, the server may determine whether there is an additional Device(a) with an attribute matching a non-predesignated attribute among the zth attributes (Attribute (x,y,z)). According to an embodiment, the server may pre-designate power and channel, among power (e.g., Attribute (1, 1, 1)), channel (e.g., Attribute (1, 1, 2)), volume (e.g., Attribute (1, 1, 3)) and external input (e.g., Attribute (1, 1, 4)), which are attributes of the TV (e.g., Device (1,1)) in the first place, as targets for attribute comparison. In other words, volume (e.g., Attribute (1, 1, 3)) and external input (e.g., Attribute (1, 1, 4) among the attributes of the TV (e.g., Device (1,1)) in the first place may be non-predesignated attributes. Subsequently, the server may determine whether there is the bth attribute matching at least some of volume and external input not predesignated as targets for attribute comparison. For example, the server may determine that volume (e.g., Attribute (3, 1)) which is the first attribute of the audio component (e.g., Device (3)) in the second place matches volume (e.g., Attribute (1, 1, 3)) which is the third attribute of the TV (e.g., Device (1,1)) in the first place. As such, upon determining that there is the bth attribute (Attribute (a,b)) matching a non-predesignated attribute among the zth attributes (Attribute (x, y, z)), the server may perform operation 1440, selecting the ath electronic device with the bth attribute as an electronic device compatible with the yth electronic device. In contrast, upon determining that there is no bth attribute (Attribute (a,b)) matching a predesignated attribute among the zth attributes (Attribute (x, y, z)), the server may perform operation 1450.

In operation 1450, the server may determine whether the matching rate between the zth attribute (Attribute (x, y, z)) and a combination of the respective bth attributes (Attribute (a, b)) of one or more selected ath electronic devices (Devices (a)) is a preset value or more. For example, the server may select the TV (e.g., Device (1)) in the second place based on power (e.g., Attribute (1, 1, 1)) and channel (e.g., Attribute (1, 1, 2)) which are the attributes of the TV (e.g., Device (1,1)) in the first place. Further, the server may select the audio component (e.g., Device (3)) in the second place, based on volume (e.g., Attribute (1, 1, 3)) which is the attribute of the TV (e.g., Device (1,1)) in the first place. Subsequently, the server may combine the respective attributes of the selected audio component (e.g., Device (3)) and the selected TV (e.g., Device (1)) in the second place. In other words, the server may combine power and channel which are the attributes of the TV (e.g., Device (1)) in the second place and volume which is the attribute of the audio component (e.g., Device (3)) in the second place.

The server may determine that the matching rate between power (e.g., Attribute (1, 1, 1)), channel (e.g., Attribute (1, 1, 2)), volume (e.g., Attribute (1, 1, 3)) and external input (e.g., Attribute (1, 1, 4)), which are the attributes of the TV (e.g., Device (1,1)) in the first place and power (e.g., Attribute (1, 1)), channel (e.g., Attribute (1, 2)) and volume (e.g., Attribute (3, 1)) which are the combination of the respective attributes of the selected TV (e.g., Device (1)) and audio component (e.g., Device (3)) in the second place is 75%. In this case, for example, if the preset value is 70%, the server may perform operation 1455. In contrast, if the preset value is 80%, the server may terminate the operation of determining whether one electronic device may correspond to a plurality of electronic devices.

In operation 1455, the server may determine whether the yth electronic device is compatible with one or more ath electronic devices. For example, the server may determine that the combination of the audio component (e.g., Device (3)) and the TV (e.g., Device (1)) in the second place is compatible with the TV (e.g., Device (1,1)) in the first place. In this case, a command corresponding to the power and channel of the TV (e.g., Device (1,1)) in the first place may adjust the power and channel of the TV (e.g., Device (1)) in the second place, and a command corresponding to the volume of the TV (e.g., Device (1,1)) in the first place may adjust the volume of the audio component (e.g., Device (3)) in the second place.

Meanwhile, some of the operations of FIG. 14 may be omitted or repeated. Further, each operation of FIG. 14 should be interpreted as an embodiment, and any one operation should not be interpreted as dependent upon another operation.

Figure 15:
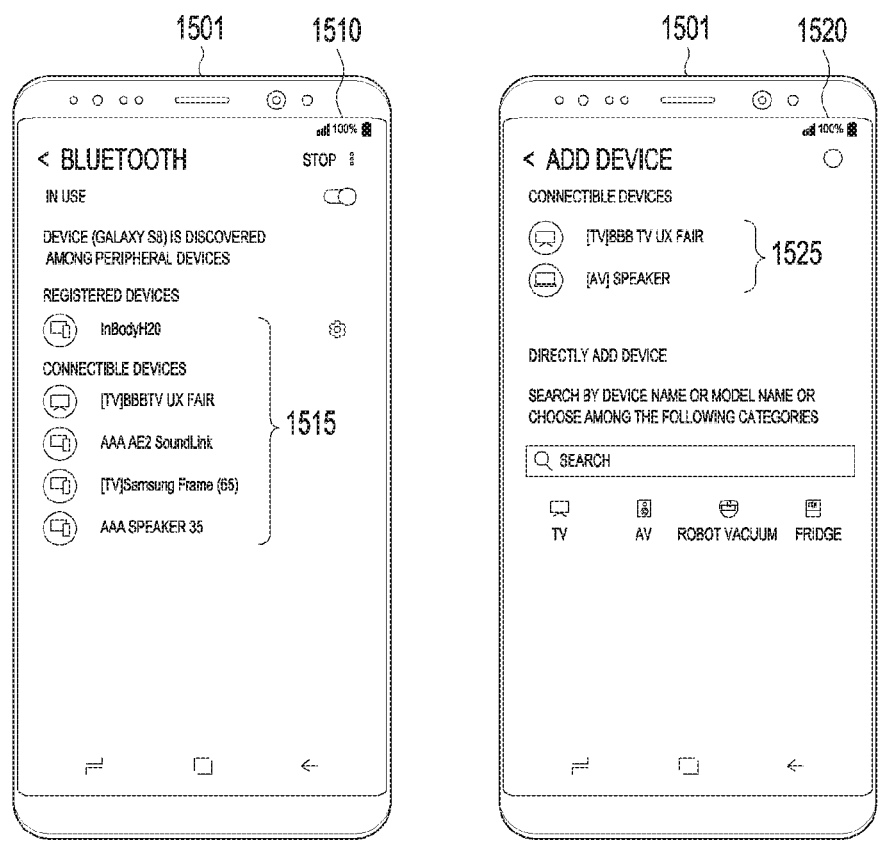
FIG. 15 is a view illustrating a method of identifying at least one electronic device located in a particular place by an electronic device according to various embodiments of the present invention.

FIG. 15 is a view illustrating a method of identifying at least one electronic device located in a particular place by an electronic device according to various embodiments of the present invention.

According to an embodiment, an electronic device 1501 (e.g., the electronic device 101 of FIG. 1) may communicate with another electronic device (e.g., the electronic device 102 or 104 of FIG. 1) via a network (e.g., the network 198 or 199 of FIG. 1). The electronic device 1501 may communicate with another electronic device via a short-range communication network, such as Bluetooth, WiFi direct, or infrared data association (IrDA) or a remote communication network such as a cellular network, Internet, or computer network (e.g., LAN or WAN).

For example, the electronic device 1501 may communicate with another electronic device via Bluetooth or Wi-Fi and may identify the other electronic device. The electronic device 1501 may obtain the device name 1515 (e.g., [TV] BBB TV UX FAIR, AAA AE2 SoundLink, [TV] Samsung Frame (65) or AAA speaker 35, etc.) of the other electronic device identifiable via Bluetooth or the device name (1525) (e.g., [TV] BBB TV UX FAIR, [AV] speaker, etc.) of the other electronic device identifiable via Samsung Connect™. Here, device name may mean an identifier for the other electronic device. The electronic device 1501 may identify the attribute or function of the other electronic device identified via Bluetooth, based on the obtained device name. Or, the electronic device 1501 may transfer the obtained device name to at least one server connected via a network, receive information about the electronic device corresponding to the obtained device name from the server, and identify the attribute or function of the other electronic device. Meanwhile, the electronic device 1501 may display, on the display of the electronic device 1501, a user interface 1510 related to the Bluetooth function or a user interface 1520 related to the Samsung Connect™ function.

Figure 16:
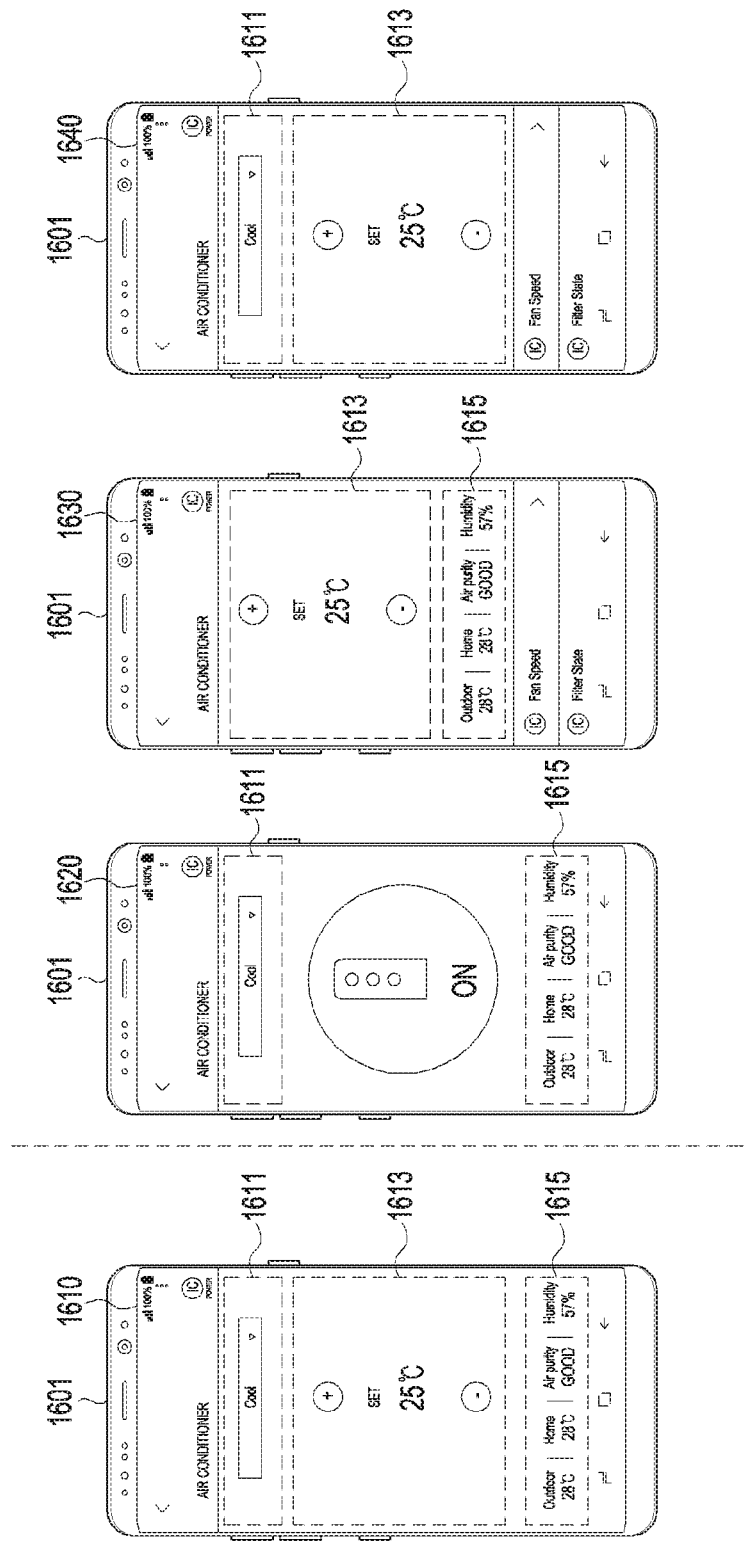
FIG. 16 is a view illustrating information related to the attribute of an electronic device according to various embodiments of the present invention.

FIG. 16 is a view illustrating information related to the attribute of an electronic device according to various embodiments of the present invention.

According to an embodiment, an electronic device 1601 (e.g., the electronic device 101 of FIG. 1) may display, on the display of the electronic device 1601, user interfaces 1610, 1620, 1630, and 1640 including information related to attributes of another electronic device (e.g., the electronic device 102 or 104 of FIG. 1). The user interfaces 1610, 1620, 1630, and 1640 displayed on the display of the electronic device 1601 may include at least one of contents 1611, 1613, and 1615 related to one or more attributes of the other electronic device.

Referring to FIG. 16, the electronic device 1601 may display information related to an air conditioner connected via a network (e.g., the network 198 or 199 of FIG. 1), on the display of the electronic device 1601. For example, the user electronic device 1601 may display a first user interface 1610 including all of the contents 1611, 1613, and 1615 related to the attributes of the air conditioner. The first user interface 1610 may include a first content 1611 used to indicate an operation mode of the air conditioner and control the operation mode, a second content 1613 used to control the temperature of the air conditioner, and a third content 1615 indicating various pieces of information related to the state of the air conditioner. According to an embodiment, the third content 1615 may include at least one of information about the outdoor temperature, information about indoor temperature, information about air contamination, and information about humidity.

According to another embodiment, the electronic device 1601 may display a second user interface 1620 including the first content 1611 and third content 1615, a third unique fabric identifier 1630 including the second content 1613 and third content 1615, or a fourth user interface 1640 including the first content 1611 and second content 1613.

The first content 1611, second content 1613, and third content 1615 shown in FIG. 16 may mean some of various attributes of the air conditioner. Further, it will be easily appreciated by one of ordinary skill in the art that the user interface shown in FIG. 16 means one of various embodiments implementable.

Figure 17:
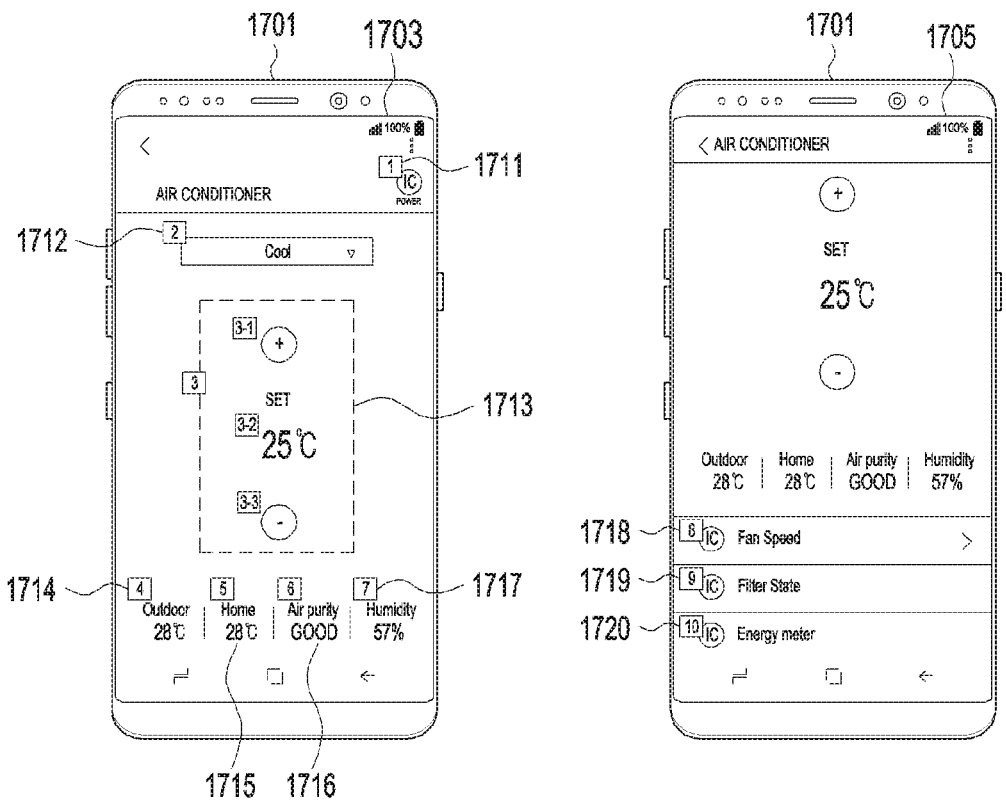
FIG. 17 is a view illustrating a method of setting priority among a plurality of attributes of an electronic device according to various embodiments of the present invention.

FIG. 17 is a view illustrating a method of setting priority among a plurality of attributes of an electronic device according to various embodiments of the present invention.

According to an embodiment, an electronic device 1701 (e.g., the electronic device 101 of FIG. 1) may display, on the display of the electronic device 1701, user interfaces 1703 and 1705 including information related to attributes of another electronic device (e.g., the electronic device 102 or 104 of FIG. 1). The user interfaces 1703 and 1705 displayed on the display of the electronic device 1701 may include at least one of contents 1711 to 1720 related to one or more attributes of the other electronic device.

Referring to FIG. 17, the electronic device 1701 may display information related to an air conditioner connected via a network (e.g., the network 198 or 199 of FIG. 1), on the display of the electronic device 1701. For example, the electronic device 1701 may display a first content 1711 used to power on/off the air conditioner. Further, the electronic device 1701 may display a second content 1712 used to indicate the operation mode of the air conditioner and control the operation mode. Further, the electronic device 1701 may display a third content 1713 used to control the temperature of the air conditioner. Further, the electronic device 1701 may display a fourth content indicating various pieces of information related to the state of the air conditioner. The fourth content may include at least one of outdoor temperature information 1714, indoor temperature information 1715, air contamination degree information 1716, and humidity information 1717. Further, the electronic device 1701 may display a fifth content 1718 used to control the fan speed of the air conditioner. Further, the electronic device 1701 may display a sixth content 1719 indicating the filter state of the air conditioner. Further, the electronic device 1701 may display a seventh content 1720 indicating information related to power consumption of the air conditioner.

As such, the electronic device 1701 may display information related to the attribute or attribute value of at least one electronic device connected via a network (e.g., the network 198 or 199 of FIG. 1) and may control the attribute or attribute value of at least one electronic device via a user interface displayed on the display.

Figure 18:
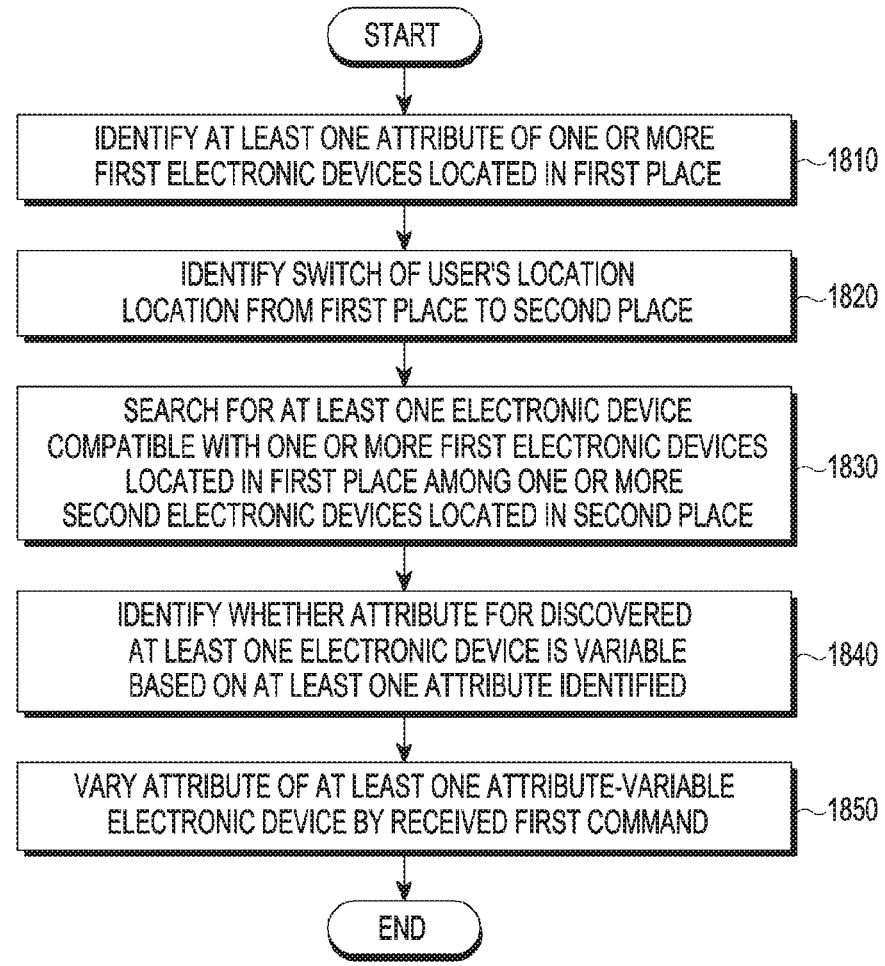
FIG. 18 is a flowchart illustrating a method of reflecting the attributes of electronic devices in a first place to the attributes of electronic devices in a second place based on a movement of at least one object from the first place to the second place according to various embodiments of the present invention.

FIG. 18 is a flowchart illustrating a method of reflecting the attributes of electronic devices in a first place to the attributes of electronic devices in a second place based on a movement of at least one object from the first place to the second place according to various embodiments of the present invention.

The entity of performing the method may be a processor of an electronic device (e.g., the server 101 of FIG. 1) including a communication circuit (e.g., the communication module 190 of FIG. 1), a memory (e.g., the memory 130 of FIG. 1), and the processor (e.g., the processor 120 of FIG. 1).

According to an embodiment, in operation 1810, the electronic device may identify at least one attribute of one or more first electronic devices located in the first place. For example, the electronic device may obtain information related to at least one attribute or function for each electronic device from one or more first electronic devices connected via a network (e.g., the network 198 or 199 of FIG. 1). Or, the electronic device may transfer the device names (or identifiers) for one or more first electronic devices identified via the network (e.g., the network 198 or 199 of FIG. 1) to at least one server (e.g., the server 108 of FIG. 1) and then obtain information related to at least one attribute or function for one or more first electronic devices from the at least one server. Subsequently, the electronic device may identify at least one attribute or function for one or more first electronic devices based on the obtained information and store the same in the memory of the electronic device. Likewise, the electronic device may identify at least one attribute of one or more second electronic devices located in the second place. According to an embodiment, the user of the electronic device may be watching a movie on the TV located in the first place.

In operation 1820, the electronic device may identify that the user of the electronic device is relocated from the first place to the second place. Here, the first place may mean the living room of a home, and the second place may mean a bedroom of the home.

According to an embodiment, as the electronic device is relocated from the first place to the second place, the electronic device may determine that the user is relocated from the first place to the second place. For example, the electronic device may determine that the user is relocated from the first place to the second place based on being disconnected from one or more first electronic devices located in the first place and establishing connection with one or more second electronic devices located in the second place.

According to another embodiment, the electronic device may determine that the user of the electronic device is relocated from the first place to the second place based on at least one input (touch input, voice input, etc.) received from the user. For example, the electronic device may receive a voice input saying "I will move from the first place to the second place" from the user of the electronic device. The electronic device may determine that the user of the electronic device is relocated from the first place to the second place based on the received voice input.

In operation 1830, the electronic device may search for at least one electronic device compatible with one or more first electronic devices located in the first place among one or more second electronic devices located in the second place. The electronic device may compare the attributes of one or more second electronic devices and the attributes of one or more second electronic devices and may thus search for at least one electronic device compatible with one or more first electronic devices among one or more second electronic devices. According to an embodiment, the electronic device may determine whether there is an electronic device (e.g., a TV) located in the second place, compatible with the TV located in the first place.

In operation 1840, the electronic device may identify whether a change may be made to the attributes for at least one electronic device discovered, based on at least one attribute identified. According to an embodiment, the electronic device may identify the attributes and one or more first electronic devices and the attributes of one or more second electronic devices and determine whether a change may be made to the attributes of the one or more second electronic devices like the identified attributes of the one or more first electronic devices. For example, if at least one of power, channel, and volume is identified as the attribute of the TV located in the second place when power, channel, and volume are identified as the attributes of the TV located in the first place, the electronic device may determine that a change may be made to the attributes of the discovered TV located in the second place. According to an embodiment, the electronic device may determine whether the movie that the user of the electronic device is watching on the TV located in the first place may be played on the TV located in the second place.

In operation 1850, the electronic device may receive at least one command from the user of the electronic device and, based on the at least one received command, may vary the attribute of at least one electronic device which has been determined to be varied. According to an embodiment, the electronic device may vary the attribute of at least one electronic device among one or more second electronic devices located in the second place based on at least one input (e.g., a touch input or voice input) received from the user. For example, the electronic device may receive a voice input saying "Replay the movie I'd watched" from the user of the electronic device. The electronic device may play the move which the user had watched on the TV located in the first place, on the TV located in the second place based on the received voice input. Meanwhile, the electronic device may vary the attributes of various electronic devices other than the TV given above as an example.

Meanwhile, at least some of the operations of FIG. 18 may be omitted or repeated. Further, each operation of FIG. 18 should be interpreted as an embodiment, and any one operation should not be interpreted as dependent upon another operation.

FIGS. 19 to 23 are views illustrating a method of controlling electronic devices located in different spaces in response to a variation in location of an electronic device according to various embodiments of the present invention.

Figure 19:
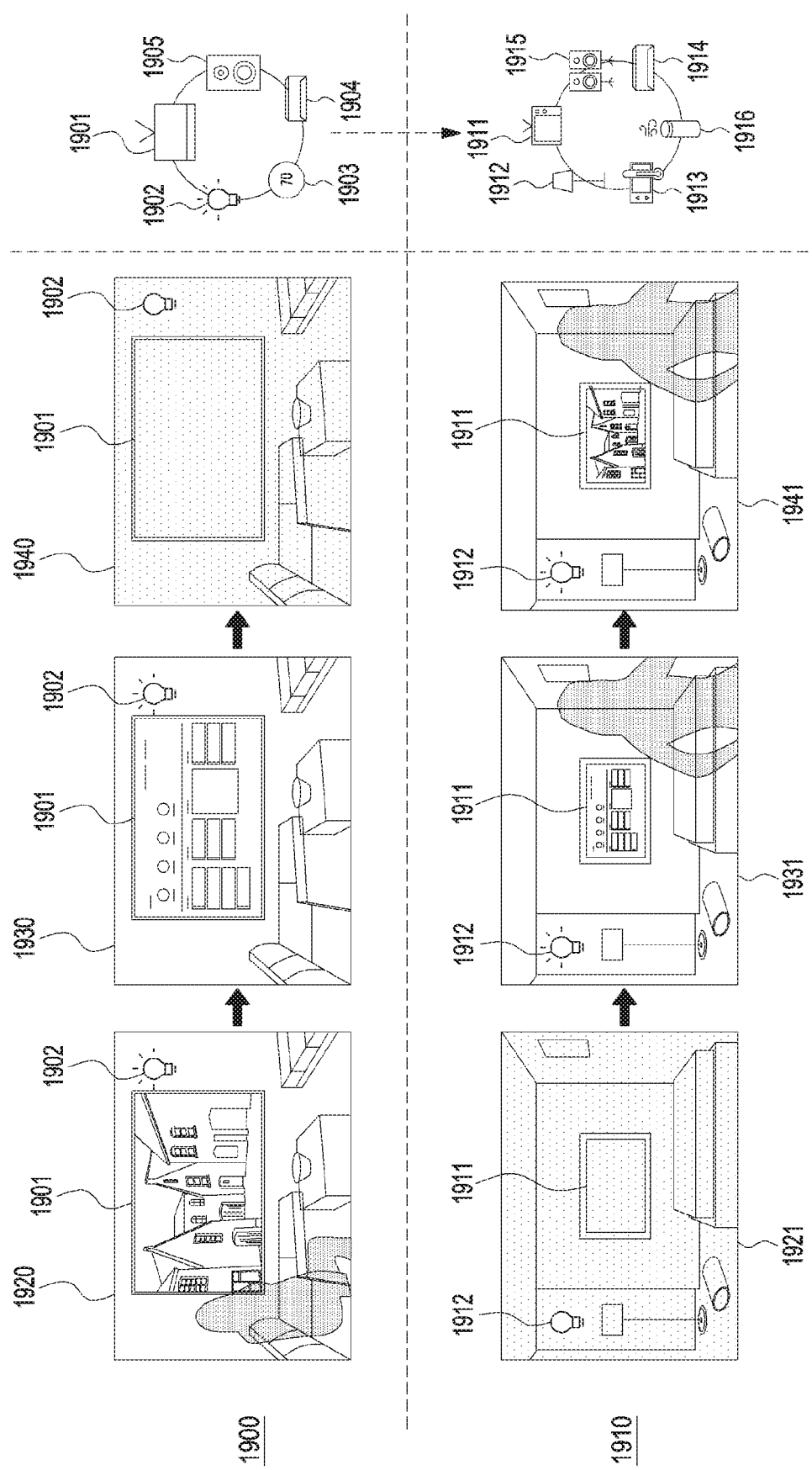
FIG. 19 is a view illustrating a method of controlling the attributes of electronic devices located in different places according to various embodiments of the present invention.

FIG. 19 is a view illustrating a method of controlling the attributes of electronic devices located in different places according to various embodiments of the present invention.

Referring to FIG. 19, an electronic device (e.g., the electronic device 101 of FIG. 1) may control one or more first electronic devices (e.g., 1901, 1902, 1903, 1904, and 1905) located in a first place 1900 or one or more second electronic devices (e.g., 1911, 1912, 1913, 1914, 1915, and 1916) located in a second place 1910 according to a variation in the location of the electronic device, a variation in the location of the user, or an input received from the user. Here, the first place 1900 may mean the living room of a home, and the second place 1910 may mean a bedroom of the home.

Meanwhile, in FIG. 19, a first step 1920 denotes the state of the first place 1900 at a first time, and a second step 1921 denotes the state of the second place 1910 at the first time. A third step 1930 denotes the state of the first place 1900 at a second time, and a fourth step 1931 denotes the state of the second place 1910 at the second time. A fifth step 1940 denotes the state of the first place 1900 at a third time, and a sixth step 1941 denotes the state of the second place 1910 at the third time.

Referring to the first step 1920, at the first time, the TV 1901 located in the first place 1900 is on, with its channel and volume set to 5 and 10, respectively. Referring to the first step 1920, at the first time, the lamp 1902 located in the first place 1900 is on, with its brightness set to 40%. Simultaneously, referring to the second step 1921, at the first time, the TV 1911 located in the second place 1910 is off. Referring to the second step 1921, at the first time, the bulb 1912 located in the second place 1910 is off.

At the second time, the electronic device may identify that the electronic device or the user is relocated from the first place 1900 to the second place 1910. According to an embodiment, based on disconnection from one or more first electronic devices (e.g., 1901, 1902, 1903, 1904, and 1905) located in the first place 1900 and connection with one or more second electronic devices (e.g., 1911, 1912, 1913, 1914, 1915, and 1916) located in the second place 1910, the electronic device may determine that the electronic device has been relocated from the first place 1900 to the second place 1910. According to another embodiment, the electronic device may determine that the electronic device is relocated from the first place 1900 to the second place 1910 based on at least one input (touch input, voice input, etc.) received from the user. For example, the electronic device may receive a voice input saying "I will move from the first place to the second place" from the user of the electronic device. The electronic device may determine that the user of the electronic device is relocated from the first place 1900 to the second place 1910 based on the received voice input.

According to an embodiment, in response to relocation of the electronic device or the user from the first place 1900 to the second place 1910, the electronic device may display information about the electronic devices located in each of the first place 1900 and the second place 1910 via at least one of the TV 1901 located in the first place 1900 and the TV 1911 located in the second place 1910. For example, upon determining that the electronic device or the user is relocated from the first place 1900 to the second place 1910, the electronic device may display information such as the device name, attribute, attribute value, and current state of at least one of the one or more first electronic devices (e.g., 1901, 1902, 1903, 1904, and 1905) and one or more second electronic devices (e.g., 1911, 1912, 1913, 1914, 1915, and 1916), via at least one of the TV 1901 located in the first place 1900 and the TV 1911 located in the second place 1910. Further, upon determining that the electronic device or the user is relocated from the first place 1900 to the second place 1910, the electronic device may display information related to compatibility each of the one or more first electronic devices (e.g., 1901, 1902, 1903, 1904, and 1905) and each of one or more second electronic devices (e.g., 1911, 1912, 1913, 1914, 1915, and 1916), via at least one of the TV 1901 located in the first place 1900 and the TV 1911 located in the second place 1910.

For example, referring to the third step 1930, at the second time, the TV 1901 located in the first place 1900 may display information about at least one electronic device determined to be controllable depending on a variation in the location of the electronic device or user. Referring to the third step 1930, at the second time, the lamp 1902 located in the first place 1900 is on, with its brightness set to 40%. Simultaneously, referring to the fourth step 1931, at the second time, the TV 1911 located in the second place 1910 may display information about at least one electronic device determined to be controllable depending on a variation in the location of the electronic device or user. Referring to the fourth step 1941, at the second time, the bulb 1912 located in the second place 1910 is on.

At the third time, the electronic device may vary or control the attributes for one or more second electronic devices (e.g., 1911, 1912, 1913, 1914, 1915, and 1916) located in the second place 1910 based on at least one input (e.g., a touch input or voice input) received from the user. For example, the electronic device may receive a voice input saying "Replay the video I'd watched" from the user. In response to the received voice input, the electronic device may adjust the attribute of the electronic devices located in the second place 1910 like the attribute of the electronic devices located in the first place 1900.

For example, referring to the sixth step 1941, at the third time, in response to the received voice input, the electronic device may set the power of the TV 1911 located in the second place 1910 to On state, channel to 5, and volume to 10. Further, referring to the sixth step 1941, at the third time, in response to the received voice input, the electronic device may set the power of the bulb 1912 located in the second place 1910 to On state and brightness to 40%.

Simultaneously, at the third time, the electronic device may determine that the user is not located in the first place 1900 and set the power of one or more electronic devices located in the first place 1900 to off. For example, referring to the fifth step 1940, at the third time, the electronic device may set the power of the TV 1901 and lamp 1902 located in the first place 1900 to off.

Figure 20:
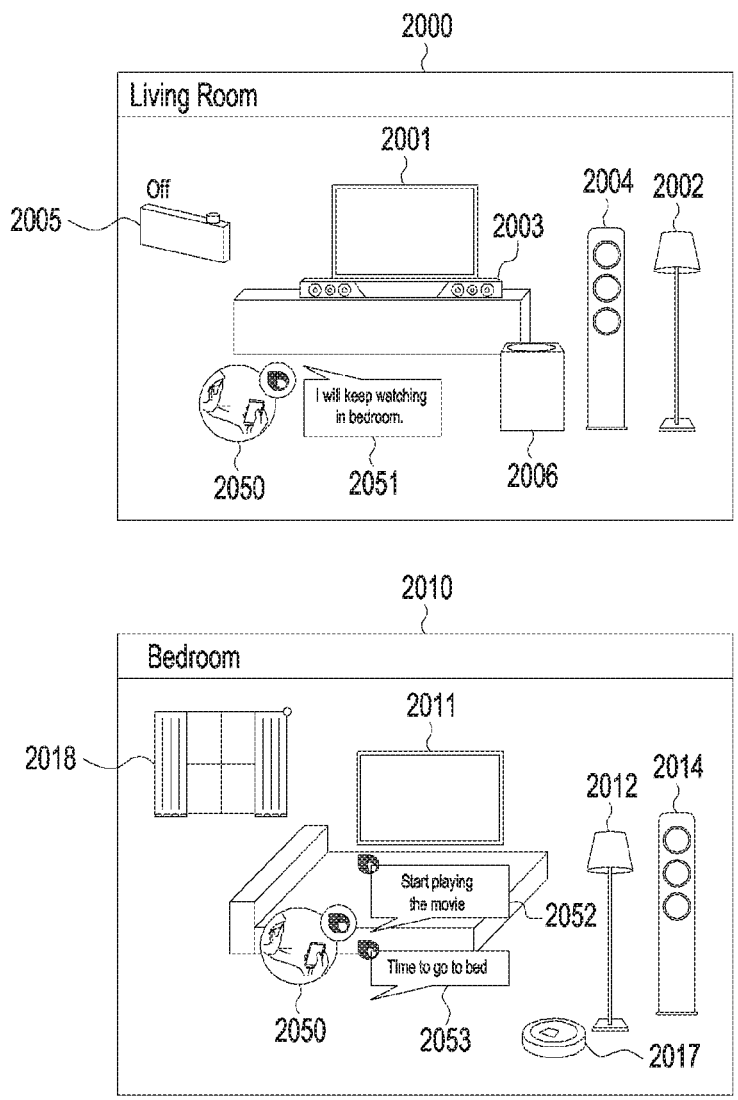
FIG. 20 is a view illustrating a method of controlling electronic devices located in different places based on at least one mode according to various embodiments of the present invention.

FIG. 20 is a view illustrating a method of controlling electronic devices located in different places based on at least one mode according to various embodiments of the present invention.

Referring to FIG. 20, an electronic device 2050 (e.g., the electronic device 101 of FIG. 1) may control one or more first electronic devices (e.g., 2001, 2002, 2003, 2004, 2005, and 2006) located in a first place 2000 or one or more second electronic devices (e.g., 2011, 2012, 2014, 2017, and 2018) located in a second place 2010 according to at least one input (e.g., a touch input or voice input) received from the user of the electronic device 2050. Here, the first place 2000 may mean the living room of a home, and the second place 2010 may mean a bedroom of the home. According to an embodiment, as electronic devices capable of communicating with the electronic device 2050 over a network, a TV 2001, a lamp 2002, a sound bar 2003, an air conditioner 2004, an audio component 2005, and an air purifier 2006 may be present in the first place 2000, and a TV 2011, a bulb 2012, an air conditioner 2014, a vacuum 2017, and a motorized curtain 2018 may be present in the second place 2010. The electronic device 2050 may control at least one of electronic devices located in the first place 2000 and the second place 2010 based on at least one input received from the user, the location of the user, and the location of the electronic device 2050.

According to an embodiment, the electronic device 2050 may identify that the user of the electronic device 2050 is located in the first place 2000 (e.g., living room). Further, the electronic device 2050 may identify that the one or more first electronic devices (e.g., 2001, 2002, 2003, 2004, 2005, and 2006) located in the first place 2000 are being controlled according to the "movie mode." Upon receiving a first command 2051 from the user of the electronic device 2050, e.g., by a voice input saying "I will keep watching in bedroom" or a touch input, the electronic device 2050 may determine that the user of the electronic device 2050 is relocated from the first place 2000 (e.g., living room) to the second place 2010 (e.g., bedroom).

According to an embodiment, in response to the first command 2051 received from the user of the electronic device 2050, the electronic device 2050 may pause playing the movie content being played on the TV 2001 located in the first place 2000. In response to the first command 2051 received from the user of the electronic device 2050, the electronic device 2050 may display a user interface related to the received first command 2051 on the display of the electronic device 2050.

Then, in response to the first command 2051 received from the user of the electronic device 2050, the electronic device 2050 may identify the attributes and attribute values of one or more first electronic devices (e.g., 2001, 2002, 2003, 2004, 2005, and 2006) connected via a network (e.g., the network 198 or 199 of FIG. 1) and located in the first place 2000. For example, the electronic device 2050 may identify that the power of the TV 2001 located in the first place 2000 is on and is playing movie content. Further, the electronic device 2050 may identify that the power of the bulb 2002, sound bar 2003, air conditioner 2004, and air purifier 2006 located in the first place 2000 is on. Further, the electronic device 2050 may identify that the power of the audio component 2005 located in the first place 2000 is off.

Further, in response to the first command 2051 received from the user, the electronic device 2050 may search for one or more second electronic devices (e.g., 2011, 2012, 2014, 2017, and 2018) connectible via a network and located in the second place 2010 to which the user desires to move. The electronic device 2050 may identify at least one electronic device compatible with one or more first electronic devices (e.g., 2001, 2002, 2003, 2004, 2005, and 2006) among one or more second electronic devices (e.g., 2011, 2012, 2014, 2017, and 2018) discovered. For example, the electronic device 2050 may determine that among the one or more second electronic devices (e.g., 2011, 2012, 2014, 2017, and 2018) located in the second place 2010, the TV 2011, bulb 2012, and air conditioner 2014 are compatible with the TV 2001, bulb 2002, and air conditioner 2004 located in the first place 2000.

According to an embodiment, upon receiving a second command 2052 from the user, e.g., by a voice input saying "Start playing the movie" or a touch input, the electronic device 2050 may control the one or more second electronic devices (e.g., 2011, 2012, 2014, 2017, and 2018) located in the second place 2010 according to the "movie mode." For example, the electronic device 2050 may adjust the attributes of the TV 2011, lamp 2012, and air conditioner 2014 located in the second place 2010 to correspond to the attributes of the TV 2001, bulb 2002, and air conditioner 2004 located in the first place 2000. The electronic device 2050 may control the TV 2011 located in the second place 2010 so that the movie content which was being played on the TV 2001 located in the first place 2000 is played on the TV 2011 located in the second place 2010. Further, the electronic device 2050 may set the power of the bulb 2012 and air conditioner 2014 located in the second place 2010 to On state.

Further, the electronic device 2050 may additionally adjust the attribute of the electronic device determined to be controlled according to the "movie mode" even if there is no electronic device corresponding to the first place 2000 among one or more second electronic devices (e.g., 2011, 2012, 2014, 2017, and 2018) located in the second place 2010. For example, after determining that the state of the motorized curtain 2018 needs to switch from an open to closed state according to the "movie mode," the electronic device 2050 may set the power of the motorized curtain 2018 to On state, closing the curtain. Further, the electronic device 2050 may determine that the power of the vacuum 2017 needs to be turned off according to the "movie mode," and then set the power of the vacuum 2017 to Off state. Here, whether the vacuum 2017 or motorized curtain 2018 needs to be controlled according to the "movie mode" may be determined previously by the user or by the electronic device 2050 according to information obtained via machine learning.

Meanwhile, upon determining that the user is not in the first place 2000 any longer, the electronic device 2050 may set the power of at least one of the one or more first electronic devices (e.g., 2001, 2002, 2003, 2004, 2005, and 2006) located in the first place 2000 to Off state. According to an embodiment, the electronic device 2050 may set the power to Off state for the TV 2001, bulb 2002, and air conditioner 2004 which have corresponding electronic devices in the second place 2010 among the one or more first electronic devices (e.g., 2001, 2002, 2003, 2004, 2005, and 2006) located in the first place 2000. Further, the electronic device 2050 may set the power to Off state for the electronic device that has no corresponding electronic device in the second place 2010 among the one or more first electronic devices (e.g., 2001, 2002, 2003, 2004, 2005, and 2006) located in the first place 2000 but needs to be controlled by the movement of the electronic device 2050 or the user. For example, the electronic device 2050 may set the power of the sound bar 2003 to Off state in response to the power-off of the TV 2001 located in the first place 2000. According to another embodiment, the electronic device 2050 may keep the power on for the electronic device determined to have no need for being controlled by the movement of the user or the electronic device 2050 among the one or more first electronic devices (e.g., 2001, 2002, 2003, 2004, 2005, and 2006) located in the first place 2000. For example, the electronic device 2050 may keep the power of the air purifier 2006 located in the first place 2000 on. Here, whether it needs to be controlled according to the movement of the user or the electronic device 2050 may be determined previously by the user or by the electronic device 2050 according to information obtained via machine learning.

According to an embodiment, upon receiving a third command 2053 from the user, e.g., by a voice input saying "Time to go to bed" or a touch input, the electronic device 2050 may control the one or more second electronic devices (e.g., 2011, 2012, 2014, 2017, and 2018) located in the second place 2010 according to the "sleep mode." For example, the electronic device 2050 may set the power of the TV 2011, bulb 2012, and air conditioner 2014 located in the second place 2010 to Off state. Further, the electronic device 2050 may set the power of the air purifier 2006 located in the first place 2000 to Off state.

Figure 21:
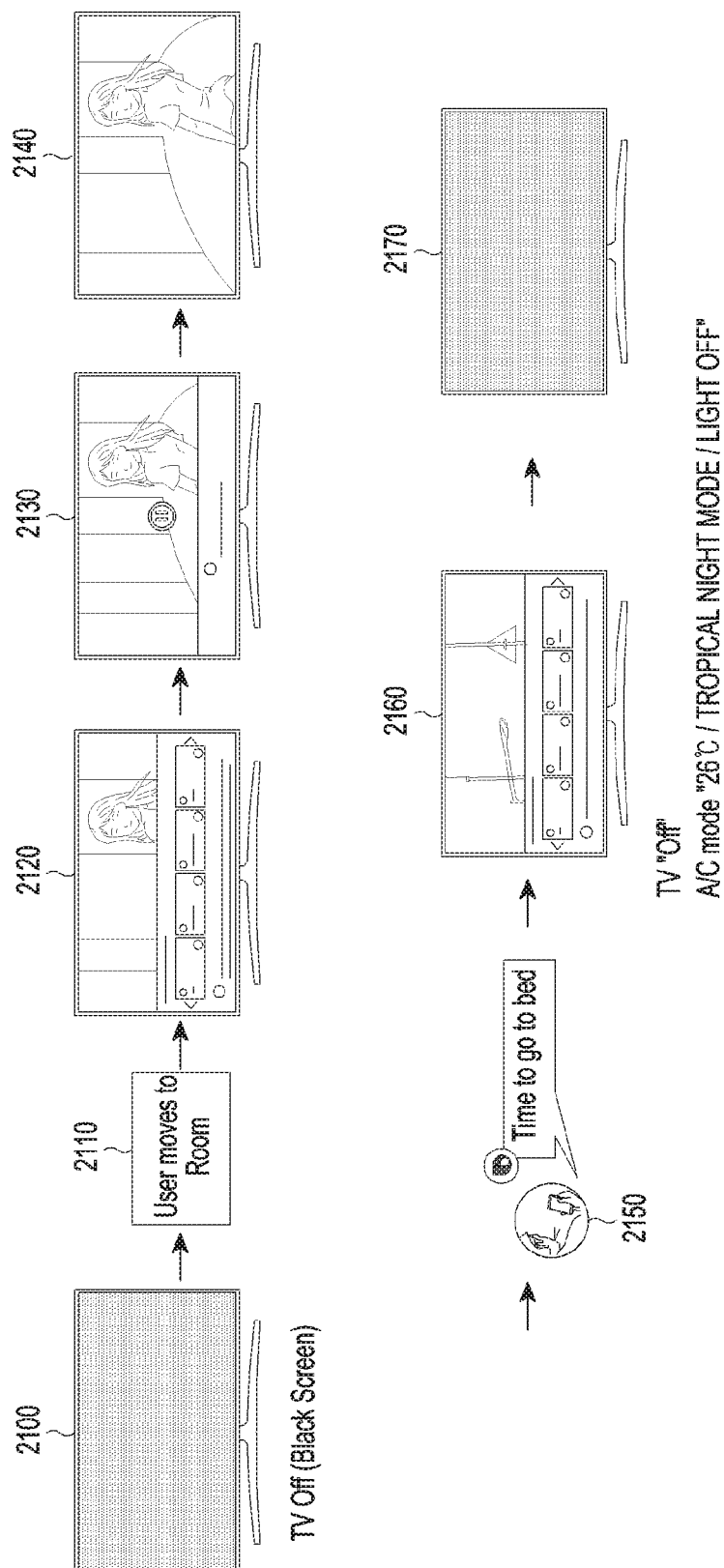
FIG. 21 is a view illustrating a method of controlling TVs located in different places based on at least one mode according to various embodiments of the present invention.

FIG. 21 is a view illustrating a method of controlling TVs located in different places based on at least one mode according to various embodiments of the present invention.

According to an embodiment, in the first step 2100, the user of the electronic device (e.g., the electronic device 101 of FIG. 1) may be watching movie content on the TV located in the first place (e.g., the living room of a home). Meanwhile, in the first step 2100, the TV located in the second place (e.g., a bedroom) may be in power-off state.

Upon determining that the user of the electronic device moves from the first place to the second place in the second step 2110, the electronic device may control the TV located in the second place to play the movie content that used to be played on the TV located in the first place.

In the third step 2120, a user interface indicating that there is playable content on the TV located in the second place may be displayed on the TV located in the second place. According to an embodiment, the TV located in the second place may additionally display information about at least one electronic device compatible with one or more electronic devices located in the first place among one or more electronic devices located in the second place.

In the fourth step 2130, the electronic device may receive, from the user, at least one command for controlling the TV located in the second place. For example, the electronic device may receive an input saying "Start playing the movie" from the user. Thus, in the fifth step 2140, the movie content which used to be played on the TV located in the first place may be played on the TV located in the second place.

In the sixth step 2150, the electronic device may receive an input saying "Time to go to bed" from the user. This may be a command for controlling one or more electronic devices located in the second place according to the "sleep mode."

In response to the received command, the electronic device may set the power of the TV located in the second place to Off state in the seventh step 2160. Further, the electronic device may set the temperature of the air conditioner located in the second place to 26° C., the mode of the air conditioner to tropical night mode, and the lighting of the air conditioner to Off state. Then, in the eighth step 2170, the TV located in the second place may power off.

Figure 22:
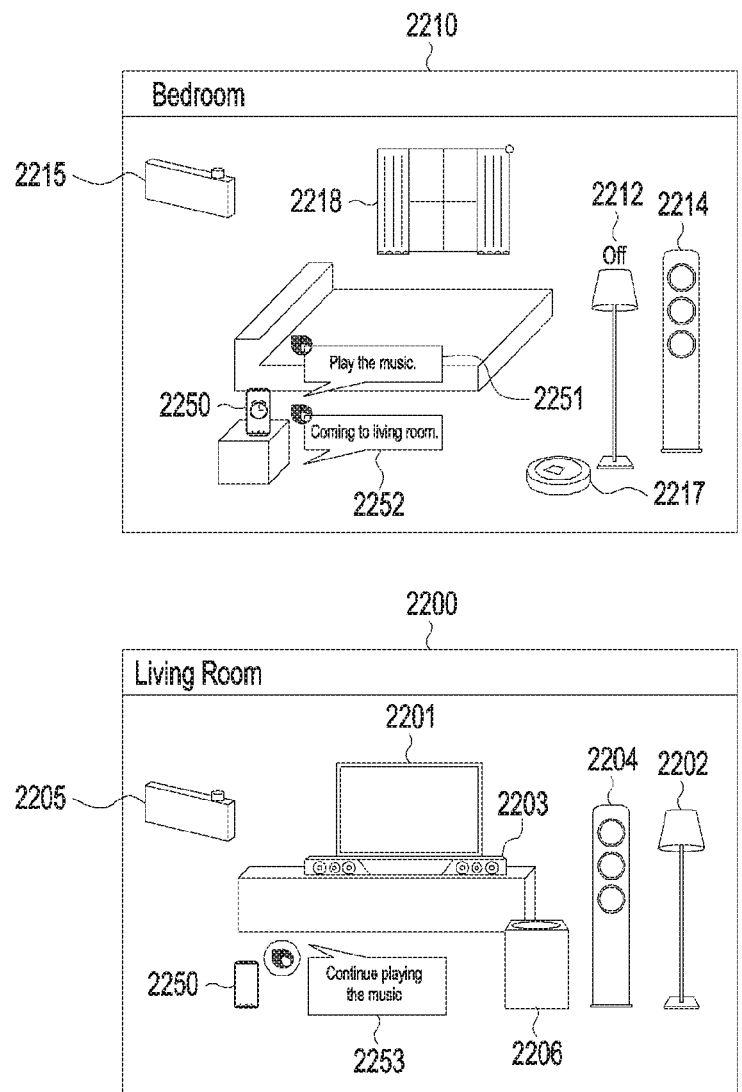
FIG. 22 is a view illustrating a method of controlling electronic devices located in different places based on at least one mode according to various embodiments of the present invention.

FIG. 22 is a view illustrating a method of controlling electronic devices located in different places based on at least one mode according to various embodiments of the present invention.

Referring to FIG. 22, an electronic device 2250 (e.g., electronic device 101 of FIG. 1) may control one or more first electronic devices (e.g., 2212, 2214, 2215, 2217, and 2218) located in a first place 2210 or one or more second electronic devices (e.g., 2201, 2202, 2203, 2204, 2205, and 2206) located in a second place 2200 according to at least one input (e.g., a touch input or voice input) received from the user of the electronic device 2050. Here, the first place 2210 may mean a bedroom of a home, and the second place 2200 may mean the living room of the home. According to an embodiment, as electronic devices capable of communicating with the electronic device 2250 over a network, a bulb 2212, an air conditioner 2214, an audio component 2215, a vacuum 2217, and a motorized curtain 2218 may be present in the first place 2210, and a TV 2201, a bulb 2202, a sound bar 2203, an air conditioner 2204, an audio component 2205, and an air purifier 2206 may be present in the second place 2200. The electronic device 2250 may control at least one of electronic devices located in the first place 2210 and the second place 2200 based on at least one input received from the user, the location of the user, and the location of the electronic device 2250.

According to an embodiment, the electronic device 2250 may output an alarm at a preset time. The electronic device 2250 may execute a preset "wake up mode" in response to the alarm going off. For example, "wake up mode" may mean a mode that sets the power of the air conditioner 2214 to On state and turns the state of the motorized curtain 2218 from close to open under the control of the electronic device 2250.

According to an embodiment, the electronic device 2250 may receive a first command 2251, e.g., a voice input saying "play the music" from the user. In response to receiving the first command, the electronic device 2250 may execute a preset "play the music mode." For example, "play the music mode" may mean a mode that sets the power of the audio component 2215 to On state and plays music contents in a preset order under the control of the electronic device 2250. At this time, an execution screen of a music application may be displayed on the display of the electronic device 2250.

According to an embodiment, the electronic device 2250 may receive a second command 2252, e.g., a voice input saying "coming to living room" from the user. In response to receiving the second command, the electronic device 2250 may determine that the electronic device 2250 or user is relocated from the first place 2210 to the second place 2200.

Further, the electronic device 2250 may determine that the user is not located in the second place 2210 any longer based on the second command 2252 received from the user. Thus, in response to the second command 2252 received from the user, the electronic device 2250 may set the power of the audio component 2215 and air conditioner 2214 located in the first place 2210 to Off state. Further, in response to the second command 2252 received from the user, the electronic device 2250 may set the power of the vacuum 2217 located in the first place 2210 to On state.

Further, the electronic device 2250 may determine that the user is not located in the first place 2200 any longer based on the second command 2252 received from the user. According to an embodiment, in response to the second command 2252 received from the user, the electronic device 2250 may adjust the attributes of one or more second electronic devices (e.g., 2201, 2202, 2203, 2204, 2205, and 2206) located in the second place 2200. For example, the electronic device 2250 may set the power of the air purifier 2206 to On state. According to another embodiment, based on the attributes of the first electronic devices (e.g., 2212, 2214, 2215, 2217, and 2218) located in the first place 2210, the electronic device 2250 may adjust the attribute of at least one of the one or more second electronic devices (e.g., 2201, 2202, 2203, 2204, 2205, and 2206) located in the second place 2200. For example, the electronic device 2250 may adjust the attribute of the air conditioner 2204 located in the second place 2200 to correspond to the attribute of the air conditioner 2214 located in the first place 2210.

Meanwhile, as the electronic device 2250 or the user moves from the first place 2210 to the second place 2200, the electronic device 2250 may display information about new electronic devices located in the second place 2200, determined to be controllable, on the TV 2201. For example, the TV 2201 may display information about the audio component 2205 located in the second place 2200, determined to be compatible with the audio component 2215 located in the first place 2210 under the control of the electronic device 2250.

According to an embodiment, the electronic device 2250 may receive a third command 2253, e.g., a voice input saying "continue playing the music" from the user. In response to receiving the third command, the electronic device 2250 may again execute a preset "play the music mode." For example, the electronic device 2250 may control the audio component 2205 located in the second place 2200 to continue playing the music content, which used to be played via the audio component 2215 located in the first place 2210, via the audio component 2205 located in the second place 2200. At this time, an execution screen of a music application may be displayed on the display of the electronic device 2250.

Figure 23:
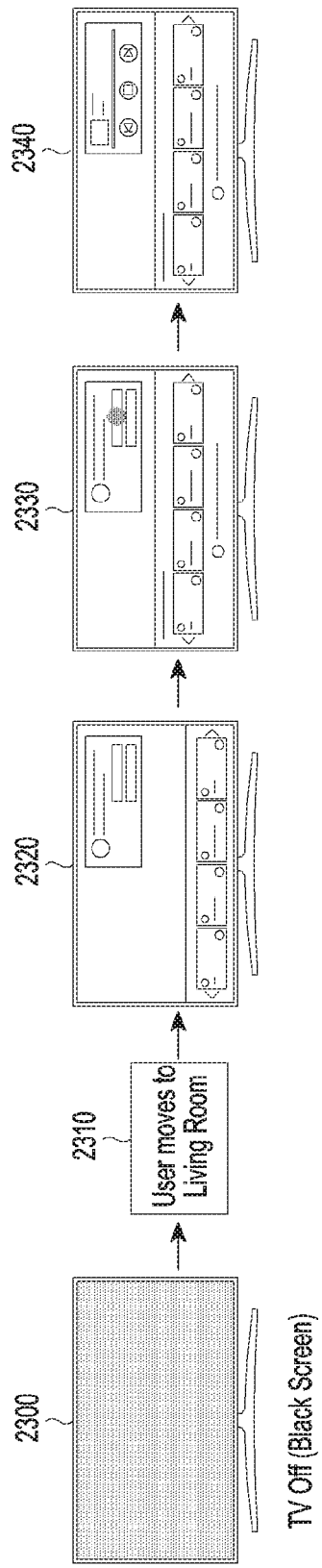
FIG. 23 is a view illustrating a method of controlling TVs located in different places based on at least one mode according to various embodiments of the present invention.

FIG. 23 is a view illustrating a method of controlling TVs located in different places based on at least one mode according to various embodiments of the present invention.

According to an embodiment, in the first step 2300, the user of the electronic device (e.g., the electronic device 101 of FIG. 1) may be watching music contents on an audio component (e.g., the audio component 2215 of FIG. 22) located in the first place (e.g., living room). Meanwhile, in the first step 2300, the TV located in the second place (e.g., living room) may be in a power-off state.

Upon determining that the user of the electronic device moves from the first place to the second place in the second step 2310, the electronic device may control the TV located in the second place to allow information related to the music content used to be played via the audio component located in the first place to be displayed on the TV located in the second place.

In the third step 2320, the TV located in the second place may display the information related to the music content that used to be played via the audio component located in the first place. For example, the TV located in the second place may display a user interface for identifying whether to continuously play the music content used to be played via the audio component located in the first place, via the audio component located in the second place or the TV located in the second place.

In the fourth step 2330, the electronic device may receive, from the user, at least one command for controlling the TV located in the second place. For example, the electronic device may receive an input saying "continue playing the music" from the user. Thus, in the fifth step 2340, the music content used to be played via the audio component located in the second place may be played via the audio component located in the second place or the TV located in the second place.

Figure 24:
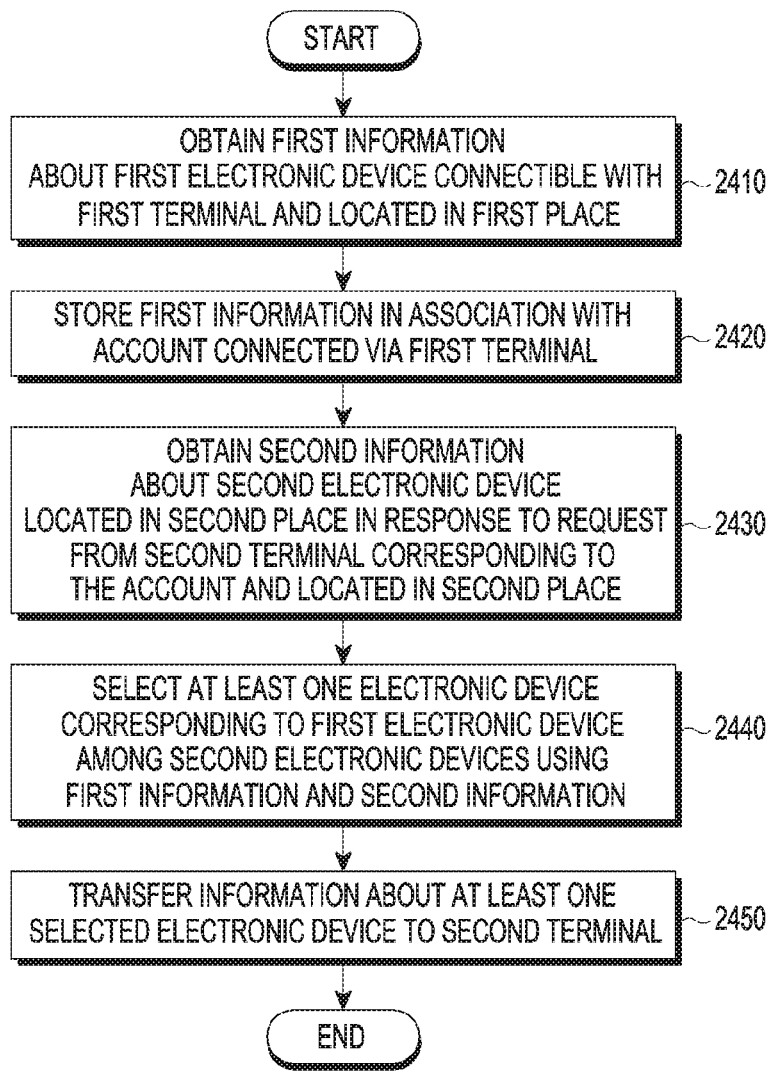
FIGS. 24 and 25 are flowcharts illustrating a method of controlling electronic devices located in a particular place according to the location where an account has been connected by an electronic device according to various embodiments of the present invention.
Figure 25:
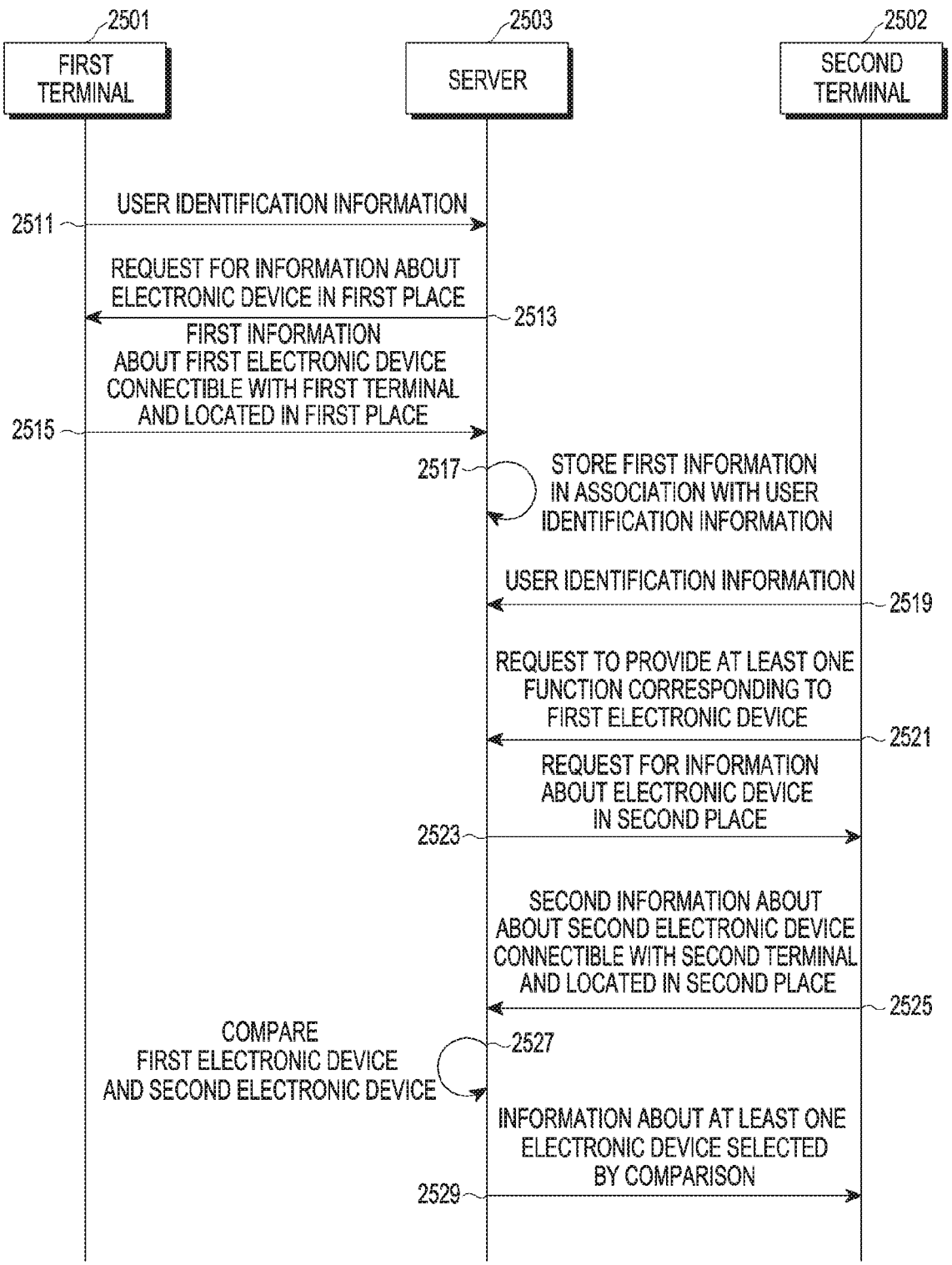

FIGS. 24 and 25 are flowcharts illustrating a method of controlling electronic devices located in a particular place according to the location where an account has been connected by an electronic device according to various embodiments of the present invention.

The entity of performing the method of FIG. 24 may be a processor of a server (e.g., the server 108 of FIG. 1) including a communication circuit (e.g., the communication module 190 of FIG. 1), a memory (e.g., the memory 130 of FIG. 1), and the processor (e.g., the processor 120 of FIG. 1).

According to an embodiment, in operation 2410, a server may obtain first information about one or more first electronic devices (e.g., the electronic devices 102 and 104 of FIG. 1) connectible with a first terminal (e.g., the electronic device 101 of FIG. 1) and located in the first place. The obtained first information may include at least one of device names (or identifiers), attributes, and attribute values of the one or more first electronic devices.

In operation 2420, the server may store the obtained first information in association with an account (or user identification information) for access via the first terminal in a memory of the server. As such, since the first information is stored in the memory of the server in association with the account, the user corresponding to the account may access the first information stored in the memory of the server once it accesses the account despite using another terminal than the first terminal.

In operation 2430, the server may obtain second information about one or more second electronic devices located in a second place, in response to a request for providing at least one function corresponding to the one or more first electronic devices from a second terminal corresponding to the account and located in a second place.

For example, the second terminal located in the second place may access the server via the account input by the user. Here, the account accessed via the second terminal may mean the same account as the account accessed via the first terminal. According to an embodiment, the server may receive a request for information related to the attribute (or function) of one or more first electronic devices stored in the memory of the server from the second terminal. For example, the server may receive a request for providing information about at least one mode set to control one or more first electronic devices from the second terminal.

In this case, the server may send a request for information about one or more second electronic devices located in the second place to the second terminal and may obtain information about one or more second electronic devices located in the second place from the second terminal.

In operation 2440, the server may select at least one electronic device corresponding to the one or more first electronic devices among the one or more second electronic devices located in the second place using the first information stored in the memory and the second information obtained via the second terminal.

According to an embodiment, the server may compare the attribute of each of the one or more first electronic devices located in the first place and the attribute of each of the one or more second electronic devices located in the second place. If the matching rate between the respective attributes of the two electronic devices is a preset value, the server may determine that the two electronic devices are compatible with each other. Based on a result of the comparison between the attributes of the electronic devices by the method, the server may select at least one electronic device compatible with one or more first electronic devices among one or more second electronic devices.

In operation 2450, the server may transfer information about the at least one selected electronic device to the second terminal. Meanwhile, the second terminal may control one or more second electronic devices located in the second place using the information about at least one electronic device received from the server.

Meanwhile, in the embodiment of FIG. 24, the second terminal may be a first terminal located in the second place.

Referring to FIG. 25, the server 2503 (e.g., the server 108 of FIG. 1) may identify data communicated between the first terminal 2501 (e.g., the electronic device 101 of FIG. 1) and the second terminal 2502 (e.g., the electronic device 101 of FIG. 1).

According to an embodiment, in operation 2511, the server 2503 may receive user identification information from the first terminal 2501. In other words, the first terminal 2501 may access the server 2503 based on the user identification information (or account) input by the user.

In operation 2513, the server 2503 may send a request for information about one or more first electronic devices located in the first place to the first terminal 2501. Correspondingly thereto, in operation 2515, the server 2503 may obtain first information about one or more first electronic devices connectible with the first terminal 2501 and located in the first place from the first terminal 2501.

In operation 2517, the server 2503 may store the obtained first information in association with user identification information, in the memory of the server 2503.

In operation 2519, the server 2503 may receive user identification information from the second terminal 2502. According to an embodiment, the user identification information received from the second terminal 2502 may be the same information as the user identification information received via the first terminal 2501 in operation 2511. According to another embodiment, the second terminal 2502 may be the same electronic device as the first terminal 2501, and may be the first terminal 2501 that has moved to the second place.

In operation 2521, the server 2503 may receive a request for providing at least one attribute (or function) corresponding to one or more first electronic devices from the second terminal 2502. For example, the second terminal 2502 may send a request for providing at least one attribute (or function) corresponding to one or more first electronic device to the server 2503 to control one or more second electronic devices located in the second place using information about the one or more first electronic devices located in the first place.

In operation 2523, the server 2503 may send a request for information about one or more second electronic devices located in the second place to the second terminal 2502. According to an embodiment, the server 2503 may compare information about one or more first electronic devices and information about one or more second electronic devices and then, based on a result of the comparison, provide at least one attribute (or function) corresponding to one or more first electronic devices to the second terminal 2502. To that end, the server 2503 may send a request for information about one or more second electronic devices located in the second place to the second terminal 2502.

In operation 2525, the server 2503 may obtain second information about one or more second electronic devices connectible with the second terminal 2502 and located in the second place from the second terminal 2502.

In operation 2527, the server 2503 may compare the one or more first electronic devices and one or more second electronic devices using the first information stored in the memory of the server 2503 and the second information obtained via the second terminal 2502. Further, based on a result of the comparison, the server 2503 may select at least one electronic device compatible with one or more first electronic devices among one or more second electronic devices.

In operation 2529, the server 2503 may transfer information about at least one selected electronic device to the second terminal 2502. Subsequently, the second terminal 2502 may control one or more second electronic devices located in the second place using the information about at least one selected electronic device.

Meanwhile, at least some of the operations of FIGS. 24 and 25 may be omitted or repeated. Further, each operation of FIGS. 24 and 25 should be interpreted as an embodiment, and any one operation should not be interpreted as dependent upon another operation.

Figure 26:
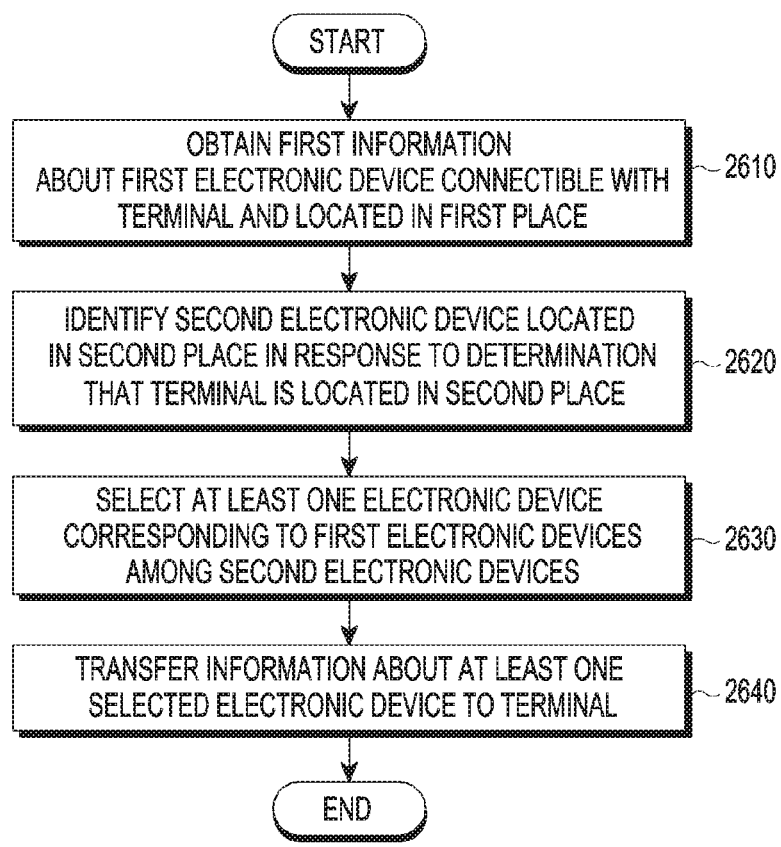
FIGS. 26 and 27 are flowcharts illustrating a method of controlling electronic devices located in a particular place by a movement of an electronic device according to various embodiments of the present invention.
Figure 27:
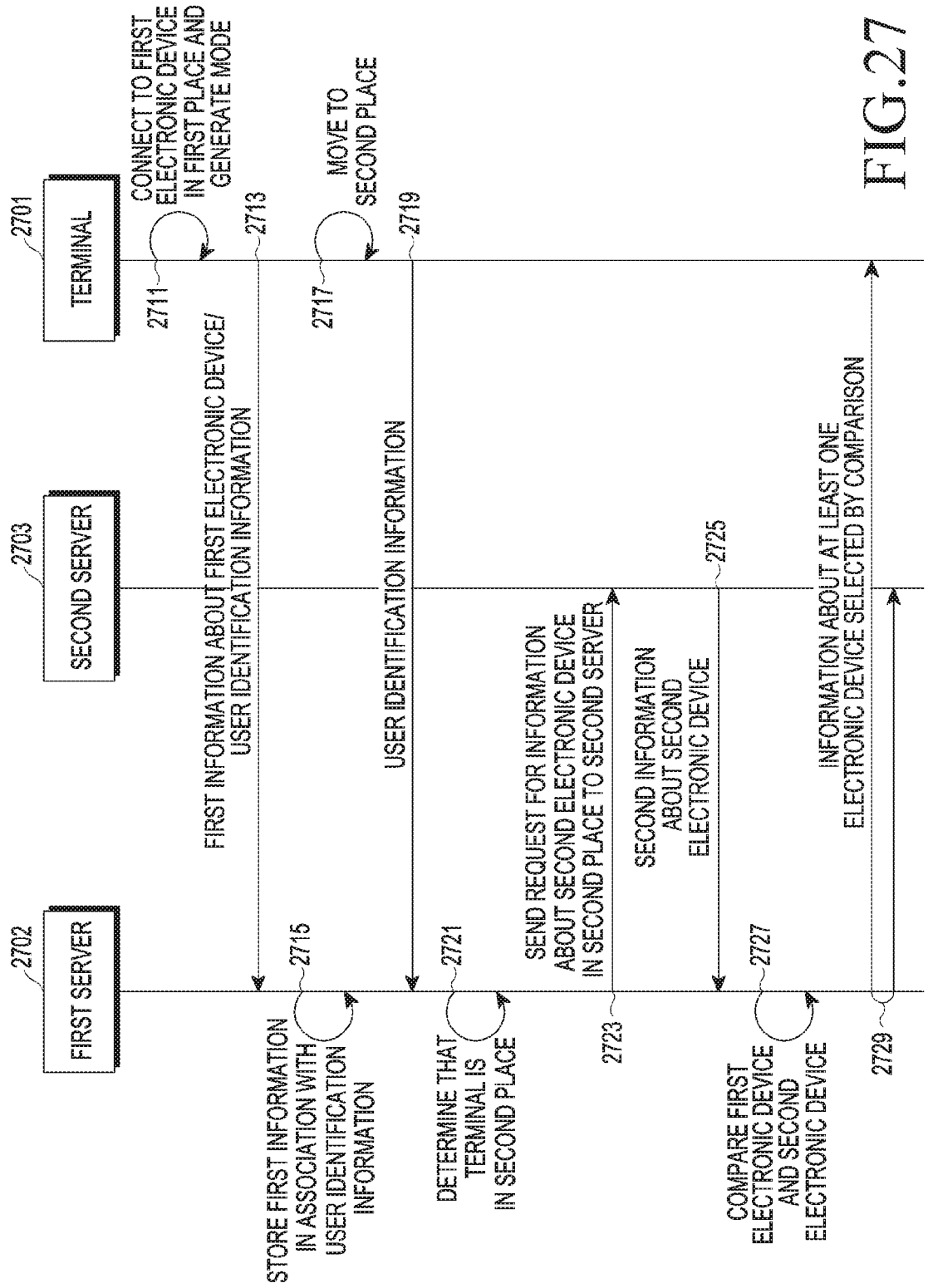

FIGS. 26 and 27 are flowcharts illustrating a method of controlling electronic devices located in a particular place by a movement of an electronic device according to various embodiments of the present invention.

The entity of performing the method of FIG. 26 may be a processor of at least one server (e.g., the server 108 of FIG. 1) including a communication circuit (e.g., the communication module 190 of FIG. 1), a memory (e.g., the memory 130 of FIG. 1), and the processor (e.g., the processor 120 of FIG. 1).

According to an embodiment, in operation 2610, the first server may obtain first information about one or more first electronic devices connectible with a terminal (e.g., the electronic device 101 of FIG. 1) and located in the first place. For example, the first server may obtain the first information about one or more first electronic devices from the terminal located in the first place.

In operation 2620, the first server may identify one or more second electronic devices located in the second place in response to determining that the terminal is located in the second place. For example, in response to determining that the terminal is relocated from the first place to the second place, the first server may transfer a request for information about one or more second electronic devices located in the second place to a second server controlling one or more second electronic devices. Corresponding thereto, the second server may transmit information about one or more second electronic devices located in the second place to the first server. The first server may identify one or more second electronic devices located in the second place based on the information received from the terminal.

In operation 2630, the first server may select at least one electronic device corresponding to one or more first electronic devices among one or more second electronic devices. According to an embodiment, the first server may compare each of the one or more first electronic devices and each of one or more second electronic devices based on the obtained first information. Subsequently, based on a result of the comparison, the first server may select at least one electronic device compatible with one or more first electronic devices among one or more second electronic devices.

In operation 2640, the first server may transfer information about the at least one selected electronic device to the terminal or the second server. The terminal or the second server may control one or more second electronic devices located in the second place using the information about at least one electronic device received from the server.

Referring to FIG. 27, the terminal 2701 (e.g., the electronic device 101 of FIG. 1), may identify data communicated between the first server 2702 (e.g., the server 108 of FIG. 1) and the second server 2703 (e.g., the server 108 of FIG. 1).

According to an embodiment, in operation 2711, the terminal 2701 may be connected with one or more first electronic devices located in the first place over a network (e.g., the network 198 or 199 of FIG. 1). Further, the terminal 2701 may generate at least one mode set to control at least some of one or more first electronic devices connectible with the terminal 2701.

In operation 2713, the first server 2702 may obtain first information about one or more first electronic devices and user identification information from the terminal 2701. Further, the first server 2702 may obtain information about at least one mode set to control at least some of one or more first electronic devices from the terminal 2701.

In operation 2715, the first server 2702 may store the obtained first information or information about at least one mode, in association with the user identification information, in the memory of the first server 2702.

In operation 2717, the location of the terminal 2701 may be changed from the first place to the second place. Meanwhile, in operation 2719, the terminal 2701 located in the second place may reaccess the first server 2702 via user identification information.

In operation 2721, the first server 2702 may determine that the terminal 2701 is in the second place according to the user identification information of reaccess via the terminal 2701.

In operation 2723, the first server 2702 may send a request for information about one or more second electronic devices to the second server 2703 capable of controlling one or more second electronic devices located in the second place. Corresponding thereto, in operation 2725, the first server 2702 may obtain second information about one or more second electronic devices from the second server 2703.

In operation 2727, the first server 2702 may compare one or more first electronic devices and one or more second electronic devices based on the first information stored in the memory of the first server 2702 and the second information obtained. Further, the first server 2702 may select at least one electronic device corresponding to one or more first electronic devices among one or more second electronic devices located in the second place, based on the result of comparison.

In operation 2729, the first server 2702 may transfer information about at least one selected electronic device to the terminal 2701 or the second server 2703. Meanwhile, the terminal 2701 or the second server 2703 may control one or more second electronic devices located in the second place using the information about at least one electronic device received from the server.

Meanwhile, at least some of the operations of FIGS. 26 and 27 may be omitted or repeated. Further, each operation of FIGS. 26 and 27 should be interpreted as an embodiment, and any one operation should not be interpreted as dependent upon another operation.

Figure 28:
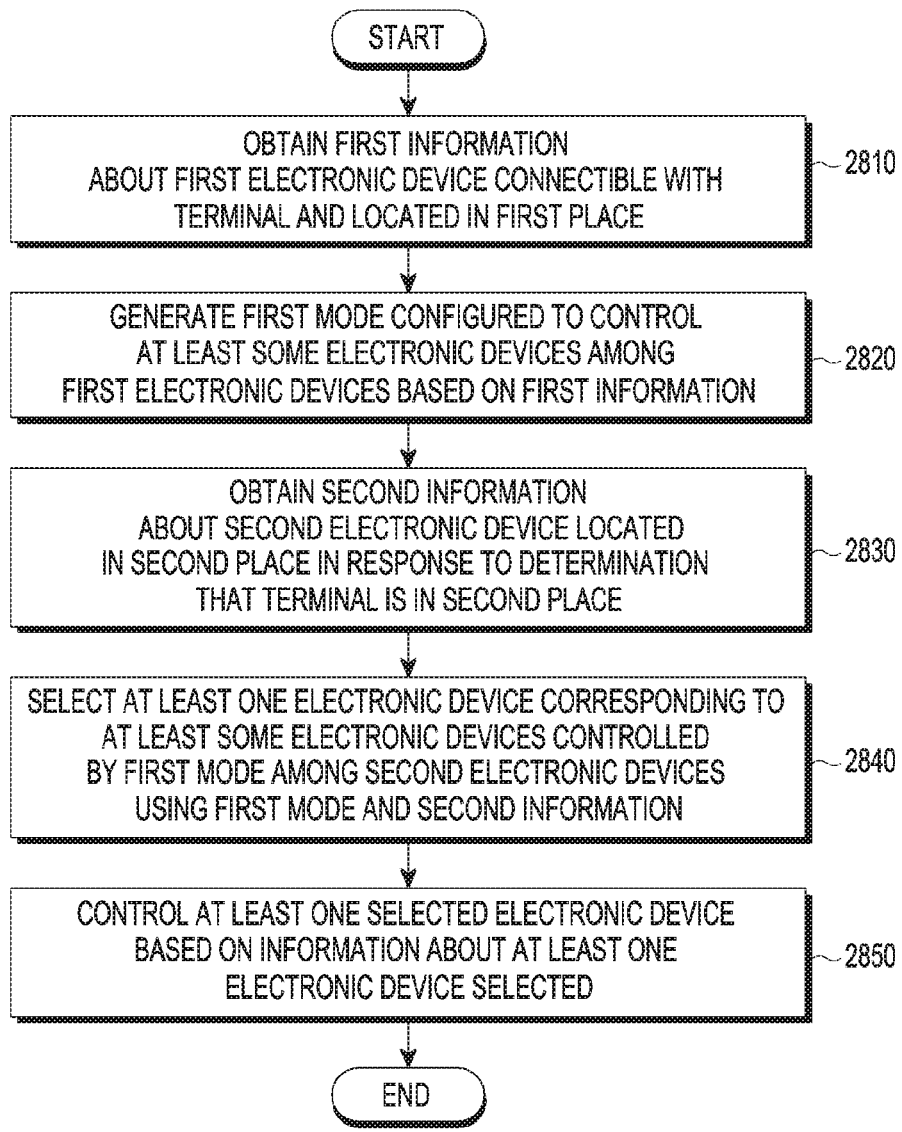
FIGS. 28 and 29 are flowcharts illustrating a method of identifying electronic devices located in a particular place and comparing them with pre-stored electronic devices by an electronic device according to various embodiments of the present invention.
Figure 29:
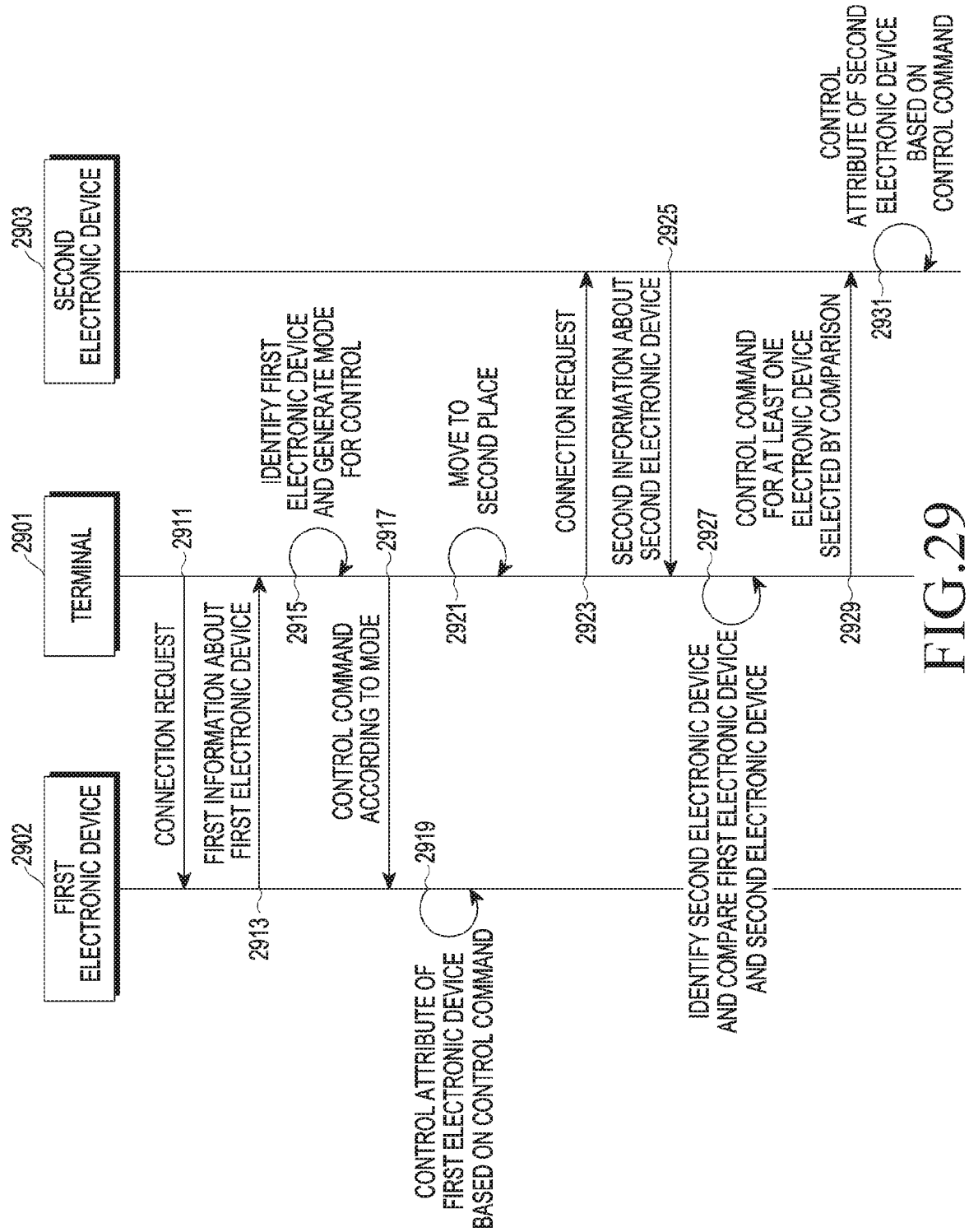

FIGS. 28 and 29 are flowcharts illustrating a method of identifying electronic devices located in a particular place and comparing them with pre-stored electronic devices by an electronic device according to various embodiments of the present invention.

The entity of performing the method of FIG. 28 may be a processor of a terminal (e.g., the electronic device 101 of FIG. 1) including a communication circuit (e.g., the communication module 190 of FIG. 1), a memory (e.g., the memory 130 of FIG. 1), and the processor (e.g., the processor 120 of FIG. 1).

According to an embodiment, in operation 2810, the terminal may obtain first information about a first electronic device connectible with the terminal and located in a first place. For example, the terminal may be connected with one or more first electronic devices located in the first place over a network (e.g., the network 198 or 199 of FIG. 1). The terminal may identify one or more first electronic devices connected via the network and obtain information about each electronic device from the one or more first electronic devices. Here, the obtained first information may include the device name, attribute, and attribute value of one or more first electronic devices. Meanwhile, the obtained first information may be stored in the memory of the terminal in association with information related to the first place.

In operation 2820, the terminal may generate a first mode set to control at least some electronic devices of the first electronic devices based on the first information. That is, the terminal may generate the first mode capable of simultaneously controlling at least some of the one or more first electronic devices located in the first place. For example, the terminal may generate a "movie mode" based on the user's command and control at least some of the one or more first electronic devices located in the first place using the "movie mode." Here, the "movie mode" may be a mode set to power on the TV in the home, set the temperature of the air conditioner in the home to 25 Celsius degrees, and set the brightness of the lamp in the home to 40%.

In operation 2830, the terminal may obtain second information about a second electronic device located in the second place in response to determining that the terminal is located in the second place. According to an embodiment, the location of the terminal may be changed from the first place to the second place. In this case, the terminal may be connected with one or more second electronic devices located in the second place over a network. The terminal may identify one or more second electronic devices connected via the network and obtain information about each electronic device from the one or more second electronic devices.

In operation 2840, the terminal may select at least one electronic device corresponding to at least some electronic devices controlled according to the first mode among the second electronic devices using the first mode and the second information. For example, the terminal may identify the first mode pre-stored in the memory of the terminal and then identify a plurality of electronic devices included in the identified first mode. Then, the terminal may determine whether there are electronic devices compatible with a plurality of electronic devices identified among one or more second electronic devices. According to an embodiment, if the matching rate between the respective attributes of the two electronic devices is a preset value, the terminal may determine that the two electronic devices are compatible with each other. Based on a result of the determination, the terminal may select at least one electronic device determined to be controllable according to the first mode among one or more second electronic devices.

In operation 2850, the terminal may control the at least one selected electronic device based on information about the at least one selected electronic device. For example, if there is at least one electronic device determined to be compatible with a plurality of electronic devices included in the first mode among one or more second electronic devices located in the second place, the terminal may determine that the first mode may be applied in the second place. The terminal may adjust the attribute and attribute value of the at least one selected electronic device using the attribute and attribute value set in the first mode. For example, it may be determined that the "movie mode" generated in the first place is applicable in the second place. In this case, according to "movie mode," the terminal may power on the TV located in the second place, set the temperature of the air conditioner located in the second place to 25° C., and set the brightness of the lamp located in the second place to 40%.

Referring to FIG. 29, the terminal 2901 (e.g., the electronic device 101 of FIG. 1) may identify data communicated between the first electronic device 2902 (e.g., the electronic device 102 or 104 of FIG. 1) and the second electronic device 2903 (e.g., the electronic device 104 or 104 of FIG. 1).

According to an embodiment, in operation 2911, the terminal 2901 may transfer a request for connection to one or more first electronic devices 2902 located in the first place. Corresponding thereto, in operation 2913, the terminal 2901 may obtain first information about each electronic device from one or more first electronic devices 2902.

In operation 2915, the terminal 2901 may identify one or more first electronic devices 2902 based on the obtained first information. Further, the terminal 2901 may generate at least one mode set to control at least some of one or more first electronic devices 2902. Meanwhile, the terminal 2901 may store the obtained first information and information related to at least one mode generated, in the memory of the terminal 2901.

In operation 2917, the terminal 2901 may transfer a control command according to at least one generated mode to one or more first electronic devices 2902. In response thereto, in operation 2919, the one or more first electronic devices 2902 may adjust the attributes of at least some of one or more first electronic devices 2902 based on the received control command.

Meanwhile, in operation 2921, the location of the terminal 2901 may be changed from the first place to the second place. In operation 2923, the terminal 2901 may transfer a request for connection to one or more second electronic devices 2903 located in the second place. Corresponding thereto, in operation 2925, the terminal 2901 may obtain second information about each electronic device from one or more second electronic devices 2903.

In operation 2927, the terminal 2901 may identify one or more second electronic devices 2903 based on the obtained second information. Further, the terminal 2901 may compare one or more first electronic devices 2902 and one or more second electronic devices 2903 based on the obtained second information and information about at least one mode, and the first information pre-stored in the memory. Thus, the terminal 2901 may select at least one electronic device controllable according to at least one mode generated in the first place or compatible with one or more first electronic devices 2902 among one or more second electronic devices 2903.

In operation 2929, the terminal 2901 may transfer a control command for at least one selected electronic device to one or more second electronic devices 2903. In response thereto, in operation 2931, the one or more second electronic devices 2903 may adjust the attributes of at least some of one or more second electronic devices 2903 based on the received control command.

Meanwhile, at least some of the operations of FIGS. 28 and 29 may be omitted or repeated. Further, each operation of FIGS. 28 and 29 should be interpreted as an embodiment, and any one operation should not be interpreted as dependent upon another operation.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

The invention claimed is:

1. An electronic device, comprising:
   a communication circuit;
   a processor electrically connected with the communication circuit; and
   a memory electrically connected with the processor, the memory storing instructions configured to, when executed by the processor, cause the processor to:
   obtain first information about one or more first electronic devices connectible with a first external device and located in a first place, from the first external device via the communication circuit;
   store the obtained first information in the memory in association with an account connected via the first external device;
   obtain second information about one or more second electronic devices located in a second place, in response to a request for providing at least one function corresponding to the one or more first electronic devices from a second external device corresponding to the account and located in a second place;
   select at least one electronic device corresponding to the one or more first electronic devices among the one or more second electronic devices, based on the first information stored in the memory and the obtained second information; and
   control the communication circuit to transmit information about the selected at least one electronic device to the second external device.

2. The electronic device of claim 1, wherein the memory stores instructions configured to, when executed by the processor, cause the processor to:
   obtain information related to a first mode configured to control at least some first electronic devices among the one or more first electronic devices from the first external device;
   store the obtained information related to the first mode in the memory in association with the account connected via the first external device; and
   control the communication circuit to transmit the information about the at least one electronic device and the information related to the first mode to the second external device, in response to determining that the selected at least one electronic device corresponds to the at least some first electronic devices controlled according to the first mode.

3. The electronic device of claim 2, wherein the memory stores instructions configured to, when executed by the processor, cause the processor to:
obtain information related to a second mode configured to control at least some second electronic devices among the one or more second electronic devices from an external server, in response to the request for providing the at least one function from the second external device; and
upon determining that the at least some second electronic devices controlled according to the second mode correspond to the at least some first electronic devices controlled according to the first mode, control the communication circuit to transmit the information related to the second mode to the second external device.

4. The electronic device of claim 1, wherein the memory stores instructions configured to, when executed, by the processor, cause the processor to:
compare each of the one or more first electronic devices and each of the one or more second electronic devices based on an attribute for each of the one or more first electronic devices included in the first information and an attribute for each of the one or more second electronic devices included in the second information; and
select the at least one electronic device corresponding to the one or more first electronic devices among the one or more second electronic devices, based on a result of the comparison.

5. The electronic device of claim 4, wherein the memory stores instructions configured to, when executed by the processor, cause the processor to:
determine a degree of matching between the attribute corresponding to each of the one or more first electronic devices and the attribute corresponding to the at least one electronic device;
based on the degree of matching being a preset value or more, determine that the at least one electronic device corresponds to the one or more first electronic devices; and
select the at least one electronic device based on a result of the determination.

6. The electronic device of claim 4, wherein the memory stores instructions configured to, when executed by the processor, cause the processor to:
when a plurality of attributes corresponding to the one or more first electronic devices at least partially correspond to a combination of respective attributes of two or more electronic devices of a plurality of second electronic devices, determine a degree of matching between the plurality of attributes and the respective attributes;
based on the degree of matching being a preset value or more, determine that the combination of the two or more electronic devices corresponds to the one or more first electronic devices; and
select the two or more electronic devices as the at least one electronic device based on a result of the determination.

7. The electronic device of claim 4, wherein the memory stores instructions configured to, when executed by the processor, cause the processor to:
when a plurality of electronic devices correspond to the one or more first electronic devices, among a plurality of second electronic devices, select the at least one electronic device among the plurality of electronic devices, based on at least one of a distance between the plurality of electronic devices and the second external device or a strength of a signal output from the plurality of electronic devices.

8. The electronic device of claim 1, wherein the second external device differs from the first external device.

9. A method of controlling an electronic device, the method comprising:
obtaining first information about one or more first electronic devices connectible with a first external device and located in a first place, from the first external device;
storing the obtained first information in association with an account connected via the first external device;
obtaining second information about one or more second electronic devices located in a second place, in response to a request for providing at least one function corresponding to the one or more first electronic devices from a second external device corresponding to the account and located in a second place;
selecting at least one electronic device corresponding to the one or more first electronic devices among the one or more second electronic devices based on the first information stored and the obtained second information; and
transmitting information about the selected at least one electronic device to the second external device.

10. The method of claim 9, further comprising:
obtaining information related to a first mode configured to control at least some first electronic devices among the one or more first electronic devices from the first external device;
storing the obtained information related to the first mode in association with the account connected via the first external device; and
transmitting the information about the at least one electronic device and the information related to the first mode to the second external device in response to determining that the selected at least one electronic device corresponds to the at least first some electronic devices controlled according to the first mode.

11. The method of claim 10, further comprising:
obtaining information related to a second mode configured to control at least some second electronic devices among the one or more second electronic devices from an external server in response to the request for providing the at least one function from the second external device; and
upon determining that the at least some second electronic devices controlled according to the second mode correspond to the at least some first electronic devices controlled according to the first mode, transmitting the information related to the second mode to the second external device.

12. The method of claim 9, further comprising:
comparing each of the one or more first electronic devices and each of the one or more second electronic devices based on an attribute for each of the one or more first electronic devices included in the first information and an attribute for each of the one or more second electronic devices included in the second information; and
selecting the at least one electronic device corresponding to the one or more first electronic devices among the one or more second electronic devices based on a result of the comparison.

13. The method of claim 12, further comprising:
determining a degree of matching between the attribute corresponding to each of the one or more first electronic devices and the attribute corresponding to the at least one electronic device;
based on the degree of matching being a preset value or more, determining that the at least one electronic device corresponds to the one or more first electronic devices; and
selecting the at least one electronic device based on a result of the determination.

14. The method of claim 12, further comprising:
when a plurality of attributes corresponding to the one or more first electronic devices at least partially correspond to a combination of respective attributes of two or more electronic devices of a plurality of second electronic devices, determining a degree of matching between the plurality of attributes and the respective attributes;
based on the degree of matching being a preset value or more, determining that the combination of the two or more electronic devices corresponds to the one or more first electronic devices; and
selecting the two or more electronic devices as the at least one electronic device based on a result of the determination.

15. The method of claim 12, further comprising:
when a plurality of electronic devices correspond to the one or more first electronic devices, among a plurality of second electronic devices, selecting the at least one electronic device among the plurality of electronic devices, based on at least one of a distance between the plurality of electronic devices and the second external device or a strength of a signal output from the plurality of electronic devices.

* * * * *